US006414800B1

(12) United States Patent
Hamano

(10) Patent No.: US 6,414,800 B1
(45) Date of Patent: Jul. 2, 2002

(54) VARIABLE MAGNIFICATION OPTICAL SYSTEM AND CAMERA HAVING THE SAME

(75) Inventor: Hiroyuki Hamano, Yamato (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/564,376

(22) Filed: May 2, 2000

(30) Foreign Application Priority Data

May 10, 1999 (JP) .......................... 11-128824
Jul. 28, 1999 (JP) .......................... 11-213370
Aug. 27, 1999 (JP) .......................... 11-241216

(51) Int. Cl.[7] .................. G02B 15/14; G02B 9/62; G02B 9/34; G02B 13/02
(52) U.S. Cl. .................. 359/687; 359/758; 359/774; 359/745; 359/747
(58) Field of Search ................. 359/687, 758, 359/774, 745, 747

(56) References Cited

U.S. PATENT DOCUMENTS

| | | | |
|---|---|---|---|
| 4,832,471 A | 5/1989 | Hamano | 359/683 |
| 4,859,042 A | 8/1989 | Tanaka | 359/687 |
| 4,927,250 A | 5/1990 | Suda | 359/557 |
| 4,934,796 A | 6/1990 | Sugiura et al. | 359/683 |
| 4,988,174 A | 1/1991 | Horiuchi et al. | 359/683 |
| 4,998,809 A | 3/1991 | Tsuji et al. | 359/557 |
| 5,009,492 A | 4/1991 | Hamano | 359/684 |
| 5,039,211 A | 8/1991 | Maruyama | 359/557 |
| 5,050,972 A | 9/1991 | Mukaiya et al. | 359/683 |
| 5,134,524 A | 7/1992 | Hamano et al. | 359/687 |
| 5,138,492 A | 8/1992 | Hamano et al. | 359/684 |
| 5,249,079 A | 9/1993 | Umeda | 359/554 |
| 5,270,857 A | 12/1993 | Oizumi et al. | 359/554 |

(List continued on next page.)

FOREIGN PATENT DOCUMENTS

| | | |
|---|---|---|
| JP | 56-21133 | 2/1981 |
| JP | 56-34847 | 8/1981 |
| JP | 57-7414 | 2/1982 |
| JP | 61-223819 | 10/1986 |
| JP | 1-116619 | 5/1989 |
| JP | 2-124521 | 5/1990 |
| JP | 5-60974 | 3/1993 |
| JP | 7-128619 | 5/1995 |
| JP | 7-199124 | 8/1995 |

Primary Examiner—Georgia Epps
Assistant Examiner—Michael A. Lucas
(74) Attorney, Agent, or Firm—Fitzpatrick, Cella, Harper & Scinto

(57) ABSTRACT

A variable magnification optical system includes, in order from an object side to an image side, a first lens unit of positive refractive power, a second lens unit of negative refractive power arranged to move along an optical axis during variation of magnification, the second lens unit including, in order from the object side to the image side, a first lens (L21) of negative refractive power and of meniscus form having a concave surface facing the image side, a second lens (L22) of negative refractive power, a third lens (L23) of positive refractive power and a fourth lens (L24) of negative refractive power, a third lens unit of positive refractive power, at least a part of the third lens unit being moved in such a way as to have a component perpendicular to the optical axis to displace an image formed by the variable magnification optical system, and a fourth lens unit of positive refractive power arranged to move along the optical axis during the variation of magnification, wherein the following condition is satisfied:

$$0.05 < |f2/ft| < 0.07$$

where ft is a focal length of the variable magnification optical system in a telephoto end, and f2 is a focal length of the second lens

33 Claims, 26 Drawing Sheets

U.S. PATENT DOCUMENTS

| | | | |
|---|---|---|---|
| 5,299,064 A | 3/1994 | Hamano et al. | 359/684 |
| 5,396,367 A | 3/1995 | Ono et al. | 359/687 |
| 5,418,646 A | 5/1995 | Shibata et al. | 359/687 |
| 5,430,576 A | 7/1995 | Hamano | 359/684 |
| 5,521,758 A | 5/1996 | Hamano | 359/557 |
| 5,546,230 A | 8/1996 | Sato et al. | 359/684 |
| 5,579,171 A | 11/1996 | Suzuki et al. | 359/687 |
| 5,585,966 A | 12/1996 | Suzuki | 359/557 |
| 5,600,490 A | 2/1997 | Sugawara et al. | 359/690 |
| 5,610,766 A | 3/1997 | Aoki et al. | 359/687 |
| 5,638,216 A | 6/1997 | Horiuchi et al. | 359/683 |
| 5,654,826 A | 8/1997 | Suzuki | 359/557 |
| 5,677,792 A | 10/1997 | Hamano | 359/557 |
| 5,751,496 A | 5/1998 | Hamano | 359/677 |
| 5,771,123 A | 6/1998 | Hamano | 359/557 |
| 5,774,275 A | 6/1998 | Hamano | 359/687 |
| 5,818,646 A | 10/1998 | Hamano | 359/684 |
| 5,905,530 A | 5/1999 | Yokota et al. | 348/240 |
| 5,933,283 A | 8/1999 | Hamano | 359/687 |
| 5,963,378 A | 10/1999 | Tochigi et al. | 359/687 |
| 6,010,537 A * | 1/2000 | Konno | 359/389 |
| 6,191,895 B1 * | 2/2001 | Arimoto | 359/686 |

* cited by examiner

NORMAL STATE

IMAGE-SHAKE OCCURRING STATE

SHIFTING OF LENS UNIT

IMAGE STABILIZING STATE

Fno/1.85

-0.05  0.05
SPHERICAL
ABERRATION

ω=31.5°

-0.05  0.05
ASTIGMATISM

ω=31.5°

-5.00  5.00
DISTORTION (%)

ω=31.5°

-0.013  0.013
LATERAL CHROMATIC
ABERRATION (g-LINE)

Fno/2.17

-0.05  0.05
SPHERICAL
ABERRATION

ω=5.6°

-0.05  0.05
ASTIGMATISM

ω=5.6°

-5.00  5.00
DISTORTION (%)

ω=5.6°

-0.013  0.013
LATERAL CHROMATIC
ABERRATION (g-LINE)

Fno/3.17

-0.05  0.05
SPHERICAL
ABERRATION

ω=1.7°

-0.05  0.05
ASTIGMATISM

ω=1.7°

-5.00  5.00
DISTORTION (%)

ω=1.7°

-0.013  0.013
LATERAL CHROMATIC
ABERRATION (g-LINE)

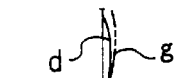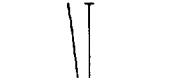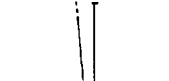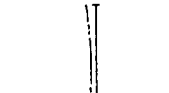

Fno/1.85

-0.05  0.05  
SPHERICAL ABERRATION

ω=31.5°

-0.05  0.05  
ASTIGMATISM

ω=31.5°

-5.00  5.00  
DISTORTION (%)

ω=31.5°

-0.013  0.013  
LATERAL CHROMATIC ABERRATION (g-LINE)

Fno/2.37

-0.05  0.05  
SPHERICAL ABERRATION

ω=4.8°

-0.05  0.05  
ASTIGMATISM

ω=4.8°

-5.00  5.00  
DISTORTION (%)

ω=4.8°

-0.013  0.013  
LATERAL CHROMATIC ABERRATION (g-LINE)

Fno/3.55

-0.05  0.05  
SPHERICAL ABERRATION

ω=1.5°

-0.05  0.05  
ASTIGMATISM

ω=1.5°

-5.00  5.00  
DISTORTION (%)

ω=1.5°

-0.013  0.013  
LATERAL CHROMATIC ABERRATION (g-LINE)

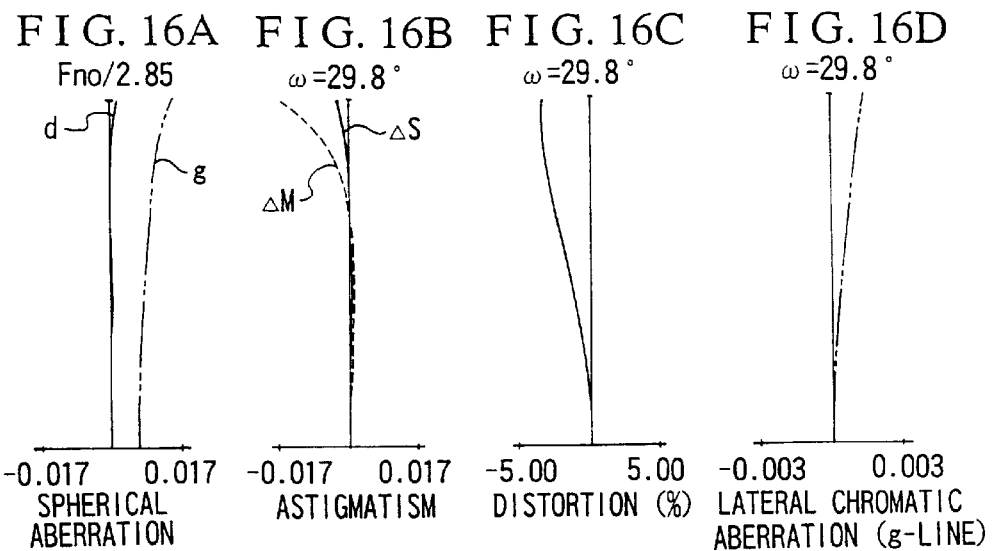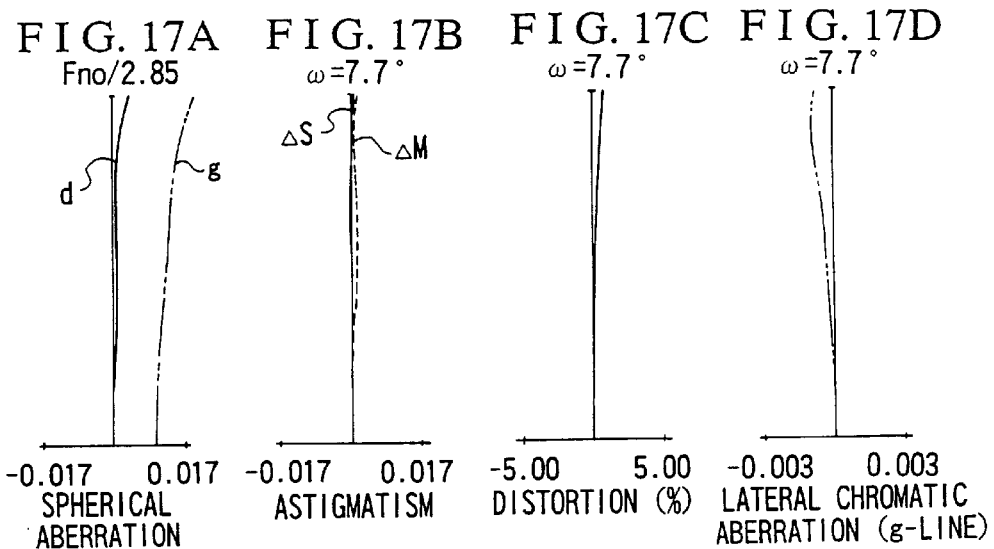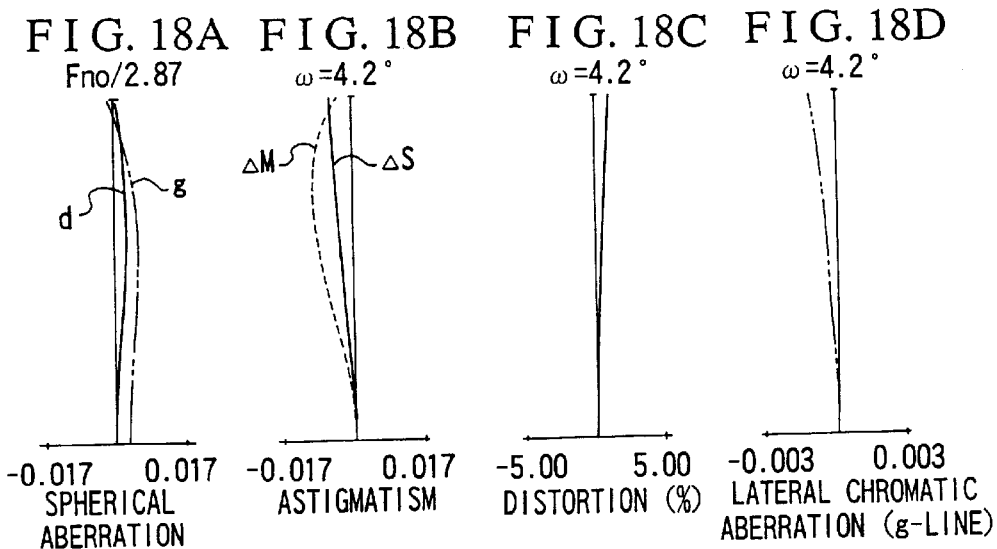

Fno/2.85

-0.017    0.017
SPHERICAL
ABERRATION

ω=29.8°

-0.017    0.017
ASTIGMATISM

ω=29.8°

-5.00    5.00
DISTORTION (%)

ω=29.8°

-0.003    0.003
LATERAL CHROMATIC
ABERRATION (g-LINE)

Fno/2.85

-0.017    0.017
SPHERICAL
ABERRATION

ω=7.7°

-0.017    0.017
ASTIGMATISM

ω=7.7°

-5.00    5.00
DISTORTION (%)

ω=7.7°

-0.003    0.003
LATERAL CHROMATIC
ABERRATION (g-LINE)

Fno/2.88

-0.017    0.017
SPHERICAL
ABERRATION

ω=4.2°

-0.017    0.017
ASTIGMATISM

ω=4.2°

-5.00    5.00
DISTORTION (%)

ω=4.2°

-0.003    0.003
LATERAL CHROMATIC
ABERRATION (g-LINE)

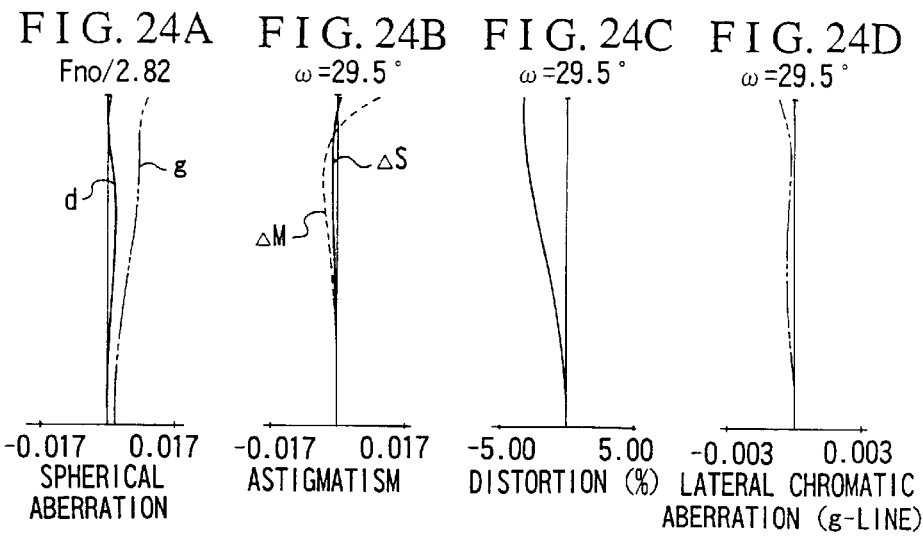
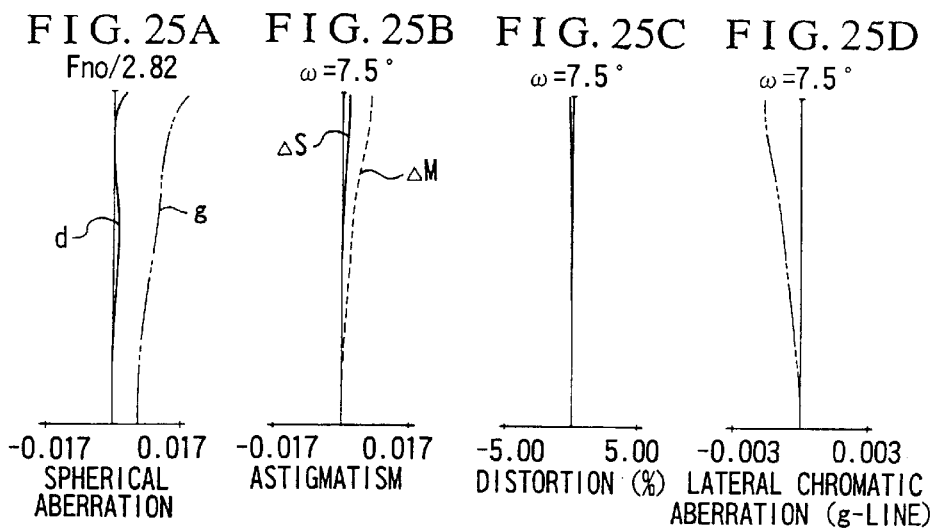
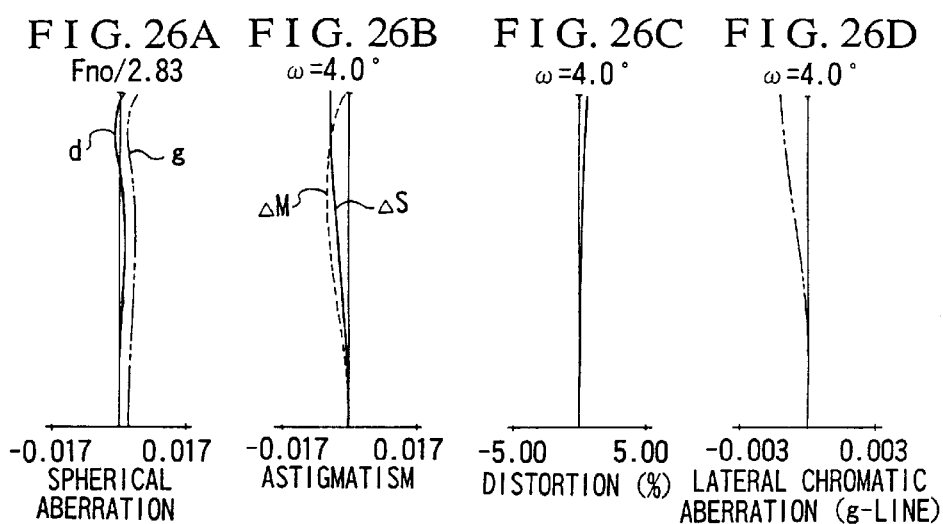

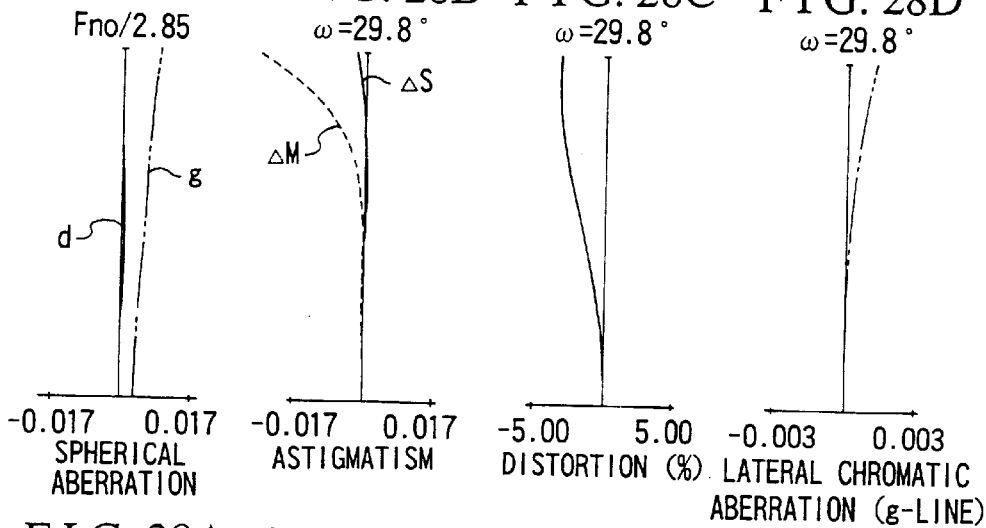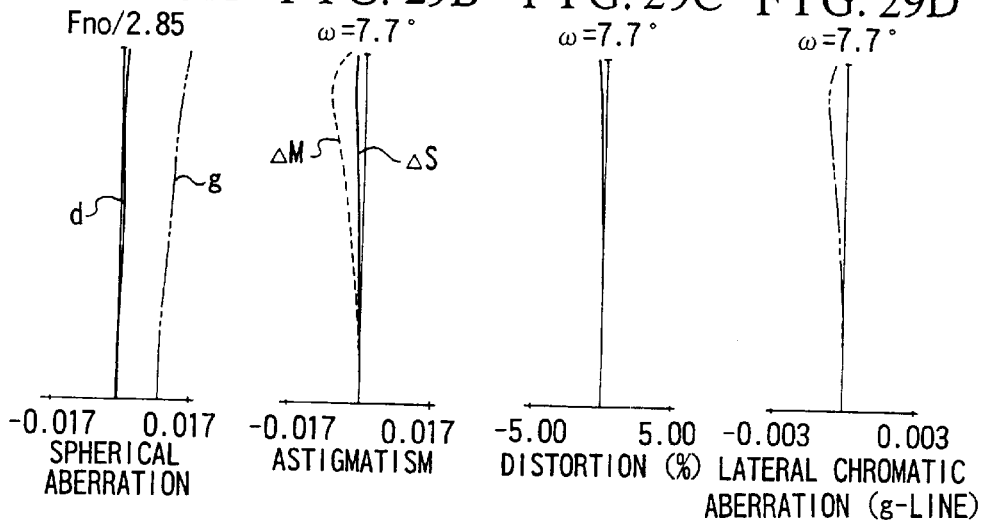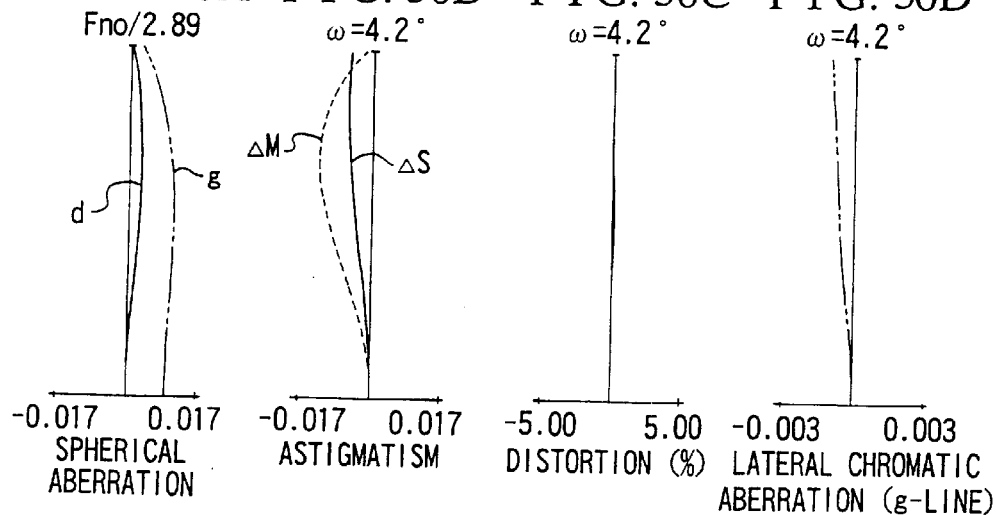

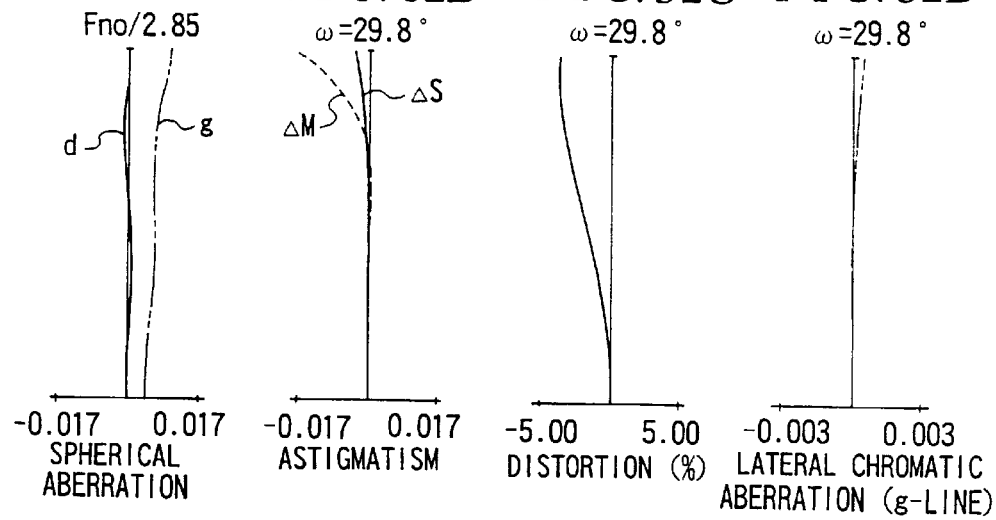
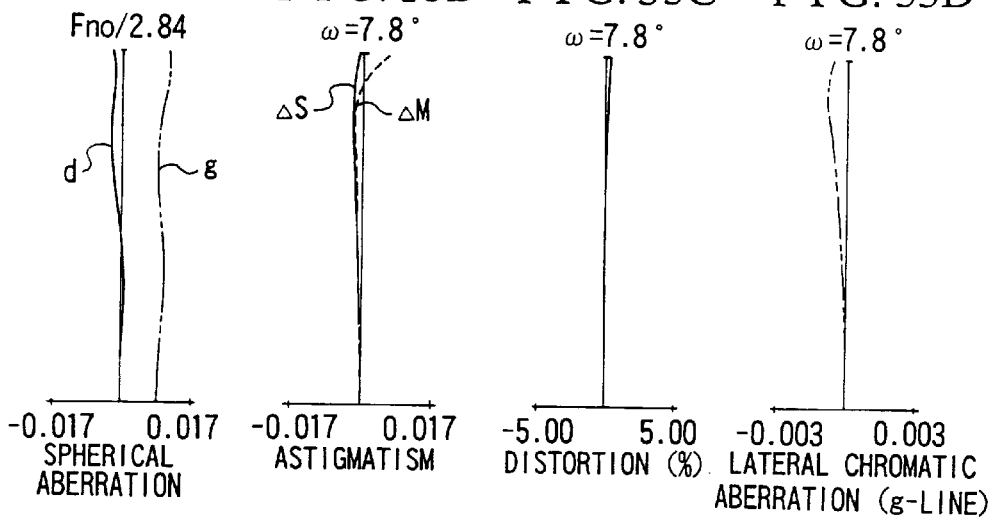
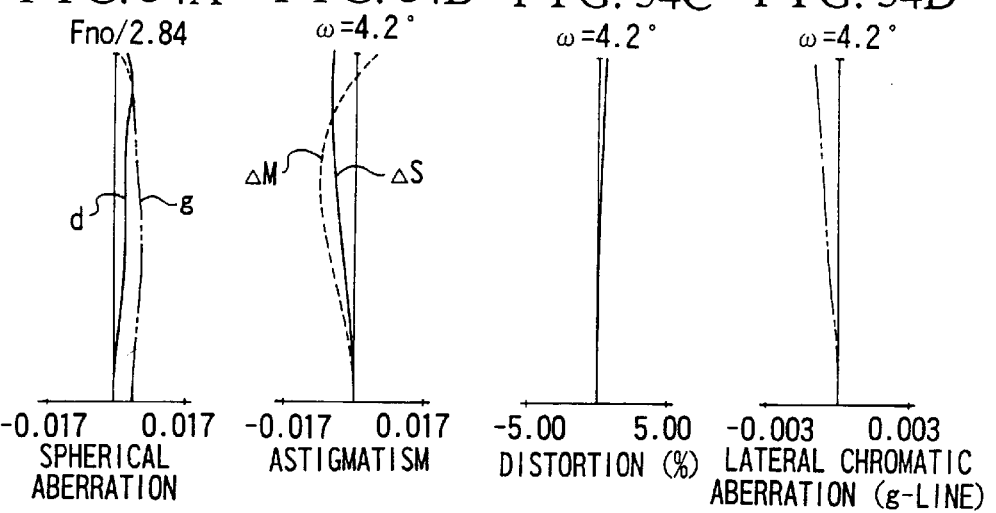

Fno/2.85

-0.017  0.017
SPHERICAL
ABERRATION

ω=29.1°

-0.017  0.017
ASTIGMATISM

ω=29.1°

-5.00  5.00
DISTORTION (%)

ω=29.1°

-0.003  0.003
LATERAL CHROMATIC
ABERRATION (g-LINE)

Fno/2.87

-0.017  0.017
SPHERICAL
ABERRATION

ω=12.0°

-0.017  0.017
ASTIGMATISM

ω=12.0°

-5.00  5.00
DISTORTION (%)

ω=12.0°

-0.003  0.003
LATERAL CHROMATIC
ABERRATION (g-LINE)

Fno/3.29

-0.017  0.017
SPHERICAL
ABERRATION

ω=4.1°

-0.017  0.017
ASTIGMATISM

ω=4.1°

-5.00  5.00
DISTORTION (%)

ω=4.1°

-0.003  0.003
LATERAL CHROMATIC
ABERRATION (g-LINE)

FIG. 41A  FIG. 41B  FIG. 41C  FIG. 41D
Fno/2.85  ω=30°  ω=30°  ω=30°
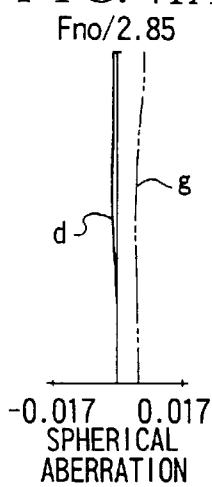
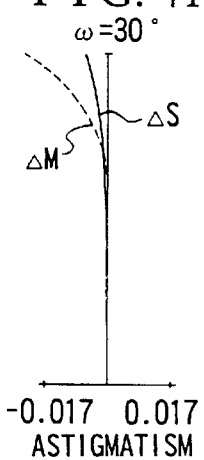
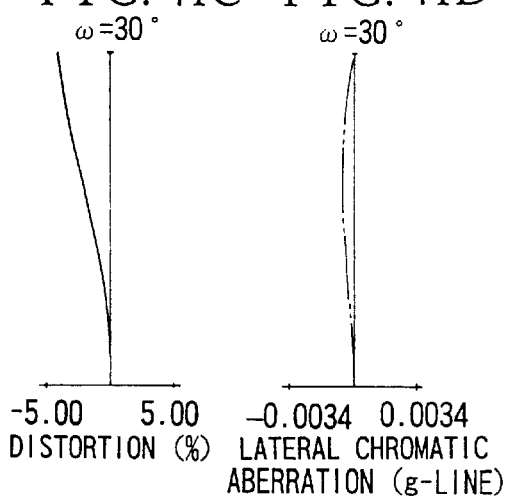
-0.017  0.017   -0.017  0.017   -5.00  5.00   -0.0034  0.0034
SPHERICAL      ASTIGMATISM     DISTORTION (%)  LATERAL CHROMATIC
ABERRATION                                     ABERRATION (g-LINE)
FIG. 42A  FIG. 42B  FIG. 42C  FIG. 42D
Fno/2.88  ω=12.3°  ω=12.3°  ω=12.3°
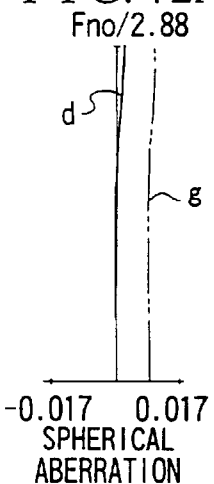
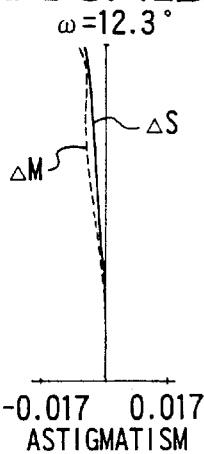
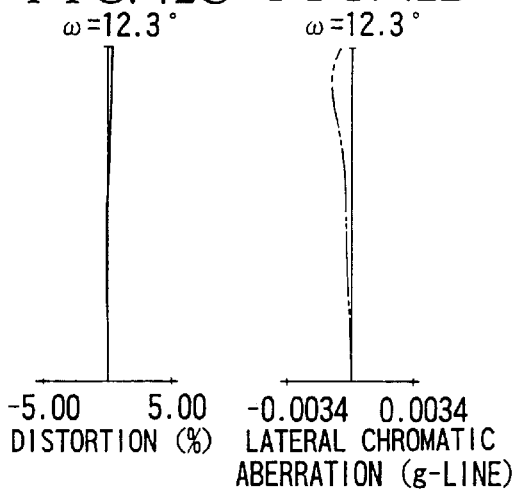
-0.017  0.017   -0.017  0.017   -5.00  5.00   -0.0034  0.0034
SPHERICAL      ASTIGMATISM     DISTORTION (%)  LATERAL CHROMATIC
ABERRATION                                     ABERRATION (g-LINE)
FIG. 43A  FIG. 43B  FIG. 43C  FIG. 43D
Fno/3.28  ω=4.2°  ω=4.2°  ω=4.2°
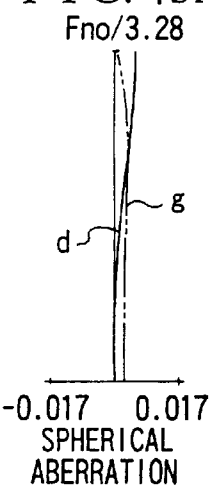
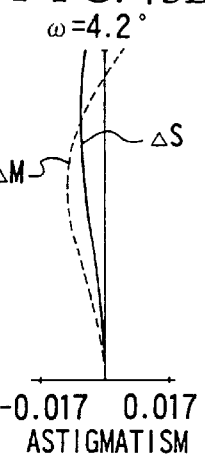
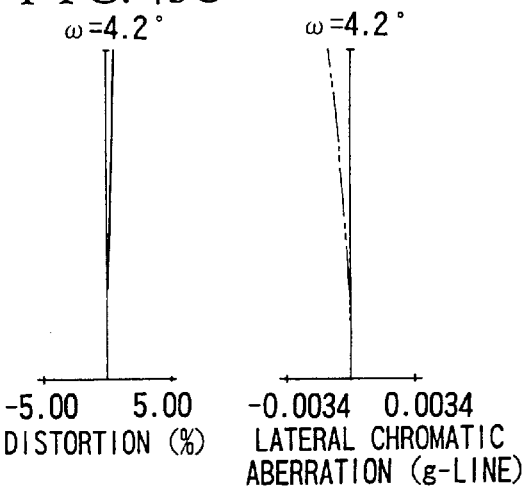
-0.017  0.017   -0.017  0.017   -5.00  5.00   -0.0034  0.0034
SPHERICAL      ASTIGMATISM     DISTORTION (%)  LATERAL CHROMATIC
ABERRATION                                     ABERRATION (g-LINE)

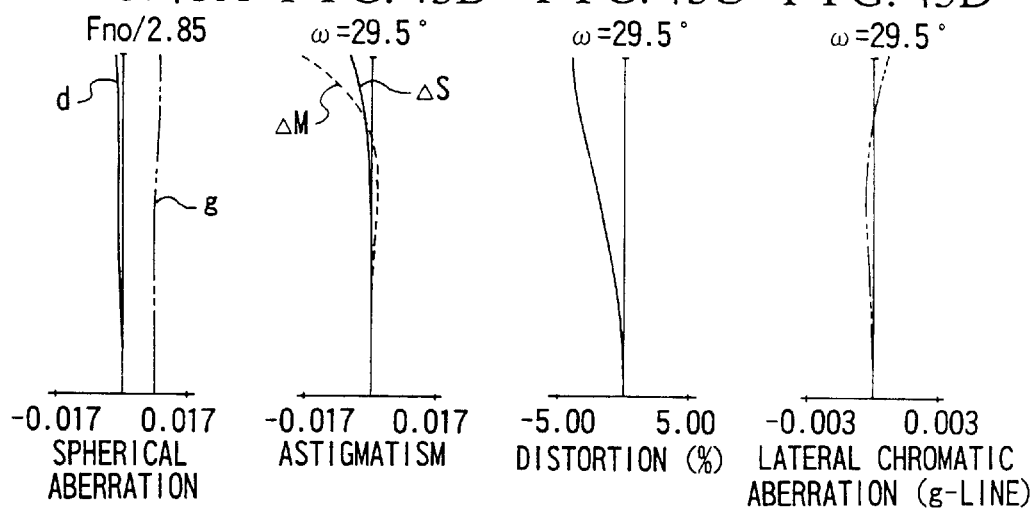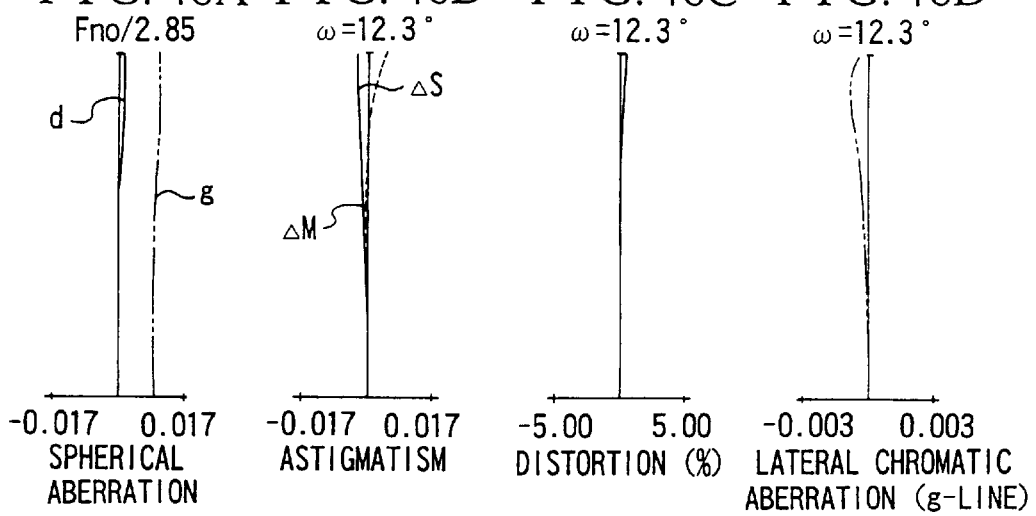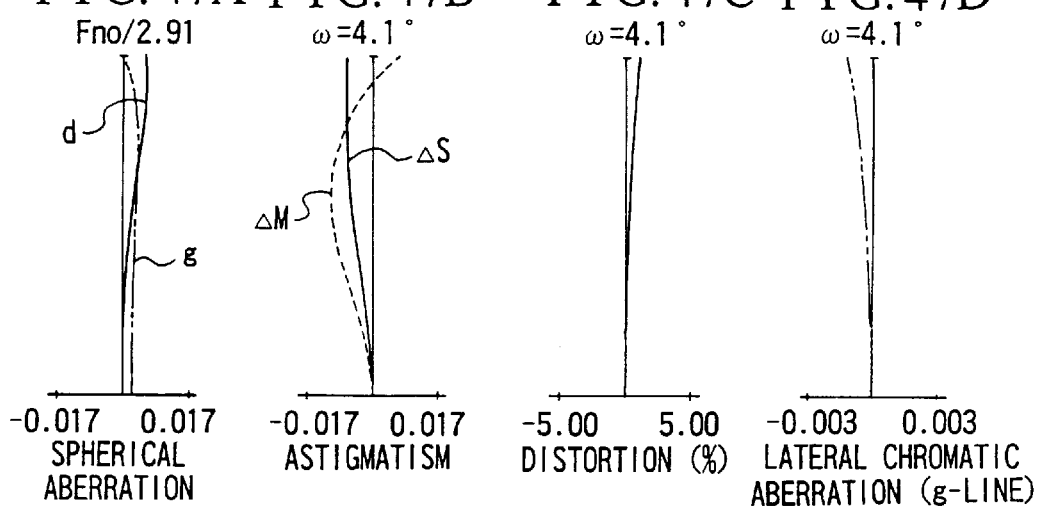

VARIABLE MAGNIFICATION OPTICAL SYSTEM AND CAMERA HAVING THE SAME

BACKGROUND OF THE INVENTION

1. Field of the Invention

The present invention relates to a variable magnification optical system, and more particularly, to a variable magnification optical system having an image stabilizing function, which is suitable for use in a video camera, a silver-halide camera, an electronic still camera, a digital camera, etc., and which is capable of stabilizing a photographed image by moving a lens unit that is a part of the variable magnification optical system in such a way as to have a component having directions perpendicular to an optical axis to optically correct shaking of the photographed image obtained when the variable magnification optical system vibrates (tilts), so as to obtain a stationary image.

2. Description of Related Art

When a photographing operation is performed from the place on a moving body, such as a running car or a flying airplane, the vibration of the moving body is propagated to a photographing system, thereby causing the so-called image shake in which shaking occurs in a photographed image.

Heretofore, there have been proposed a variety of image-stabilizing optical systems having the function of preventing shaking of a photographed image.

For example, in an image-stabilizing optical system disclosed in Japanese Laid-Open Patent Application No. Sho 56-21133, in response to an output signal of a detection means for detecting the vibration state of the optical system, an optical member that is a part of the optical system is moved in such a direction as to cancel the vibratory displacement of an image due to the vibration of the optical system, thereby stabilizing an image. In a photographic system disclosed in Japanese Laid-Open Patent Application No. Sho 61-223819 (corresponding to U.S. Pat. No. 4,927,250), in which a variable angle prism is disposed on the most object side, the apex angle of the variable angle prism is varied in correspondence with the vibration of the photographic system, thereby stabilizing an image.

In photographic systems disclosed in Japanese Laid-Open Patent Application No. Hei 1-116619 (corresponding to U.S. Pat. No. 5,270,857) and Japanese Laid-Open Patent Application No. Hei 2-124521 (corresponding to U.S. Pat. No. 5,039,211), the vibration of the photographic system is detected by utilizing an acceleration sensor or the like, and, in response to an output signal of the acceleration sensor or the like, a lens unit that is a part of the photographic system is vibrated in directions perpendicular to an optical axis, thereby obtaining a stationary image.

In addition, in a variable magnification optical system disclosed in Japanese Laid-Open Patent Application No. Hei 7-128619, which has the four-unit structure having positive, negative positive and positive lens units, the third lens unit being composed of two, positive and negative, lens subunits, the positive lens subunits of the third lens unit is vibrated to stabilize an image, i.e., to obtain a stationary image.

Further, in a variable magnification optical system disclosed in Japanese Laid-Open Patent Application No. Hei 7-199124 (corresponding to U.S. Pat. No. 5,585,966), which has the four-unit structure having positive, negative, positive and positive lens units, the whole third lens unit is vibrated to stabilize an image.

Meanwhile, in a variable magnification optical system disclosed in Japanese Laid-Open Patent Application No. Hei 5-60974, which has the four-unit structure having positive, negative, positive and positive lens units, the third lens unit is constructed into the telephoto type composed of a positive lens and a negative lens of meniscus form, thereby shortening the total length of entire optical system.

In general, according to a method in which an image-stabilizing optical system is disposed in front of a photographic system and a movable lens that is a part of the image-stabilizing optical system is vibrated to prevent shaking of a photographed image to obtain a stationary image, there is a problem that the whole apparatus including the image-stabilizing optical system and the photographic system becomes large in size and a moving mechanism for moving the movable lens becomes complicated.

Further, in an optical system in which image stabilization is performed by utilizing a variable angle prism, the amount of occurrence of decentering lateral chromatic aberration sometimes becomes large, in particular, on the long focal length side during the image stabilization.

On the other hand, in an optical system in which image stabilization is performed by parallel-decentering a lens that is a part of a photographic system in directions perpendicular to an optical axis, although there is an advantage that any additional optical system for image stabilization is not necessary, there is also a problem that a space for moving the movable lens is required and the amount of occurrence of decentering aberration during the image stabilization becomes large.

Further, in a case where image stabilization is performed by moving, in directions perpendicular to an optical axis, the whole third lens unit of a variable magnification optical system having the four-unit structure composed of four, positive, negative, positive and positive lens units, when the third lens unit is constructed into the telephoto type composed of a positive lens and a negative lens of meniscus form, there is a problem that decentering aberration, such as decentering coma or decentering curvature of field, occurs to deteriorate the image quality.

Further, optical systems each having a zoom ratio of 8 or more among the above-mentioned optical systems, although being adaptable for video cameras or the like, are insufficient for being used with electronic still cameras each having 1,000,000 pixels or thereabout, in terms of aberration correction.

BRIEF SUMMARY OF THE INVENTION

It is an object of the invention to provide a variable magnification optical system having an image stabilizing function, in which a relatively small-sized and light-weight lens unit that is a part of the variable magnification optical system is moved in such a way as to have a component having directions perpendicular to an optical axis to displace an image formed by the variable magnification optical system, thereby correcting an image shake occurring when the vibration optical system vibrates (tilts), and the construction of the lens unit for correcting an image shake is appropriately set, so that decentering aberration occurring when the lens unit is decentered is corrected well while the reduction in size of the whole apparatus, the simplification of a mechanism and the lowering of load of a driving means are attempted, and, in particular, the variable magnification optical system is adaptable for electronic still cameras each having 1,000,000 pixels or more.

To attain the above object, in accordance with an aspect of the invention, there is provided a variable magnification optical system comprising, in order from an object side to an image side, a first lens unit of positive refractive power, a second lens unit of negative refractive power arranged to move along an optical axis during variation of magnification, the second lens unit comprising, in order from the object side to the image side, a first lens (L21) of negative refractive power and of meniscus form having a concave surface facing the image side, a second lens (L22) of negative refractive power, a third lens (L23) of positive refractive power and a fourth lens (L24) of negative refractive power, a third lens unit of positive refractive power, at least a part of the third lens unit being moved in such a way as to have a component perpendicular to the optical axis to displace an image formed by the variable magnification optical system, and a fourth lens unit of positive refractive power arranged to move along the optical axis during the variation of magnification, wherein the following condition is satisfied:

$$0.05<|f2/ft|<0.07$$

where ft is a focal length of the variable magnification optical system in a telephoto end, and f2 is a focal length of the second lens unit.

In accordance with another aspect of the invention, there is provided a variable magnification optical system comprising, in order from an object side to an image side, a first lens unit of positive refractive power, a second lens unit of negative refractive power arranged to move along an optical axis during variation of magnification, a third lens unit of positive refractive power, at least a part of the third lens unit being moved in such a way as to have a component perpendicular to the optical axis to displace an image formed by the variable magnification optical system, and a fourth lens unit of positive refractive power arranged to move along the optical axis during the variation of magnification, wherein the following condition is satisfied:

$$0.42<|LS/ft|<0.59$$

where LS is a distance from a lens surface located on the most object side of the variable magnification optical system to a lens surface located on the most object side of the third lens unit, and ft is a focal length of the variable magnification optical system in a telephoto end.

In accordance with a further aspect of the invention, there is provided a variable magnification optical system comprising, in order from an object side to an image side, a first lens unit of positive refractive power, a second lens unit of negative refractive power arranged to move along an optical axis during variation of magnification, a third lens unit of positive refractive power, at least a part of the third lens unit being moved in such a way as to have a component perpendicular to the optical axis to displace an image formed by the variable magnification optical system, the third lens unit comprising, in order from the object side to the image side, a first lens (L31) of positive refractive power having a convex surface facing the object side, a second lens (L32) of negative refractive power and of meniscus form having a concave surface facing the image side, and a third lens (L33) of positive refractive power, and a fourth lens unit of positive refractive power arranged to move along the optical axis during the variation of magnification, the fourth lens unit comprising a positive lens and a negative lens.

In accordance with a still further aspect of the invention, there is provided a variable magnification optical system comprising, in order from an object side to an image side, a first lens unit of positive refractive power arranged to move along an optical axis during variation of magnification, the first lens unit having, on the most object side thereof, a negative lens of meniscus form having a concave surface facing the image side, a second lens unit of negative refractive power arranged to move along the optical axis during the variation of magnification, the second lens unit having, on the most object side thereof, a negative lens of meniscus form having a concave surface facing the image side, a third lens unit of positive refractive power, at least a part of the third lens unit being moved in such a way as to have a component perpendicular to the optical axis to displace an image formed by the variable magnification optical system, and a fourth lens unit of positive refractive power arranged to move along the optical axis during the variation of magnification, wherein the following condition is satisfied:

$$0.5<|m1/m2|<2.5$$

where m1 and m2 are amounts of movement of the first lens unit and the second lens unit, respectively, required for the variation of magnification from a wide-angle end to a telephoto end.

In accordance with a still further aspect of the invention, there is provided a variable magnification optical system comprising, in order from an object side to an image side, a first lens unit of positive refractive power arranged to move along an optical axis during variation of magnification, a second lens unit of negative refractive power arranged to move along the optical axis during the variation of magnification, an aperture stop arranged to move along the optical axis during the variation of magnification, the aperture stop varying an aperture thereof to adjust an amount of passing light, and the aperture stop being located nearer to the object side in a wide-angle end than in a telephoto end, a third lens unit of positive refractive power, at least a part of the third lens unit being moved in such a way as to have a component perpendicular to the optical axis to displace an image formed by the variable magnification optical system, and a fourth lens unit of positive refractive power arranged to move along the optical axis during the variation of magnification, wherein the following condition is satisfied:

$$0.5<|m1/m2|<2.5$$

where m1 and m2 are amounts of movement of the first Lens unit and the second lens unit, respectively, required for the variation of magnification from the wide-angle end to the telephoto end.

In accordance with a still further aspect of the invention, there is provided a camera comprising, as a photographic lens, a variable magnification optical system according to any one of the above aspects.

These and further objects and features of the invention will become apparent from the following detailed description of preferred embodiments thereof taken in conjunction with the accompanying drawings.

BRIEF DESCRIPTION OF THE SEVERAL VIEWS OF THE DRAWING

FIGS. 8A to 8D are graphs showing various aberrations of a variable magnification optical system according to a numerical example 2 in the wide-angle end.

FIGS. 9A to 9D are graphs showing various aberrations of the variable magnification optical system according to the numerical example 2 in the middle focal length position.

FIGS. 10A to 10D are graphs showing various aberrations of the variable magnification optical system according to the numerical example 2 in the telephoto end.

FIGS. 16A to 16D are graphs showing various aberrations of the variable magnification optical system according to the numerical example 4 in the wide-angle end.

FIGS. 17A to 17D are graphs showing various aberrations of the variable magnification optical system according to the numerical example 4 in the middle focal length position.

FIGS. 18A to 18D are graphs showing various aberrations of the variable magnification optical system according to the numerical example 4 in the telephoto end.

FIGS. 24A to 24D are graphs showing various aberrations of the variable magnification optical system according to the numerical example 6 in the wide-angle end.

FIGS. 25A to 25D are graphs showing various aberrations of the variable magnification optical system according to the numerical example 6 in the middle focal length position.

FIGS. 26A to 26D are graphs showing various aberrations of the variable magnification optical system according to the numerical example 6 in the telephoto end.

FIGS. 28A to 28D are graphs showing various aberrations of the variable magnification optical system according to the numerical example 7 in the wide-angle end.

FIGS. 29A to 29D are graphs showing various aberrations of the variable magnification optical system according to the numerical example 7 in the middle focal length position.

FIGS. 30A to 30D are graphs showing various aberrations of the variable magnification optical system according to the numerical example 7 in the telephoto end.

FIGS. 32A to 32D are graphs showing various aberrations of the variable magnification optical system according to the numerical example 8 in the wide-angle end.

FIGS. 33A to 33D are graphs showing various aberrations of the variable magnification optical system according to the numerical example 8 in the middle focal length position.

FIGS. 34A to 34D are graphs showing various aberrations of the variable magnification optical system according to the numerical example 8 in the telephoto end.

FIGS. 41A to 41D are graphs showing various aberrations of the variable magnification optical system according to the numerical example 10 in the wide-angle end.

FIGS. 42A to 42D are graphs showing various aberrations of the variable magnification optical system according to the numerical example 10 in the middle focal length position.

FIGS. 43A to 43D are graphs showing various aberrations of the variable magnification optical system according to the numerical example 10 in the telephoto end.

FIGS. 45A to 45D are graphs showing various aberrations of the variable magnification optical system according to the numerical example 11 in the wide-angle end.

FIGS. 46A to 46D are graphs showing various aberrations of the variable magnification optical system according to the numerical example 11 in the middle focal length position.

FIGS. 47A to 47D are graphs showing various aberrations of the variable magnification optical system according to the numerical example 11 in the telephoto end.

DETAILED DESCRIPTION OF THE INVENTION

Hereinafter, preferred embodiments of the invention will be described in detail with reference to the drawings.

First Embodiment

Figure 1:
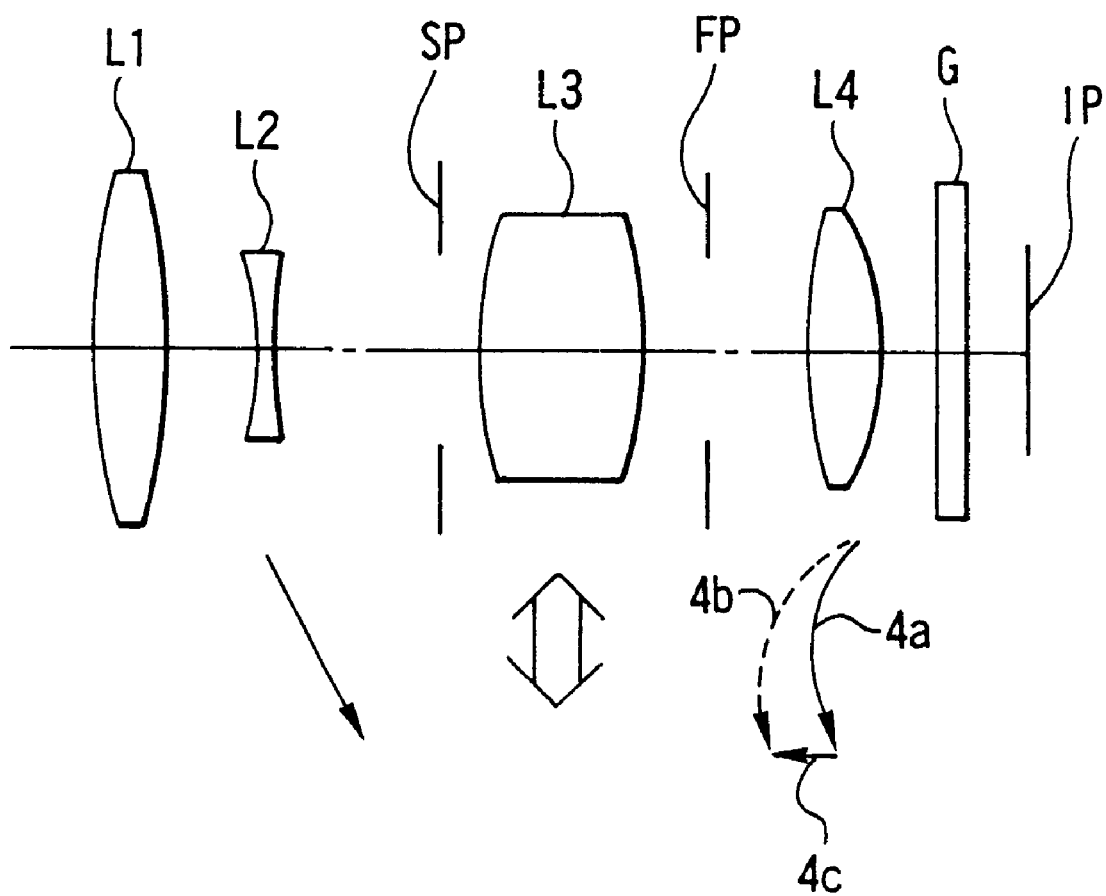
FIG. 1 is a lens block diagram showing a paraxial refractive power arrangement of a variable magnification optical system according to a first embodiment of the invention.

FIG. 1 is a lens block diagram showing a paraxial refractive power arrangement of a variable magnification optical system according to a first embodiment of the invention (corresponding to numerical examples 1 to 3 to be described later). FIGS. 2A to 2D are diagrams for explaining the optical principle of an image-stabilizing optical system. FIGS. 3A to 3D are diagrams for explaining variations of the amount of light during image stabilization. FIG. 4 is a lens sectional view of a variable magnification optical system according to the numerical example 1 in the wide-angle end.

In FIG. 1, reference character L1 denotes a first lens unit of positive refractive power, reference character L2 denotes a second lens unit of negative refractive power, and reference character L3 denotes a third lens unit of positive refractive power. In the first embodiment, the shaking of a photographed image occurring when the variable magnification optical system vibrates (tilts) is corrected by moving the third lens unit L3 in directions perpendicular to an optical axis of the variable magnification optical system to displace an image formed by the variable magnification optical system. Reference character L4 denotes a fourth lens unit of positive refractive power. Reference character SP denotes an aperture stop, which is disposed behind the second lens unit L2 and before the third lens unit L3. Reference character G denotes a glass block, such as a face plate. Reference character IP denotes an image plane. Reference character FP denotes a flare-cutting stop, which is disposed between the third lens unit L3 and the fourth lens unit L4 and is arranged to move along the optical axis according to the variation of magnification.

In the first embodiment, the variation of magnification from the wide-angle end to the telephoto end is effected by moving the second lens unit L2 toward the image side, and the shift of an image plane caused by the variation of magnification is compensated for by moving the fourth lens unit L4, as indicated by arrows shown in FIG. 1.

Further, the so-called rear focusing method in which focusing is effected by moving the fourth lens unit L4 along the optical axis is employed. A solid-line curve 4a and a dashed-line curve 4b shown in FIG. 1 represent movement loci of the fourth lens unit L4 for compensating for the shift of an image plane caused by the variation of magnification from the wide-angle end to the telephoto end when focusing is performed on an infinitely distant object and on a minimum-distance object, respectively. It is to be noted that the first lens unit L1 and the third lens unit L3 remain stationary during the variation of magnification and during focusing, i.e., do not move for the variation of magnification and for focusing.

In the first embodiment, the fourth lens unit L4 is moved to compensate for the shift of an image plane caused by the variation of magnification and the fourth lens unit L4 is also moved to effect focusing. In particular, the fourth lens unit L4 is moved in such a way as to have a locus convex toward the object side, as indicated by the curves 4a and 4b shown in FIG. 1, during the variation of magnification from the wide-angle end to the telephoto end. This arrangement makes it possible to effectively utilize a space between the third lens unit L3 and the fourth lens unit L4, thereby effectively attaining the shortening of the total length of the entire optical system.

In the first embodiment, focusing from an infinitely distant object to a minimum-distance object, for example, in the telephoto end is effected by moving the fourth lens unit L4 forward as indicated by a straight line 4c shown in FIG. 1.

In the first embodiment, by employing the above-mentioned rear focusing method, as compared with a case where focusing is effected by drawing out the first lens unit as in the conventional four-unit zoom lens, it is possible to effectively prevent the increase of a lens effective diameter of the first lens unit L1 while preventing the deterioration of performance due to a decentering error of the first lens unit L1. Then, by disposing the aperture stop SP just before the third lens unit L3, it is possible to decrease the variation of aberrations caused by the movable lens unit, and, by shortening the interval between the lens units located before the aperture stop SP, it is possible to easily attain the reduction of the lens diameter of the front lens member.

In the first embodiment, the third lens unit L3 is used for image stabilization, i.e., an image shake occurring when the variable magnification optical system vibrates is corrected by moving the third lens unit L3 in directions perpendicular to the optical axis to displace an image formed by the variable magnification optical system. By this arrangement, image stabilization can be performed without newly adding a lens unit for image stabilization or an optical member, such as a variable angle prism, as in the conventional image-stabilizing optical system.

Next, the optical principle of an image-stabilizing system for correcting the shaking of a photographed image by moving a lens unit in directions perpendicular to the optical axis in the variable magnification optical system according to the invention is described with reference to FIGS. 2A to 2D.

Figure 2A:
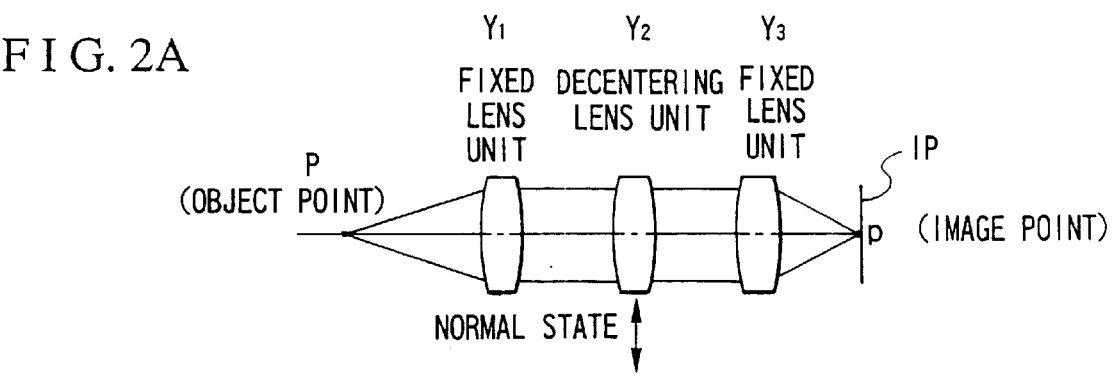
FIGS. 2A to 2D are diagrams for explaining the optical principle of an image-stabilizing optical system.

It is here assumed that, as shown in FIG. 2A, the optical system is composed of three parts, i.e., a fixed lens unit Y1, a decentering lens unit Y2 and a fixed lens unit Y3, and an object point P on the optical axis, which is sufficiently distant from the optical system, is imaged, as an image point p, on the center of an image sensing plane IP.

Figure 2B:
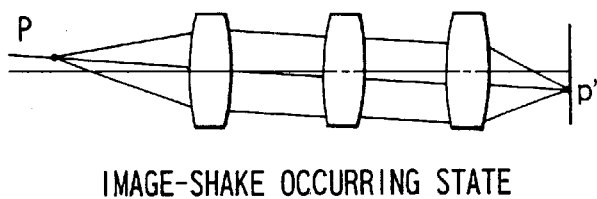

Assuming now that the whole optical system including the image sensing plane IP is made to instantaneously tilt by the vibration of the optical system, as shown in FIG. 2B, an image of the object point P also instantaneously moves to an image point p', causing an image shake.

Figure 2C:
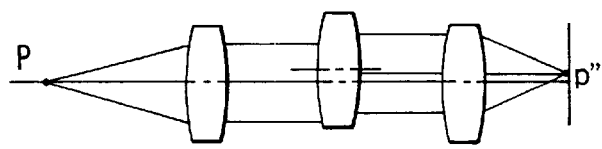

On the other hand, if the decentering lens unit Y2 is made to move in a direction perpendicular to the optical axis, as shown in FIG. 2C, the image point p moves to a point p". Then, the amount of movement and the direction of movement of the image point p depend on a power arrangement of the optical system and are represented as the decentering sensitivity of the decentering lens unit Y2.

Figure 2D:
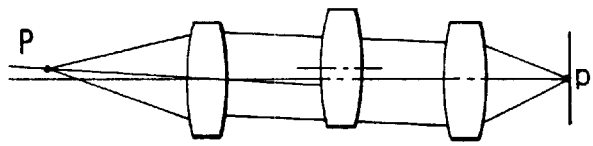

Thus, the image point p', which has shifted due to the vibration of the optical system as shown in FIG. 2B, is made to return to the original image point p by moving the decentering lens unit Y2 as much as an appropriate amount in a direction perpendicular to the optical axis, so that an image-shake correction, i.e., image stabilization, is performed as shown in FIG. 2D.

Now, when the amount of movement (shift) of the shift lens unit (decentering lens unit) Y2 required for correcting the optical axis by θ° is denoted by Δ, the focal length of the entire optical system is denoted by f, and the decentering sensitivity of the shift lens unit Y2 is denoted by TS, the amount of movement Δ is expressed by the following equation:

$$\Delta = f \cdot \tan(\theta)/TS.$$

If the decentering sensitivity TS of the shift lens unit Y2 is too large, the amount of movement Δ becomes a small value, so that the amount of movement of the shift lens unit required for image stabilization can be made small. However, such a control operation as to appropriately perform image stabilization becomes difficult, leaving an uncorrected image shake. In particular, in the case of a video camera or a digital still camera, the image size of an image sensor, such as a CCD, is small as compared with a silver-halide film, and the focal length with respect to one and the same angle of view is short. Therefore, the amount of movement A of the shift lens unit for correction by one and the same angle becomes small.

Accordingly, assuming that mechanisms have the same degree in precision, an uncorrected image shake left on the image plane would become relatively large.

On the other hand, if the decentering sensitivity TS of the shift lens unit Y2 is too small, the amount of movement of the shift lens unit Y2 required for control becomes large, so that a driving means, such as an actuator, for driving the shift lens unit Y2 also becomes large.

According to the first embodiment, by appropriately setting a refractive power arrangement of each lens unit, the decentering sensitivity of the third lens unit L3 is set to an appropriate value, so as to attain an optical system in which an uncorrected image shake left due to the control error of a mechanism is small and the load of a driving means, such as an actuator, is also small.

Meanwhile, when image stabilization is performed by shifting (moving) a lens unit included within an optical system in directions perpendicular to an optical axis, the asymmetry of a distribution of the amount of marginal light occurs with regard to the direction of shift. Therefore, since, during the process of taking a moving image, the direction of the vibration of the optical system temporally changes, the amount of marginal light also temporally changes, thereby causing flicker at the marginal portion of an image plane.

This phenomenon is explained below with reference to FIGS. 3A to 3D.

Figure 3A:
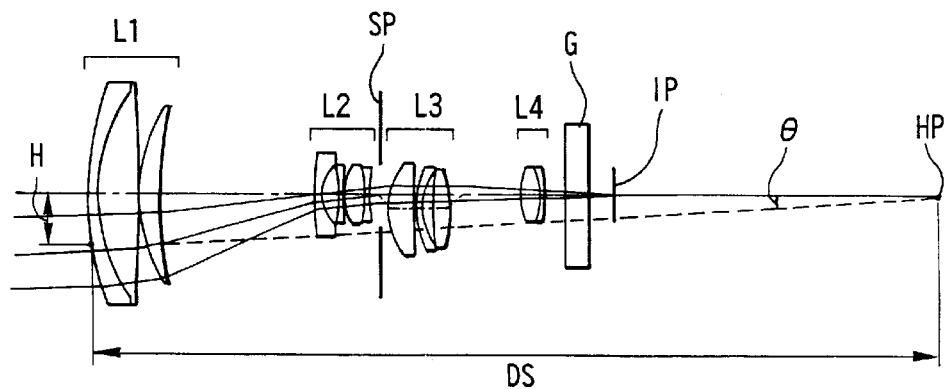
FIGS. 3A to 3D are diagrams for explaining variations of the amount of light during image stabilization.
Figure 4:
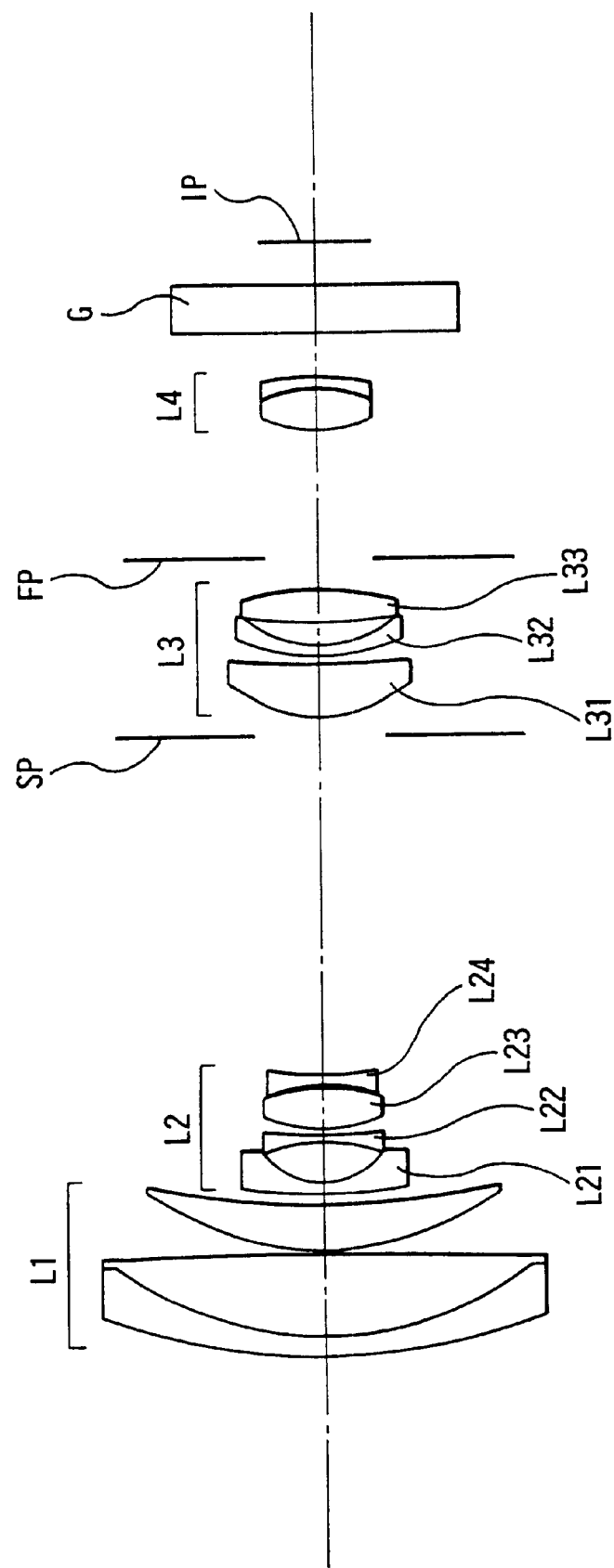
FIG. 4 is a lens sectional view of a variable magnification optical system according to a numerical example 1 in the wide-angle end.
Figure 5A:
FIGS. 5A to 5D are graphs showing various aberrations of the variable magnification optical system according to the numerical example 1 in the wide-angle end.
Figure 5B:
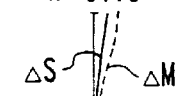
Figure 5C:
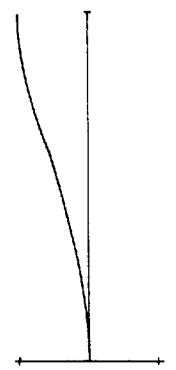
Figure 5D:
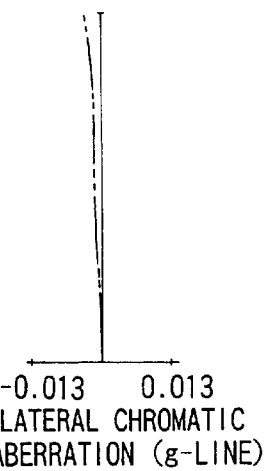
Figure 6A:
FIGS. 6A to 6D are graphs showing various aberrations of the variable magnification optical system according to the numerical example 1 in the middle focal length position.
Figure 6B:
Figure 6C:
Figure 6D:
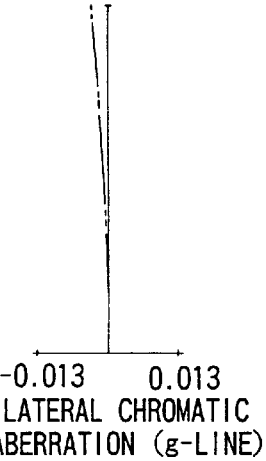
Figure 7A:
FIGS. 7A to 7D are graphs showing various aberrations of the variable magnification optical system according to the numerical example 1 in the telephoto end.
Figure 7B:
Figure 7C:
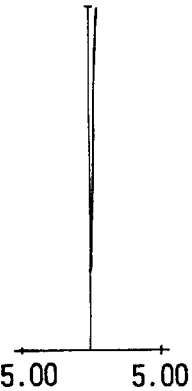
Figure 7D:
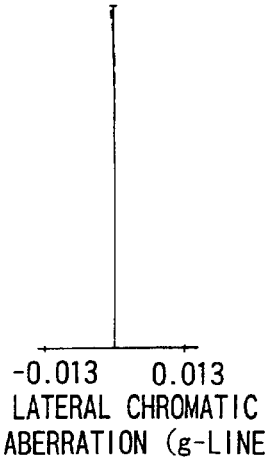
Figure 11A:
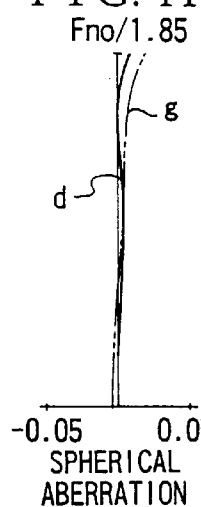
FIGS. 11A to 11D are graphs showing various aberrations of a variable magnification optical system according to a numerical example 3 in the wide-angle end.
Figure 11B:
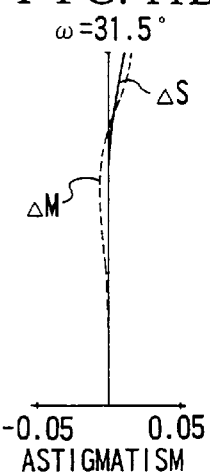
Figure 11C:
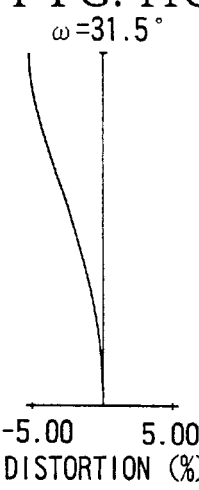
Figure 11D:
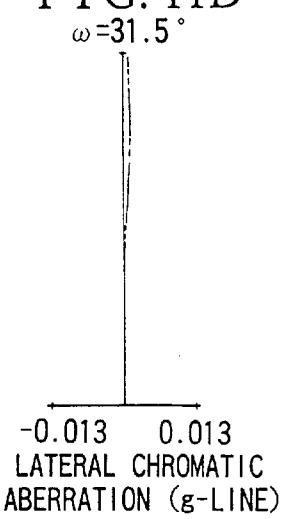
Figure 12A:
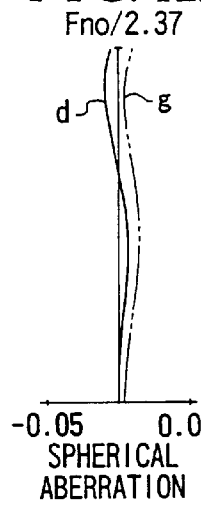
FIGS. 12A to 12D are graphs showing various aberrations of the variable magnification optical system according to the numerical example 3 in the middle focal length position.
Figure 12B:
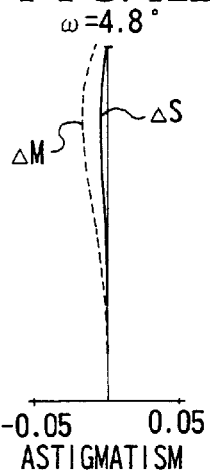
Figure 12C:
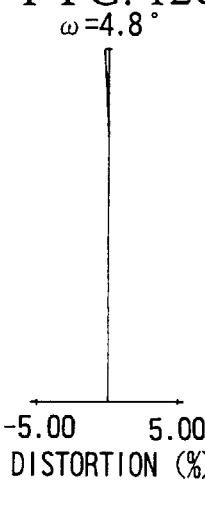
Figure 12D:
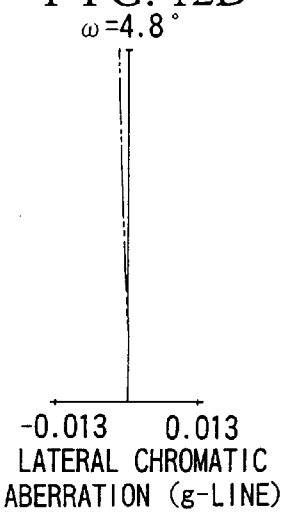
Figure 13A:
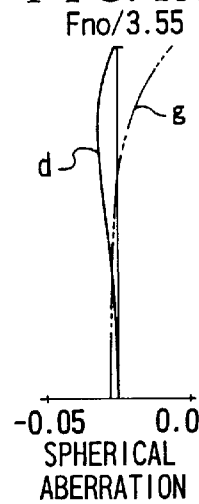
FIGS. 13A to 13D are graphs showing various aberrations of the variable magnification optical system according to the numerical example 3 in the telephoto end.
Figure 13B:
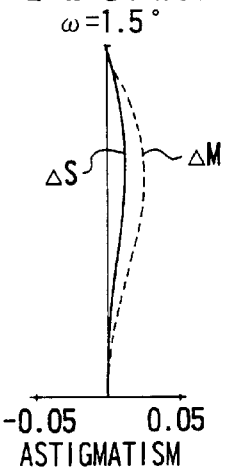
Figure 13C:
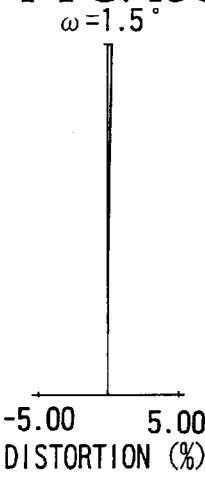
Figure 13D:
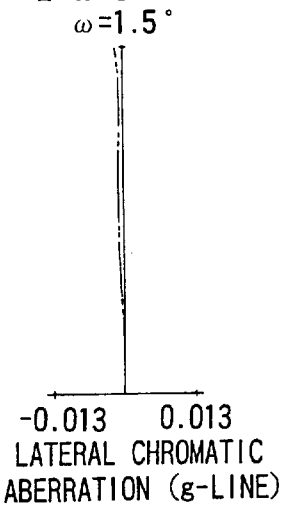

When an angle by which the optical axis is to be corrected is denoted by θ, and a distance from an image HP of a correction lens (third lens unit) L3 formed by optical elements located nearer to the object side than the correction lens L3 to a lens surface located on the most object side of an optical system is denoted by DS, an amount of shifting H of a light ray on the lens surface located on the most object side of the optical system is expressed, as shown in FIG. 3A, by the following equation:

$$H = DS \cdot \tan \theta.$$

Figure 3B:
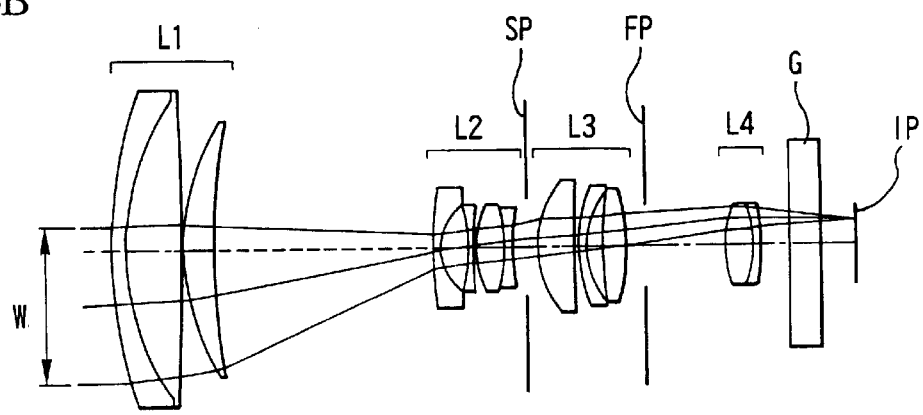
Figure 3C:
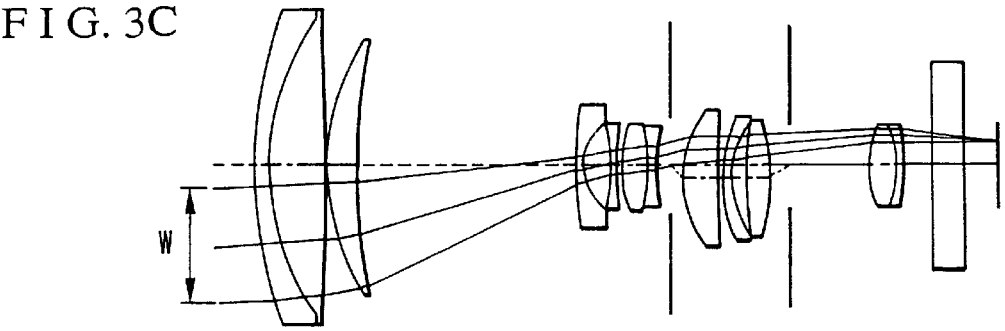
Figure 3D:
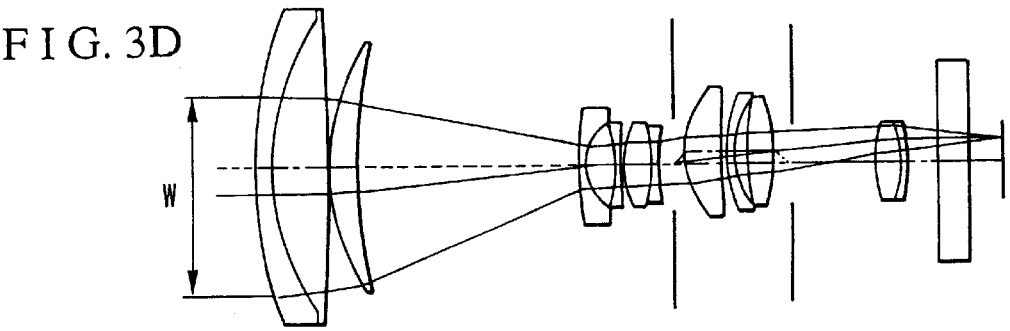

FIGS. 3B, 3C and 3D show changes in the amount of marginal light during the process of image stabilization. FIG. 3B corresponds to the normal state, FIG. 3C corresponds to a correction state at the time when the optical system turns downward, and FIG. 3C corresponds to a correction state at the time when the optical system turns upward. In the correction states shown in FIGS. 3C and 3D, the amount of light changes because a width W of a flux of light rays changes. The amount of such a change becomes larger as the amount of shifting H of a central ray passing through the first lens surface is larger.

Accordingly, in order to reduce the change of the amount of light, the distance DS has to be decreased by shortening the distance from the first lens surface to the third lens unit L3.

For that purpose, it is necessary to reduce the amount of movement of the second lens unit L2 required for the variation of magnification, by strengthening a refractive power of the second lens unit L2.

Therefore, according to the first embodiment, the amount of movement of the second lens unit L2 required for the variation of magnification is reduced by setting the relation between the focal length f2 of the second lens unit L2 and the focal length ft of the entire optical system in the telephoto end so as to satisfy the following condition:

$$0.05 < |f2/ft| < 0.07 \tag{1}$$

If the refractive power of the second lens unit L2 is strengthened beyond the lower limit of the condition (1), although the amount of movement of the second lens unit L2 during the variation of magnification is reduced, the Petzval sum becomes large in the negative direction as a whole, thereby disadvantageously making it difficult to correct the curvature of field. Conversely, if the upper limit of the condition (1) is exceeded, the amount of movement of the second lens unit L2 during the variation of magnification becomes large, thereby preventing the whole lens system from being reduced in size, and also causing a disadvantage in respect of the change of the amount of marginal light during image stabilization.

If the optical system is made to have a high variable magnification ratio of 20 or more under the satisfaction of the condition (1), it becomes difficult to correct lateral chromatic aberration caused by the variation of magnification.

Further, according to the first embodiment, the second lens unit L2 comprises, in order from the object side to the image side, a negative first lens L21 of meniscus form having a strong concave surface facing the image side, a negative second lens L22, a positive third lens L23, and a negative fourth lens L24, so that the symmetry of optical elements located before and behind the second lens unit L2 is made small, thereby heightening an achromatic effect of the principal point and effectively correcting lateral chromatic aberration.

Further, according to the first embodiment, it is preferred to satisfy the following condition:

$$1.2 < |f24/f2| < 2.5 \tag{2}$$

where f24 is a focal length of the fourth lens L24 of the second lens unit L2.

The condition (2) is provided mainly for effectively correcting lateral chromatic aberration. f the focal length of the fourth lens L24 becomes too small beyond the upper limit of the condition (2), the effect of correction of chromatic aberration becomes insufficient. Conversely, if the lower limit of the condition (2) is exceeded, it becomes difficult to correct distortion at the wide-angle end.

Further, according to the first embodiment, in order to reduce the change of the amount of marginal light during the variation of magnification, the following condition is satisfied:

$$0.42<|LS/ft|<0.59 \quad (3)$$

where LS is a distance from a lens surface located on the most object side of the photographic system (variable magnification optical system) to a lens surface located on the most object side of a portion of the third lens unit L3 arranged to move in directions perpendicular to the optical axis to perform image stabilization, and ft is a focal length of the entire optical system in the telephoto end.

If the upper limit of the condition (3) is exceeded, the change of the amount of light during image stabilization becomes apt to be conspicuous when the variable magnification optical system has a high variable magnification ratio. Conversely, if the lower limit of the condition (3) is exceeded, the necessity of strengthening a refractive power of the second lens unit L2 arises, making it difficult to correct the variation of aberrations during the variation of magnification.

Incidentally, when the condition (1) and the condition (3) are simultaneously satisfied, it is possible to correct better the variation of aberrations during image stabilization.

While a variable magnification optical system having an image-stabilizing function according to the first embodiment can be realized by satisfying the above-mentioned conditions, in order to attain good optical performance while further shortening the total length of the optical system, it is desirable to satisfy at least one of the following conditions.

(a-1) The third lens unit L3 comprises, in order from the object side to the image side, a positive first lens L31, and a negative second lens L32 of meniscus form having a strong concave surface facing the image side.

(a-2) The third lens unit L3 comprises, in order from the object side to the image side, a positive first lens L31, a negative second lens L32 of meniscus form having a strong concave surface facing the image side, and a positive third lens L33.

By disposing, within the third lens unit L3, a negative lens of meniscus form having a strong concave surface facing the image side, the whole third lens unit L3 is formed into the telephoto structure, so that the principal point interval of the second lens unit L2 and the third lens unit L3 is shortened to attain the shortening of the total length of the optical system.

In a case where such a negative lens of meniscus form is disposed, positive distortion is caused to occur by a lens surface of the negative lens, which becomes the cause that decentering distortion becomes large during image stabilization. In order to reduce this phenomenon, it is necessary to lessen distortion which is caused to occur by the whole third lens unit L3.

In the first embodiment, the positive third lens L33 is disposed on the image side of the negative second lens L32 of meniscus form, so that, while keeping the telephoto structure to a certain degree, distortion is corrected within the third lens unit L3, thereby reducing the occurrence of decentering distortion which occurs when image stabilization is performed by shifting the third lens unit L3.

(a-3) Lens surfaces on both sides of the first lens L31 of the third lens unit L3 are respectively formed in aspheric shapes.

By respectively providing aspheric surfaces onto lens surfaces on both sides of the first lens L31, spherical aberration is suppressed at the third lens unit L3, and decentering coma which occurs during image stabilization is decreased.

(a-4) The following condition is satisfied:

$$1.2<|f32/f3|<1.8 \quad (4)$$

where f32 is a focal length of the second lens L32 of the third lens unit L3, and f3 is a focal length of the whole third lens unit L3.

The condition (4) is provided for attaining the reduction in size of the whole optical system by setting the third lens unit L3 into the telephoto type.

If the refractive power of the second lens L32 of the third lens unit L3 becomes strong beyond the lower limit of the condition (4), although there is an advantage in shortening of the total length of the optical system, the Petzval sum increases in the negative direction, disadvantageously making it difficult to correct the curvature of field. Conversely, if the upper limit of the condition (4) is exceeded, the shortening of the total length of the optical system becomes insufficient.

(a-5) Since the appropriate setting of the decentering sensitivity of the shift lens unit for image stabilization has a great influence on the performance of image stabilization, it is preferred to satisfy the following condition:

$$3.5<f3/fw<5.5 \quad (5)$$

where fw is a focal length of the entire optical system in the wide-angle end, and f3 is a focal length of the third lens unit L3. This arrangement makes it possible to set the decentering sensitivity of the shift lens unit to an appropriate value while attempting to reduce the total length of the optical system.

If the refractive power of the third lens unit L3 is strengthened beyond the lower limit of the condition (5), the decentering sensitivity of the shift lens unit becomes too large, so that an uncorrected image shake left during image stabilization would disadvantageously become large unless the accuracy of a mechanism is made severely high.

Conversely, if the refractive power of the third lens unit L3 is weakened beyond the upper limit of the condition (5), the amount of shifting of the third lens unit L3 required for image stabilization disadvantageously becomes large, or the total length of the optical system disadvantageously becomes large.

(a-6) In order to keep good optical performance during image stabilization by correcting distortion and astigmatism within the third lens unit L3 while keeping the telephoto structure of the third lens unit L3, it is desirable to satisfy the following condition:

$$1.2<f33/f3<2.0 \quad (6)$$

where f33 is a focal length of the third lens L33 of the third lens unit L3, and f3 is a focal length of the third lens unit L3.

If the refractive power of the third lens L33 becomes too large beyond the lower limit of the condition (6), the telephoto structure of the third lens unit L3 fails to be kept, so that the effect of shortening the total length of the optical system is disadvantageously lost. Conversely, if the upper limit of the condition (6) is exceeded, the correction of distortion and astigmatism within the third lens unit L3 becomes insufficient, causing optical performance during image stabilization to deteriorate.

(a-7) In order to attain the reduction in the variation of the amount of light during image stabilization, it is preferred to relatively increase the amount of marginal light by reducing the aperture diameter of the stop on the telephoto side during the variation of magnification so as to limit a central light flux.

(a-8) It is preferred to introduce an aspheric surface to the second lens unit L2 for the purpose of correcting astigmatism and distortion during the variation of magnification.

(a-9) It is necessary to make the lens diameter of the third lens unit L3 larger as much as the amount of movement for image stabilization.

Accordingly, in order to prevent the incidence of an extra on-axial light flux, it is desirable to dispose a fixed stop on the object side or the image side of the third lens unit L3. In the first embodiment, the fixed stop is disposed between the third lens unit L3 and the fourth lens unit L4, so that it is possible to effectively utilize a space and to prevent the incidence of an unnecessary light flux.

Next, numerical data of the numerical examples 1 to 3 are shown. In the numerical data of the numerical examples 1 to 3, Ri denotes the radius of curvature of the i-th surface, when counted from the object side, Di denotes the interval between the i-th surface and the (i+1)th surface, when counted from the object side, and Ni and vi respectively denote the refractive index and Abbe number of the material of the i-th optical member, when counted from the object side. Further, the values of the factors in the above conditions (1) to (6) for the numerical examples 1 to 3 are listed in Table-1.

The shape of an aspheric surface is expressed in the coordinates with an X axis in the optical axis direction and a Y axis in the direction perpendicular to the optical axis, the direction in which light advances being taken as positive, by the following equation:

$$X = \frac{(1/R)H^2}{1+\sqrt{1-(H/R)^2}} + AH^2 + BH^4 + CH^6 + DH^8 + EH^{10}$$

where R is the radius of osculating sphere, and A, B, C, D and E are aspheric coefficients.

Further, for example, the indication of "e-OX" means "$10^{-X}$".

Further, the aberration diagrams in the wide-angle end, in the middle focal length position and in the telephoto end of the variable magnification optical system according to the numerical example 1 are shown in FIGS. 5A to 5D through FIGS. 7A to 7D, respectively. The aberration diagrams in the wide-angle end, in the middle focal length position and in the telephoto end of the variable magnification optical system according to the numerical example 2 are shown in FIGS. 8A to 8D through FIGS. 10A to 10D, respectively. The aberration diagrams in the wide-angle end, in the middle focal length position and in the telephoto end of the variable magnification optical system according to the numerical example 3 are shown in FIGS. 11A to 11D through FIGS. 13A to 13D, respectively.

Numerical Example 1:

f = 1–20.59    Fno = 1.85–3.17    2ω = 63.0°–3.4°

| | | | | | | | |
|---|---|---|---|---|---|---|---|
| R 1 = | 11.517 | D 1 = | 0.35 | N 1 = | 1.846660 | ν 1 = | 23.8 |
| R 2 = | 6.297 | D 2 = | 1.43 | N 2 = | 1.603112 | ν 2 = | 60.6 |
| R 3 = | −92.841 | D 3 = | 0.05 | | | | |
| R 4 = | 5.730 | D 4 = | 0.75 | N 3 = | 1.696797 | ν 3 = | 55.5 |
| R 5 = | 15.090 | D 5 = | Variable | | | | |
| R 6 = | 9.859 | D 6 = | 0.20 | N 4 = | 1.834000 | ν 4 = | 37.2 |
| R 7 = | 1.328 | D 7 = | 0.68 | | | | |
| R 8 = | 13.880 | D 8 = | 0.17 | N 5 = | 1.834807 | ν 5 = | 42.7 |
| R 9 = | 15.420 | D 9 = | 0.07 | | | | |
| R10 = | 2.620 | D10 = | 0.69 | N 6 = | 1.846660 | ν 6 = | 23.8 |
| R11 = | −4.562 | D11 = | 0.04 | | | | |
| R12 = | −3.405 | D12 = | 0.17 | N 7 = | 1.804000 | ν 7 = | 46.6 |
| R13 = | 5.388 | D13 = | Variable | | | | |
| R14 = | Stop | D14 = | 0.30 | | | | |
| R15 = | 2.335* | D15 = | 0.93 | N 8 = | 1.583126 | ν 8 = | 59.4 |
| R16 = | 25.000* | D16 = | 0.10 | | | | |
| R17 = | 3.731 | D17 = | 0.20 | N 9 = | 1.846660 | ν 9 = | 23.8 |
| R18 = | 2.179 | D18 = | 0.40 | | | | |
| R19 = | 8.449 | D19 = | 0.57 | N10 = | 1.516330 | ν10 = | 64.1 |
| R20 = | −5.658 | D20 = | 0.50 | | | | |
| R21 = | Fixed Stop | D21 = | Variable | | | | |
| R22 = | 3.043 | D22 = | 0.70 | N11 = | 1.516330 | ν11 = | 64.1 |
| R23 = | −2.736 | D23 = | 0.17 | N12 = | 1.805181 | ν12 = | 25.4 |
| R24 = | −5.522 | D24 = | 0.75 | | | | |
| R25 = | ∞ | D25 = | 0.82 | N13 = | 1.516330 | ν13 = | 64.2 |
| R26 = | ∞ | | | | | | |

*: Aspheric Surface

| Variable Separation | Focal Length | | |
|---|---|---|---|
| | 1.00 | 6.15 | 20.59 |
| D 5 | 0.18 | 4.44 | 5.65 |
| D13 | 5.83 | 1.56 | 0.36 |
| D21 | 2.17 | 0.65 | 2.44 |

Aspheric Coefficients:

| | | | | | | | |
|---|---|---|---|---|---|---|---|
| R15 | A = | −3.75970e+00 | B = | 3.18486e−02 | C = | −4.89959e−03 | |
| | D = | −1.95138e−03 | E = | 1.32137e−03 | | | |
| R16 | A = | −1.05769e+02 | B = | 7.80185e−03 | C = | −3.81520e−03 | |
| | D = | 0.00000e+00 | E = | 0.00000e+00 | | | |

-continued

Numerical Example 2:

f = 1–22.55    Fno = 1.85–3.98    2ω = 63.0°–3.1°

| | | | | | | | |
|---|---|---|---|---|---|---|---|
| R 1 = | 12.297 | D 1 = | 0.38 | N 1 = | 1.846660 | ν 1 = | 23.8 |
| R 2 = | 6.682 | D 2 = | 1.52 | N 2 = | 1.603112 | ν 2 = | 60.6 |
| R 3 = | −120.232 | D 3 = | 0.05 | | | | |
| R 4 = | 6.114 | D 4 = | 0.88 | N 3 = | 1.696797 | ν 3 = | 55.5 |
| R 5 = | 16.311 | D 5 = | Variable | | | | |
| R 6 = | 12.864 | D 6 = | 0.20 | N 4 = | 1.834000 | ν 4 = | 37.2 |
| R 7 = | 1.344 | D 7 = | 0.74 | | | | |
| R 8 = | 3.873* | D 8 = | 0.20 | N 5 = | 1.814740 | ν 5 = | 37.0 |
| R 9 = | −75.000 | D 9 = | 0.07 | | | | |
| R10 = | 2.319 | D10 = | 0.70 | N 6 = | 1.846660 | ν 6 = | 23.8 |
| R11 = | −3.711 | D11 = | 0.04 | | | | |
| R12 = | −3.139 | D12 = | 0.17 | N 7 = | 1.806098 | ν 7 = | 40.9 |
| R13 = | 3.131 | D13 = | Variable | | | | |
| R14 = | Stop | D14 = | 0.38 | | | | |
| R15 = | 2.489* | D15 = | 0.85 | N 8 = | 1.583126 | ν 8 = | 59.4 |
| R16 = | 25.305* | D16 = | 0.10 | | | | |
| R17 = | 5.216 | D17 = | 0.20 | N 9 = | 1.846660 | ν 9 = | 23.8 |
| R18 = | 2.738 | D18 = | 0.33 | | | | |
| R19 = | 12.789 | D19 = | 0.55 | N10 = | 1.516330 | ν10 = | 64.1 |
| R20 = | −4.292 | D20 = | 0.50 | | | | |
| R21 = | Fixed Stop | D21 = | Variable | | | | |
| R22 = | 3.060 | D22 = | 0.70 | N11 = | 1.516330 | ν11 = | 64.1 |
| R23 = | −2.829 | D23 = | 0.17 | N12 = | 1.846660 | ν12 = | 23.8 |
| R24 = | −5.411 | D24 = | 0.75 | | | | |
| R25 = | ∞ | D25 = | 0.82 | N13 = | 1.516330 | ν13 = | 64.2 |
| R26 = | ∞ | | | | | | |

*: Aspheric Surface

| Variable Separation | Focal Length | | |
|---|---|---|---|
| | 1.00 | 6.08 | 22.55 |
| D 5 | 0.18 | 4.78 | 6.08 |
| D13 | 6.25 | 1.65 | 0.35 |
| D21 | 2.79 | 1.17 | 3.07 |

Aspheric Coefficients:

| | | | | | | | |
|---|---|---|---|---|---|---|---|
| R 8 | A = | 2.64239e+00 | B = | 6.73912e−03 | C = | | 2.62124e−04 |
| | D = | 3.71477e−03 | E = | 0.00000e+00 | | | |
| R15 | A = | −3.31127e+00 | B = | 2.18668e−02 | C = | | −1.38403e−03 |
| | D = | −1.75691e−03 | E = | 1.28774e−03 | | | |
| R16 | A = | 4.00000e+01 | B = | 5.94845e−03 | C = | | −1.05613e−04 |
| | D = | 0.00000e+00 | E = | 0.00000e+00 | | | |

Numerical Example 3:

f = 1–22.34    Fno = 1.85–3.55    2ω = 63.0°–3.1°

| | | | | | | | |
|---|---|---|---|---|---|---|---|
| R 1 = | 11.948 | D 1 = | 0.35 | N 1 = | 1.846660 | ν 1 = | 23.8 |
| R 2 = | 6.382 | D 2 = | 1.43 | N 2 = | 1.603112 | ν 2 = | 60.6 |
| R 3 = | −87.012 | D 3 = | 0.05 | | | | |
| R 4 = | 5.919 | D 4 = | 0.75 | N 3 = | 1.696797 | ν 3 = | 55.5 |
| R 5 = | 16.039 | D 5 = | Variable | | | | |
| R 6 = | 11.021 | D 6 = | 0.20 | N 4 = | 1.834000 | ν 4 = | 37.2 |
| R 7 = | 1.300 | D 7 = | 0.67 | | | | |
| R 8 = | −3.802 | D 8 = | −0.17 | N 5 = | 1.834807 | ν 5 = | 42.7 |
| R 9 = | 13.482 | D 9 = | 0.07 | | | | |
| R10 = | 2.600 | D10 = | 0.69 | N 6 = | 1.846660 | ν 6 = | 23.8 |
| R11 = | −3.471 | D11 = | 0.04 | | | | |
| R12 = | −3.006 | D12 = | 0.17 | N 7 = | 1.804000 | ν 7 = | 46.6 |
| R13 = | 5.101 | D13 = | Variable | | | | |
| R14 = | Stop | D14 = | 0.25 | | | | |
| R15 = | 2.375* | D15 = | 1.07 | N 8 = | 1.583126 | ν 8 = | 59.4 |
| R16 = | 25.150* | D16 = | 0.05 | | | | |
| R17 = | 3.556 | D17 = | 0.20 | N 9 = | 1.846660 | ν 9 = | 23.8 |
| R18 = | 2.148 | D18 = | 0.42 | | | | |
| R19 = | 8.588 | D19 = | 0.57 | N10 = | 1.516330 | ν10 = | 64.1 |
| R20 = | −8.185 | D20 = | 0.37 | | | | |
| R21 = | Fixed Stop | D21 = | Variable | | | | |
| R22 = | 3.393 | D22 = | 0.70 | N11 = | 1.516330 | ν11 = | 64.1 |
| R23 = | −2.437 | D23 = | 0.17 | N12 = | 1.805181 | ν12 = | 25.4 |
| R24 = | −4.575 | D24 = | 0.75 | | | | |

-continued

| R25 = | ∞ | D25 = | 0.82 | N13 = | 1.516330 | v13 = | 64.2 |
|---|---|---|---|---|---|---|---|
| R26 = | ∞ | | | | | | |

*: Aspheric Surface

| Variable Separation | Focal Length | | |
|---|---|---|---|
| | 1.00 | 6.08 | 22.55 |
| D 5 | 0.17 | 4.66 | 5.93 |
| D13 | 6.10 | 1.61 | 0.35 |
| D21 | 2.29 | 0.53 | 2.46 |

Aspheric Coefficients:

| R15 | A = | −3.44285e+00 | B = | 2.91925e−02 | C = | −4.87054e−03 |
|---|---|---|---|---|---|---|
| | D = | −1.33859e−03 | E = | 1.43602e−03 | | |
| R16 | A = | −8.39783e+00 | B = | 8.77241e−03 | C = | −6.49371e−03 |
| | D = | 2.03005e−03 | E = | 0.00000e+00 | | |

TABLE 1

| | Numerical Example | | |
|---|---|---|---|
| Condition | 1 | 2 | 3 |
| (1) |f2/ft| | 0.063 | 0.060 | 0.058 |
| (2) |f24/f2| | 1.960 | 1.423 | 1.793 |
| (3) |LS/ft| | 0.529 | 0.521 | 0.498 |
| (4) |f32/f3| | 1.449 | 1.559 | 1.383 |
| (5) f3/fw | 4.537 | 4.534 | 4.957 |
| (6) f33/f3 | 1.467 | 1.388 | 1.657 |

As has been described above, according to the first embodiment, it is possible to attain a variable magnification optical system having an image stabilizing function, in which a relatively small-sized and light-weight lens unit that is a part of the variable magnification optical system is moved in such a way as to have a component having directions perpendicular to an optical axis to displace an image formed by the variable magnification optical system, thereby correcting an image shake occurring when the vibration optical system vibrates (tilts), so that the amount of decentering aberration occurring when the lens unit is decentered is suppressed to a minimum, and the decentering aberration is corrected well, while the reduction in size of the whole apparatus, the simplification of a mechanism and the lowering of load of a driving means are attempted.

Second Embodiment

Figure 14:
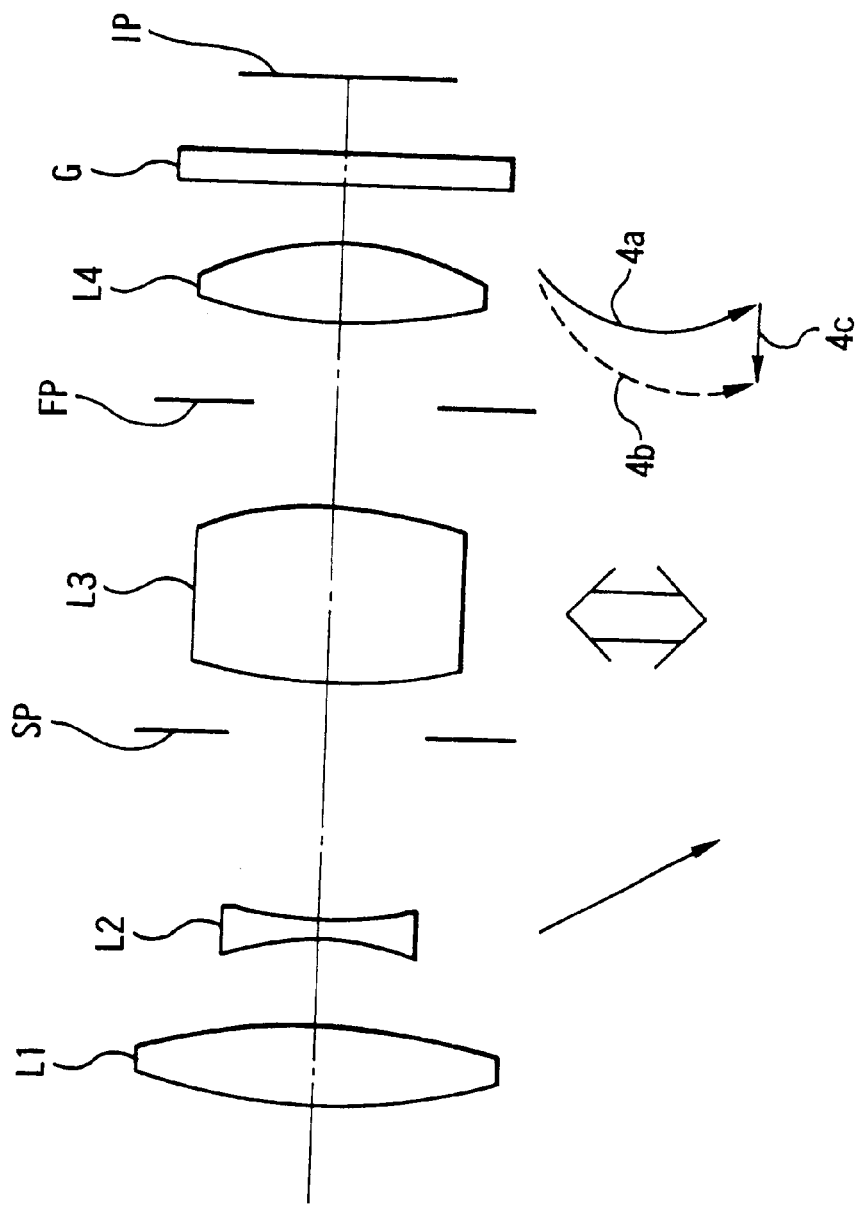
FIG. 14 is a lens block diagram showing a paraxial refractive power arrangement of a variable magnification optical system according to a second embodiment of the invention.
Figure 15:
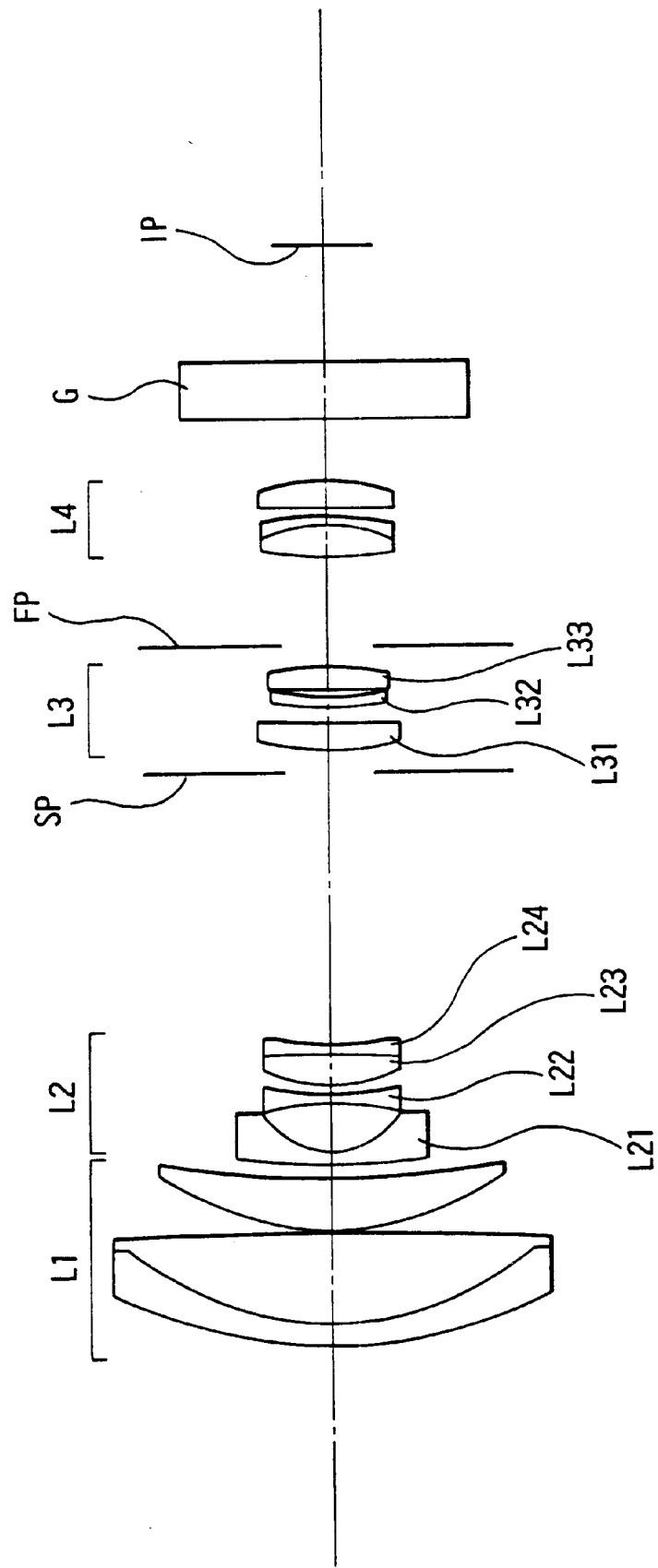
FIG. 15 is a lens sectional view of a variable magnification optical system according to a numerical example 4 in the wide-angle end.
Figure 19:
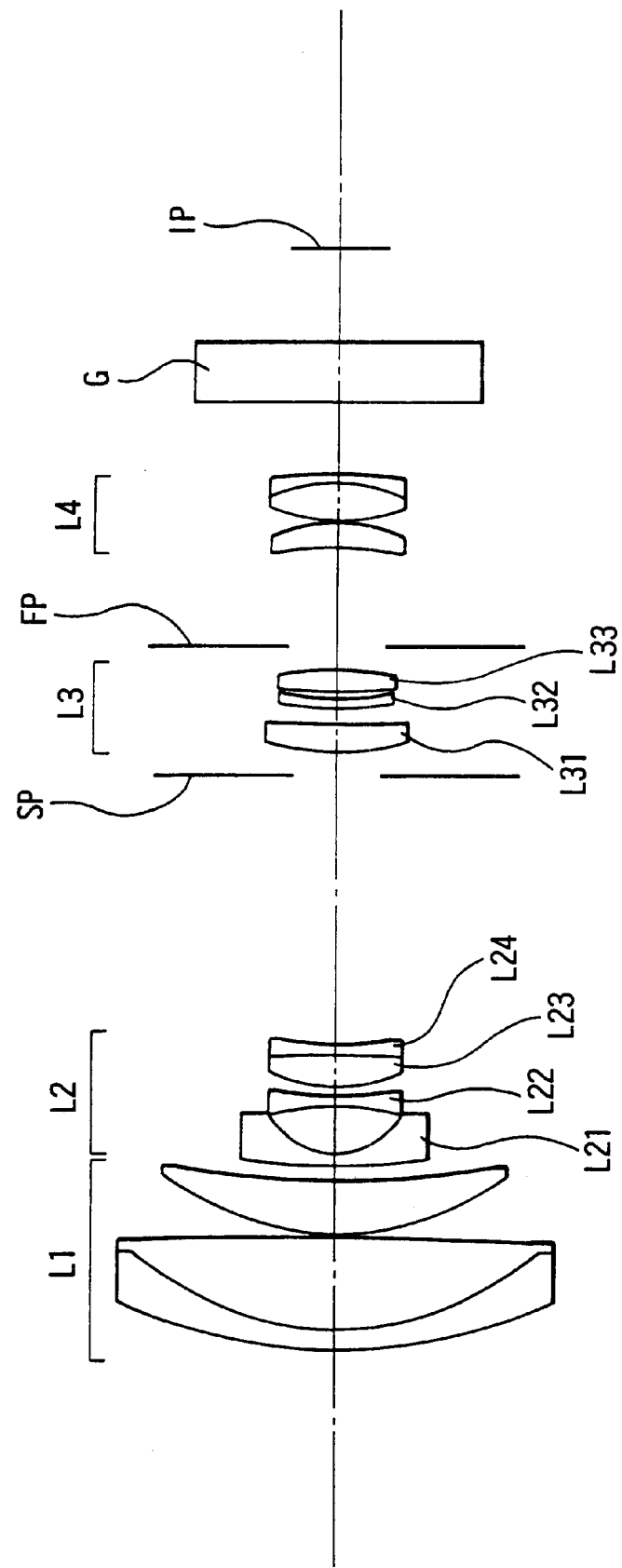
FIG. 19 is a lens sectional view of a variable magnification optical system according to a numerical example 5 in the wide-angle end.
Figure 20A:
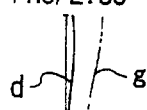
FIGS. 20A to 20D are graphs showing various aberrations of the variable magnification optical system according to the numerical example 5 in the wide-angle end.
Figure 20B:
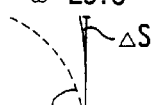
Figure 20C:
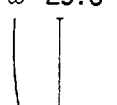
Figure 20D:
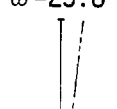
Figure 21A:
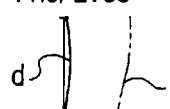
FIGS. 21A to 21D are graphs showing various aberrations of the variable magnification optical system according to the numerical example 5 in the middle focal length position.
Figure 21B:
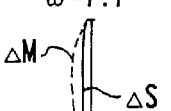
Figure 21C:
Figure 21D:
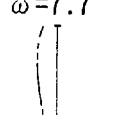
Figure 22A:
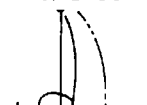
FIGS. 22A to 22D are graphs showing various aberrations of the variable magnification optical system according to the numerical example 5 in the telephoto end.
Figure 22B:
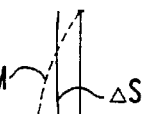
Figure 22C:
Figure 22D:
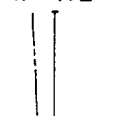
Figure 23:
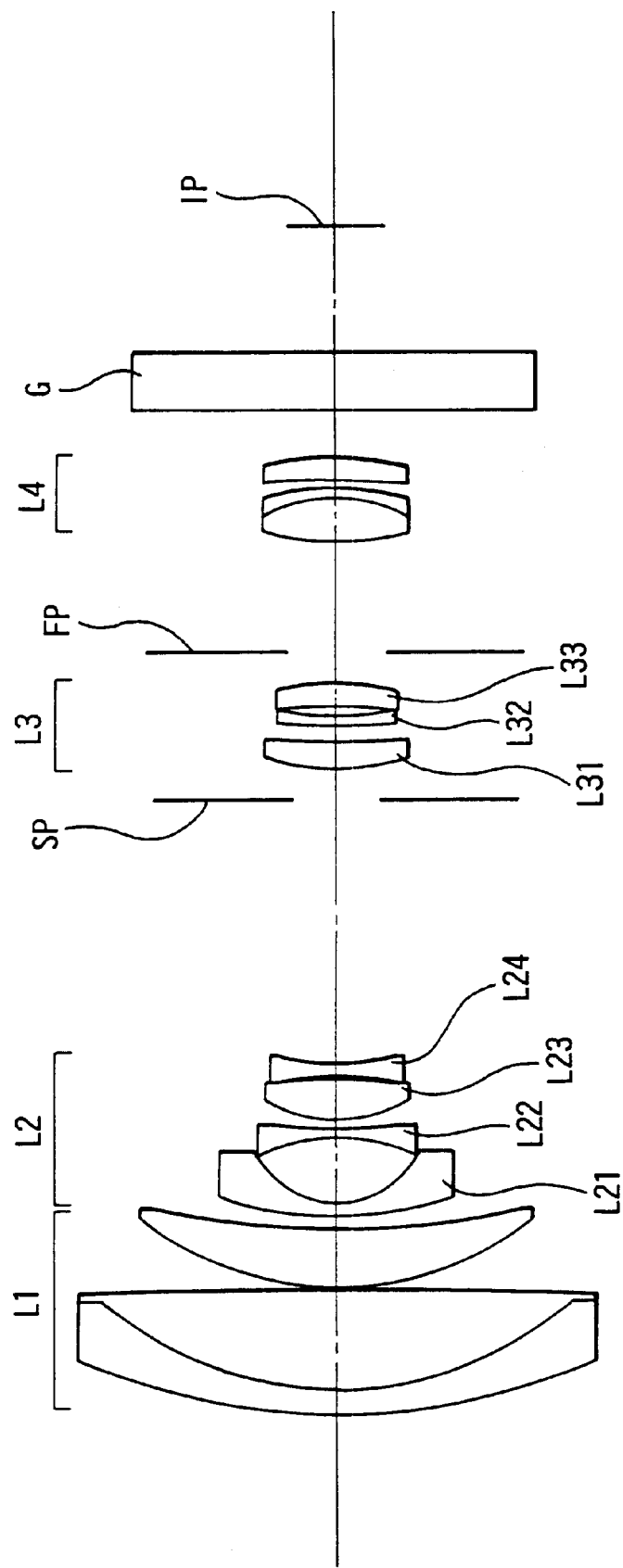
FIG. 23 is a lens sectional view of a variable magnification optical system according to a numerical example 6 in the wide-angle end.
Figure 27:
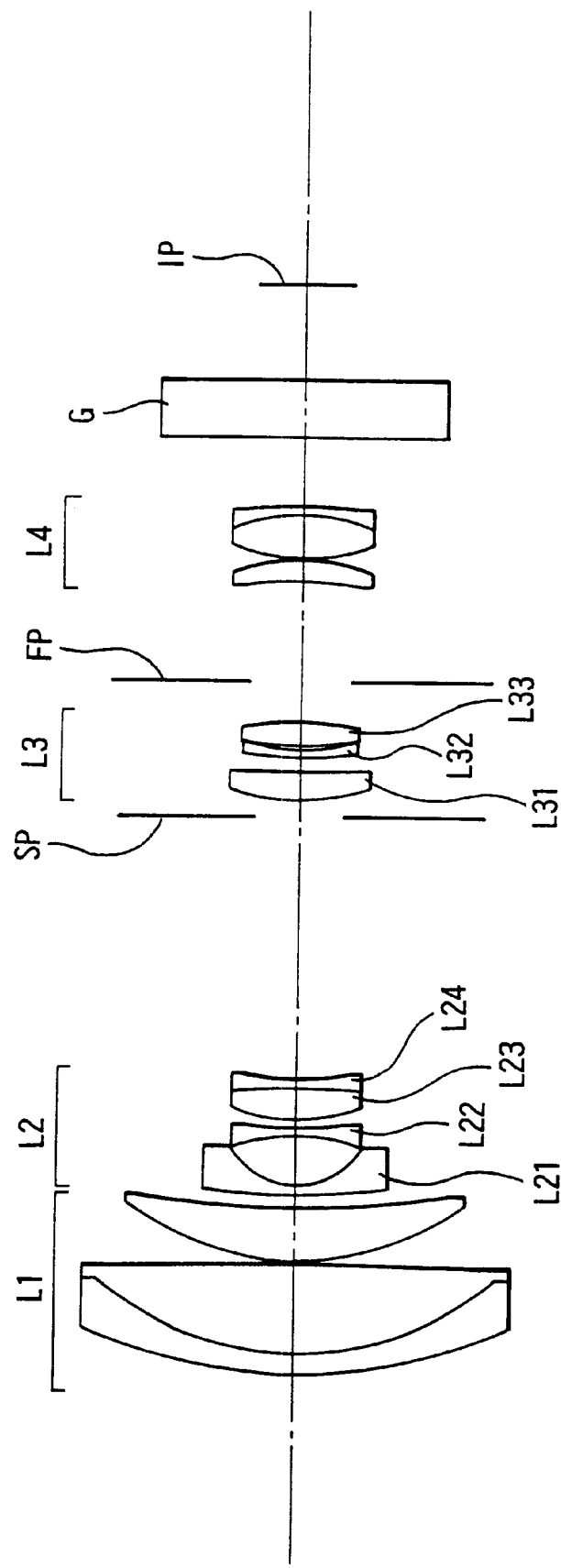
FIG. 27 is a lens sectional view of a variable magnification optical system according to a numerical example 7 in the wide-angle end.
Figure 31:
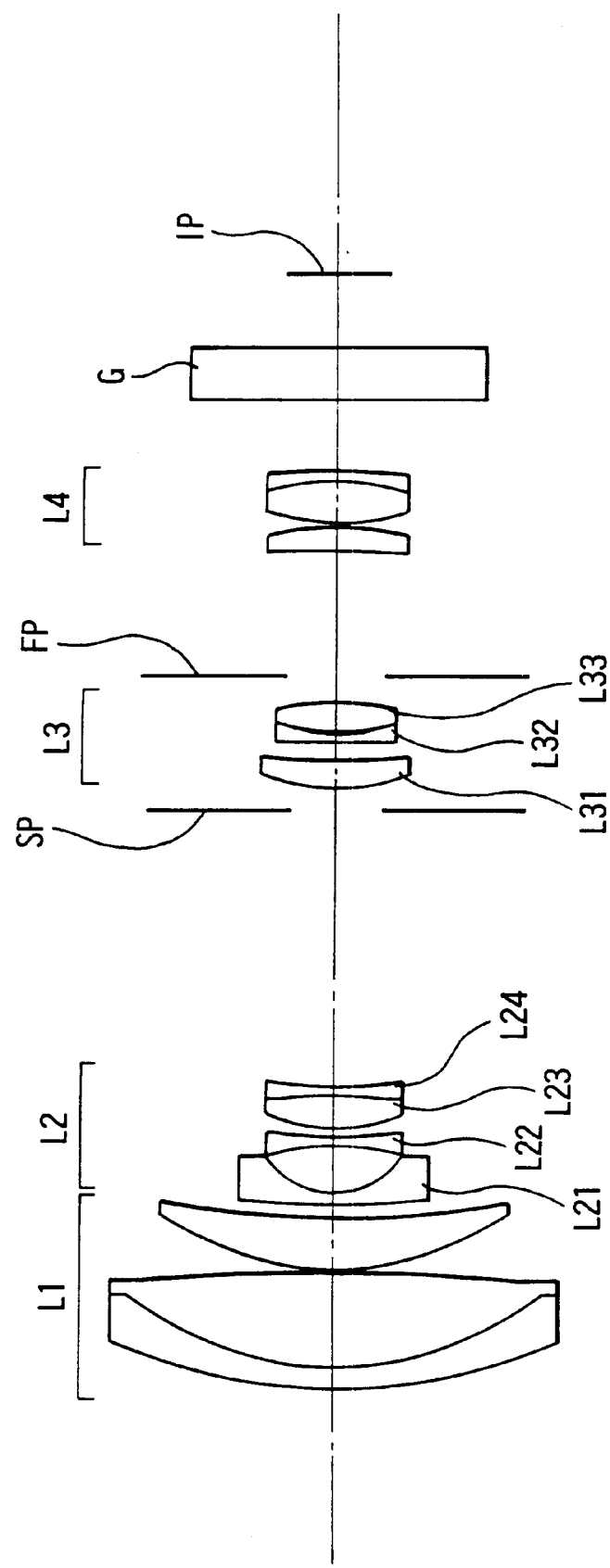
FIG. 31 is a lens sectional view of a variable magnification optical system according to a numerical example 8 in the wide-angle end.

FIG. 14 is a lens block diagram showing a paraxial refractive power arrangement of a variable magnification optical system according to a second embodiment of the invention (corresponding to numerical examples 4 to 8 to be described later). FIG. 15, FIGS. 16A to 16D, FIGS. 17A to 17D and FIGS. 18A to 18D are respectively a lens sectional view, aberration diagrams in the wide-angle end, the middle focal length position and the telephoto end of a variable magnification optical system according to the numerical example 4. FIG. 19, FIGS. 20A to 20D, FIGS. 21A to 21D and FIGS. 22A to 22D are respectively a lens sectional view, aberration diagrams in the wide-angle end, the middle focal length position and the telephoto end of a variable magnification optical system according to the numerical example 5. FIG. 23, FIGS. 24A to 24D, FIGS. 25A to 25D and FIGS. 26A to 26D are respectively a lens sectional view, aberration diagrams in the wide-angle end, the middle focal length position and the telephoto end of a variable magnification optical system according to the numerical example 6. FIG. 27, FIGS. 28A to 28D, FIGS. 29A to 29D and FIGS. 30A to 30D are respectively a lens sectional view, aberration diagrams in the wide-angle end, the middle focal length position and the telephoto end of a variable magnification optical system according to the numerical example 7. FIG. 31, FIGS. 32A to 32D, FIGS. 33A to 33D and FIGS. 34A to 34D are respectively a lens sectional view, aberration diagrams in the wide-angle end, the middle focal length position and the telephoto end of a variable magnification optical system according to the numerical example 8.

In FIG. 14, reference character L1 denotes a first lens unit of positive refractive power, reference character L2 denotes a second lens unit of negative refractive power, and reference character L3 denotes a third lens unit of positive refractive power.

In the second embodiment, the shaking of a photographed image occurring when the variable magnification optical system vibrates (tilts) is corrected by moving the third lens unit L3 in directions perpendicular to an optical axis of the variable magnification optical system to displace an image formed by the variable magnification optical system.

Reference character L4 denotes a fourth lens unit of positive refractive power. Reference character SP denotes an aperture stop, which is disposed behind the second lens unit L2 and before the third lens unit L3. Reference character G denotes a glass block, such as a face plate. Reference character IP denotes an image plane. Reference character FP denotes a flare-cutting stop, which is disposed on the image side of the third lens unit L3 and is arranged to cut off a flare component which occurs when image stabilization is performed by moving the third lens unit L3.

In the second embodiment, the variation of magnification from the wide-angle end to the telephoto end is effected by moving the second lens unit L2 toward the image side, and the shift of an image plane caused by the variation of magnification is compensated for by moving the fourth lens unit L4, as indicated by arrows shown in FIG. 14.

Further, the so-called rear focusing method in which focusing is effected by moving the fourth lens unit L4 along the optical axis is employed. A solid-line curve 4a and a dashed-line curve 4b shown in FIG. 14 represent movement loci of the fourth lens unit L4 for compensating for the shift of an image plane caused by the variation of magnification from the wide-angle end to the telephoto end when focusing is performed on an infinitely distant object and on a minimum-distance object, respectively. It is to be noted that the first lens unit L1 and the third lens unit L3 remain stationary during the variation of magnification and during focusing, but may be moved according to necessity.

In the second embodiment, the fourth lens unit L4 is moved to compensate for the shift of an image plane caused by the variation of magnification and the fourth lens unit L4 is also moved to effect focusing. In particular, the fourth lens unit L4 is moved in such a way as to have a locus convex toward the object side, as indicated by the curves 4a and 4b shown in FIG. 14, during the variation of magnification from the wide-angle end to the telephoto end. This arrangement makes it possible to effectively utilize a space between the third lens unit L3 and the fourth lens unit L4, thereby effectively attaining the shortening of the total length of the entire optical system.

In the second embodiment, focusing from an infinitely distant object to a minimum-distance object, for example, in the telephoto end is effected by moving the fourth lens unit L4 forward as indicated by a straight line 4c shown in FIG. 14.

In the second embodiment, by employing the above-mentioned rear focusing method, as compared with a case where focusing is effected by drawing out the first lens unit as in the conventional four-unit zoom lens, it is possible to effectively prevent the increase of a lens effective diameter of the first lens unit L1 while preventing the deterioration of performance due to a decentering error of the first lens unit L1.

Then, by disposing the aperture stop SP just before the third lens unit L3, it is possible to decrease the variation of aberrations caused by the movable lens unit, and, by shortening the interval between the lens units located before the aperture stop SP, it is possible to easily attain the reduction of the lens diameter of the front lens member.

In the second embodiment (numerical examples 4 to 8), too, the third lens unit L3 is used for image stabilization, i.e., an image shake occurring when the variable magnification optical system vibrates is corrected by moving the third lens unit L3 in directions perpendicular to the optical axis to displace an image formed by the variable magnification optical system. By this arrangement, image stabilization can be performed without newly adding a lens unit for image stabilization or an optical member, such as a variable angle prism, as in the conventional image-stabilizing optical system.

In the second embodiment, the third lens unit L3 comprises, in order from the object side to the image side, a positive first lens L31 having a convex surface facing the object side, a negative second lens L32 of meniscus form having a concave surface facing the image side and having a refractive power stronger than that of an opposite surface thereof facing the object side, and a positive third lens L33 having a convex surface facing the image side. The lens surface on the object side of the positive first lens L31 is an aspheric surface.

By disposing, within the third lens unit L3, the negative second lens L32 of meniscus form having a concave surface facing the image side, the whole third lens unit L3 is formed into the telephoto structure, so that the principal point interval of the second lens unit L2 and the third lens unit L3 is shortened to attain the shortening of the total length of the optical system.

In a case where such a negative lens of meniscus form is disposed, positive distortion is caused to occur by a lens surface of the negative lens. This positive distortion becomes the cause that decentering distortion becomes large during image stabilization.

In order to reduce this distortion, it is necessary to lessen distortion which is caused to occur by the whole third lens unit L3.

In the second embodiment, the positive third lens L33 is disposed on the image side of the negative second lens L32 of meniscus form, so that, while keeping the telephoto structure to a certain degree, distortion is corrected within the third lens unit L3, thereby reducing the occurrence of decentering distortion which occurs when image stabilization is performed by shifting the third lens unit L3.

Further, in the second embodiment, an aspheric surface is formed in the first lens L31 of the third lens unit L3, so that spherical aberration is suppressed at the third lens unit L3, and decentering coma which occurs during image stabilization is decreased.

Further, in the second embodiment, the fourth lens unit L4 comprises two positive lenses and one negative lens, so that the variations of spherical aberration and curvature of field which occur when the fourth lens unit L4 moves during the variation of magnification or during focusing are decreased.

While a variable magnification optical system having an image-stabilizing function according to the second embodiment can be realized, as the initial object, by satisfying the above-mentioned conditions, in order to attain good optical performance while further shortening the total length of the optical system, it is desirable to satisfy at least one of the following conditions.

(b-1) The second lens unit L2 has at least three negative lenses and at least one positive lens.

In the case of an optical system required to have a high resolution, such as a photographic lens for digital still cameras, it is necessary to greatly correct lateral chromatic aberration caused by the variation of magnification, as compared with an ordinary photographic lens for video cameras.

For that purpose, it is desirable that the second lens unit L2 has at least three negative lenses and at least one positive lens. With the number of negative lenses limited to two, if it is attempted to enlarge the refractive power of the second lens unit to reduce the amount of movement thereof for the purpose of reducing the total length of the optical system, it becomes difficult to correct lateral chromatic aberration.

(b-2) The second lens unit L2 comprises, in order from the object side to the image side, a negative lens of meniscus form having a concave surface facing the image side, a negative lens, a positive lens having a convex surface facing the object side, and a negative lens.

By this arrangement, in the second embodiment, the symmetry of optical elements located before and behind the second lens unit L2 is made small, thereby heightening an achromatic effect of the principal point and effectively correcting lateral chromatic aberration.

(b-3) The following condition is satisfied:

$$1.4<|f24/f2|<4.6 \qquad (7)$$

where f2 is a focal length of the second lens unit L2, and f24 is a focal length of the negative fourth lens L24 located on the most image side of the second lens unit L2.

The condition (7) is provided mainly for effectively correcting lateral chromatic aberration. If the focal length of the negative fourth lens L24 becomes too small beyond the upper limit of the condition (7), the effect of correction of chromatic aberration becomes insufficient. Conversely, if the lower limit of the condition (7) is exceeded, it becomes difficult to correct distortion at the wide-angle end.

(b-4) The following condition is satisfied:

$$0.3 < |f2/\sqrt{fw \cdot ft}| < 0.45 \qquad (8)$$

where fw and ft are focal lengths of the entire optical system in the wide-angle end and the telephoto end, respectively.

The condition (8) is provided for shortening the total length of the optical system while keeping high optical performance. If the refractive power of the second lens unit L2 is strengthened beyond the lower limit of the condition (8), although the amount of movement of the second lens unit L2 during the variation of magnification is reduced, the Petzval sum becomes large in the negative direction as a whole, thereby disadvantageously making it difficult to correct the curvature of field. Conversely, if the upper limit of the condition (8) is exceeded, the amount of movement of the second lens unit L2 during the variation of magnification becomes large, thereby preventing the whole lens system from being reduced in size, and also causing a disadvantage in respect of the change of the amount of marginal light during image stabilization.

(b-5) The maximum full-aperture diameter of the aperture stop SP is made variable according to the focal length during the variation of magnification.

In order to attain the reduction in the variation of the amount of light during image stabilization, it is preferred to relatively increase the amount of marginal light by reducing the aperture diameter of the aperture stop SP on the telephoto side during the variation of magnification so as to limit a central light flux.

(b-6) The following condition is satisfied:

$$1.1 < |f32/f3| < 3.5 \qquad (9)$$

where f32 is a focal length of the negative second lens L32 of meniscus form of the third lens unit L3, and f3 is a focal length of the whole third lens unit L3.

The condition (9) is provided for attaining the reduction in size of the whole optical system by setting the third lens unit L3 into the telephoto type. If the refractive power of the negative second lens L32 of the third lens unit L3 becomes strong beyond the lower limit of the condition (9), although there is an advantage in shortening of the total length of the optical system, the Petzval sum increases in the negative direction, disadvantageously making it difficult to correct the curvature of field. Conversely, if the upper limit of the condition (9) is exceeded, the shortening of the total length of the optical system becomes insufficient, and the correction of chromatic aberration within the third lens unit L3 becomes insufficient, disadvantageously causing decentering lateral chromatic aberration to become large.

(b-7) Since the appropriate setting of the decentering sensitivity of the shift lens unit for image stabilization has a great influence on the performance of image stabilization, it is preferred to satisfy the following condition:

$$3.3 < f3/fw < 4.8 \qquad (10)$$

where f3 is a focal length of the third lens unit L3, and fw is a focal length of the entire optical system in the wide-angle end.

This arrangement makes it possible to set the decentering sensitivity of the shift lens unit to an appropriate value while attempting to reduce the total length of the optical system. If the refractive power of the third lens unit L3 is strengthened beyond the lower limit of the condition (10), the decentering sensitivity of the shift lens unit becomes too large, so that an uncorrected image shake left during image stabilization would disadvantageously become large unless the accuracy of a mechanism is made severely high. Conversely, if the refractive power of the third lens unit L3 is weakened beyond the upper limit of the condition (10), the amount of shifting of the third lens unit L3 required for image stabilization disadvantageously becomes large, or the total length of the optical system disadvantageously becomes large.

(b-8) In order to keep good optical performance during image stabilization by correcting distortion and astigmatism within the third lens unit L3 while keeping the telephoto structure of the third lens unit L3, it is desirable to satisfy the following condition:

$$1.2 < f33/f3 < 2.0 \qquad (11)$$

where f33 is a focal length of the third lens L33 of the third lens unit L3.

If the refractive power of the third lens L33 becomes too large beyond the lower limit of the condition (11), the telephoto structure of the third lens unit L3 fails to be kept, so that the effect of shortening the total length of the optical system is disadvantageously lost. Conversely, if the upper limit of the condition (11) is exceeded, the correction of distortion and astigmatism within the third lens unit L3 becomes insufficient, causing optical performance during image stabilization to deteriorate.

(b-9) An aspheric surface may be introduced to the fourth lens unit L4 for the purpose of correcting astigmatism and distortion during the variation of magnification.

(b-10) It is necessary to make the lens diameter of the third lens unit L3 larger as much as the amount of movement for image stabilization.

Accordingly, in order to prevent the incidence of an extra on-axial light flux, it is desirable to dispose a fixed stop (flare-cutting stop) on the object side or the image side of the third lens unit L3. In the second embodiment, the fixed stop is disposed between the third lens unit L3 and the fourth lens unit L4, so that it is possible to effectively utilize a space and to prevent the incidence of an unnecessary light flux.

(b-11) In order to obtain good optical performance while attaining the shortening of the total length of the optical system, it is preferred that the fourth lens unit L4 comprises, in order from the object side to the image side, a positive lens, a negative lens and a positive lens, or comprises, in order from the object side to the image side, a positive lens, a positive lens and a negative lens.

Next, numerical data of the numerical examples 4 to 8 are shown. Further, the values of the factors in the above conditions (7) to (11) for the numerical examples 4 to 8 are listed in Table-2.

| Numerical Example 4: | | | | | | |
|---|---|---|---|---|---|---|
| | f = 1–7.81 | | Fno = 2.85–2.87 | | 2ω = 59.9°–8.4° | |
| R 1 = | 6.269 | D 1 = | 0.24 | N 1 = | 1.846660 | ν 1 = 23.5 |
| R 2 = | 3.967 | D 2 = | 1.05 | N 2 = | 1.496999 | ν 2 = 81.5 |
| R 3 = | −106.696 | D 3 = | 0.03 | | | |
| R 4 = | 3.797 | D 4 = | 0.60 | N 3 = | 1.696797 | ν 3 = 55.5 |
| R 5 = | 12.202 | D 5 = | Variable | | | |
| R 6 = | 10.149 | D 6 = | 0.14 | N 4 = | 1.804000 | ν 4 = 46.6 |
| R 7 = | 0.995 | D 7 = | 0.56 | | | |
| R 8 = | −3.724 | D 8 = | 0.12 | N 5 = | 1.696797 | ν 5 = 55.5 |
| R 9 = | 4.360 | D 9 = | 0.09 | | | |
| R10 = | 1.916 | D10 = | 0.37 | N 6 = | 1.846660 | ν 6 = 23.8 |
| R11 = | −26.443 | D11 = | 0.11 | N 7 = | 1.772499 | ν 7 = 49.6 |
| R12 = | 3.515 | D12 = | Variable | | | |
| R13 = | Stop | D13 = | 0.26 | | | |
| R14 = | 2.870* | D14 = | 0.34 | N 8 = | 1.583126 | ν 8 = 59.4 |
| R15 = | 22.034 | D15 = | 0.17 | | | |
| R16 = | 4.725 | D16 = | 0.12 | N 9 = | 1.846660 | ν 9 = 23.8 |
| R17 = | 3.250 | D17 = | 0.09 | | | |
| R18 = | 12.489 | D18 = | 0.26 | N10 = | 1.487490 | ν10 = 70.2 |
| R19 = | −4.205 | D19 = | 0.25 | | | |
| R20 = | ∞ | D20 = | Variable | | | |
| R21 = | 4.536 | D21 = | 0.38 | N11 = | 1.487490 | ν11 = 70.2 |
| R22 = | −2.055 | D22 = | 0.10 | N12 = | 1.846660 | ν12 = 23.8 |
| R23 = | −5.112 | D23 = | 0.10 | | | |
| R24 = | −63.454 | D24 = | 0.31 | N13 = | 1.583126 | ν13 = 59.4 |
| R25 = | 2.873* | D25 = | 0.71 | | | |
| R26 = | ∞ | D26 = | 0.69 | N14 = | 1.516330 | ν14 = 64.1 |
| R27 = | ∞ | | | | | |

*: Aspheric Surface

| Variable Separation | Focal Length | | |
|---|---|---|---|
| | 1.00 | 4.23 | 7.81 |
| D 5 | 0.16 | 2.42 | 3.06 |
| D12 | 3.18 | 0.91 | 0.28 |
| D20 | 1.02 | 0.35 | 0.69 |

Aspheric Coefficients:

| R14 | A = | −5.57572e+00 | B = | 1.52010e−02 | C = | −6.61741e−03 |
|---|---|---|---|---|---|---|
| | D = | 8.22409e−03 | E = | −1.32171e−02 | | |
| R25 | A = | −3.03297e+00 | B = | 0.00000e+00 | C = | 1.94316e−02 |
| | D = | −8.23349e−03 | E = | 0.00000e+00 | | |

| Numerical Example 5: | | | | | | |
|---|---|---|---|---|---|---|
| | f = 1–7.81 | | Fno = 2.85–2.88 | | 2ω = 59.9°–8.4° | |
| R 1 = | 6.642 | D 1 = | 0.24 | N 1 = | 1.846660 | ν 1 = 23.8 |
| R 2 = | 3.912 | D 2 = | 1.07 | N 2 = | 1.487490 | ν 2 = 70.2 |
| R 3 = | −64.780 | D 3 = | 0.03 | | | |
| R 4 = | 3.609 | D 4 = | 0.62 | N 3 = | 1.696797 | ν 3 = 55.5 |
| R 5 = | 11.991 | D 5 = | Variable | | | |
| R 6 = | 7.995 | D 6 = | 0.14 | N 4 = | 1.804000 | ν 4 = 46.6 |
| R 7 = | 0.969 | D 7 = | 0.56 | | | |
| R 8 = | −3.157 | D 8 = | 0.12 | N 5 = | 1.719995 | ν 5 = 50.2 |
| R 9 = | 5.381 | D 9 = | 0.09 | | | |
| R10 = | 2.037 | D10 = | 0.37 | N 6 = | 1.846660 | ν 6 = 23.8 |
| R11 = | −16.452 | D11 = | 0.11 | N 7 = | 1.772499 | ν 7 = 49.6 |
| R12 = | 4.155 | D12 = | Variable | | | |
| R13 = | Stop | D13 = | 0.26 | | | |
| R14 = | 2.779* | D14 = | 0.34 | N 8 = | 1.583126 | ν 8 = 59.4 |
| R15 = | 22.034 | D15 = | 0.17 | | | |
| R16 = | 4.793 | D16 = | 0.12 | N 9 = | 1.846660 | ν 9 = 23.8 |
| R17 = | 3.121 | D17 = | 0.09 | | | |
| R18 = | 7.723 | D18 = | 0.26 | N10 = | 1.487490 | ν10 = 70.2 |
| R19 = | −4.374 | D19 = | 0.25 | | | |
| R20 = | ∞ | D20 = | Variable | | | |
| R21 = | −3.966 | D21 = | 0.26 | N11 = | 1.583i26 | ν11 = 59.4 |
| R22 = | −2.298* | D22 = | 0.03 | | | |
| R23 = | 2.639 | D23 = | 0.43 | N12 = | 1.487490 | ν12 = 70.2 |
| R24 = | −2.266 | D24 = | 0.10 | N13 = | 1.846660 | ν13 = 23.8 |
| R25 = | −6.644 | D25 = | 0.81 | | | |

-continued

| | | | | | | | |
|---|---|---|---|---|---|---|---|
| R26 = | ∞ | D26 = | 0.69 | N14 = | 1.516330 | ν14 = | 64.1 |
| R27 = | ∞ | | | | | | |

*: Aspheric Surface

| Variable | Focal Length | | |
|---|---|---|---|
| Separation | 1.00 | 4.23 | 7.81 |
| D 5 | 0.16 | 2.43 | 3.07 |
| D12 | 3.18 | 0.91 | 0.28 |
| D20 | 1.16 | 0.47 | 0.82 |

Aspheric Coefficients:

| | | | | | | |
|---|---|---|---|---|---|---|
| R14 | A = | −6.07678e+00 | B = | 2.00357e−02 | C = | −8.48873e−03 |
| | D = | −8.08599e−03 | E = | 2.17960e−02 | | |
| R25 | A = | −1.44735e+00 | B = | −1.34928e−02 | C = | −7.81104e−04 |
| | D = | −2.25690e−03 | E = | 1.08800e−03 | | |

Numerical Example 6:

f = 1–8.00    Fno = 2.82–2.83    2ω = 59.0°–8.1°

| | | | | | | | |
|---|---|---|---|---|---|---|---|
| R 1 = | 8.060 | D 1 = | 0.29 | N 1 = | 1.846660 | ν 1 = | 23.8 |
| R 2 = | 4.392 | D 2 = | 1.15 | N 2 = | 1.603112 | ν 2 = | 60.6 |
| R 3 = | −97.964 | D 3 = | 0.03 | | | | |
| R 4 = | 3.844 | D 4 = | 0.68 | N 3 = | 1.696797 | ν 3 = | 55.5 |
| R 5 = | 10.851 | D 5 = | Variable | | | | |
| R 6 = | 4.503 | D 6 = | 0.14 | N 4 = | 1.806098 | ν 4 = | 40.9 |
| R 7 = | 1.151 | D 7 = | 0.73 | | | | |
| R 8 = | −2.412 | D 8 = | 0.13 | N 5 = | 1.701536 | ν 5 = | 41.2 |
| R 9 = | 10.092 | D 9 = | 0.07 | | | | |
| R10 = | 1.846 | D10 = | 0.51 | N 6 = | 1.846660 | ν 6 = | 23.8 |
| R11 = | −5.031 | D11 = | 0.05 | | | | |
| R12 = | −2.572 | D12 = | 0.10 | N 7 = | 1.772499 | ν 7 = | 49.6 |
| R13 = | 2.756 | D13 = | Variable | | | | |
| R14 = | Stop | D14 = | 0.34 | | | | |
| R1S = | 2.599* | D15 = | 0.34 | N 8 = | 1.583126 | ν 8 = | 59.4 |
| R16 = | 22.473 | D16 = | 0.17 | | | | |
| R17 = | 8.886 | D17 = | 0.12 | N 9 = | 1.846668 | ν 9 = | 23.8 |
| R18 = | 4.469 | D18 = | 0.08 | | | | |
| R19 = | −21.463 | D19 = | 0.29 | N10 = | 1.487490 | ν10 = | 70.2 |
| R20 = | −3.041 | D20 = | 0.34 | | | | |
| R21 = | ∞ | D21 = | Variable | | | | |
| R22 = | 3.143 | D22 = | 0.51 | N11 = | 1.487490 | ν11 = | 70.2 |
| R23 = | −1.816 | D23 = | 0.12 | N12 = | 1.846660 | ν12 = | 23.8 |
| R24 = | −3.287 | D24 = | 0.08 | | | | |
| R25 = | −17.142* | D25 = | 0.25 | N13 = | 1.583126 | ν13 = | 59.4 |
| R26 = | −4.266 | D26 = | 0.51 | | | | |
| R27 = | ∞ | D27 = | 0.68 | N14 = | 1.516330 | ν14 = | 64.2 |
| R28 = | ∞ | | | | | | |

*: Aspheric Surface

| Variable | Focal Length | | |
|---|---|---|---|
| Separation | 1.00 | 4.28 | 8.00 |
| D 5 | 0.14 | 2.31 | 2.92 |
| D13 | 3.05 | 0.88 | 0.27 |
| D21 | 1.27 | 0.52 | 0.76 |

Aspheric Coefficients:

| | | | | | | |
|---|---|---|---|---|---|---|
| R15 | A = | 3.90490e−01 | B = | −2.27386e−02 | C = | −1.57114e−03 |
| | D = | 4.06050e−02 | E = | −7.57345e−02 | | |
| R25 | A = | −1.07179e+02 | B = | −1.14345e−02 | C = | 4.64051e−03 |
| | D = | −1.16339e−02 | E = | 1.15046e−02 | | |

Numerical Example 7:

f = 1–7.82    Fno = 2.85–2.89    2ω = 59.9°–8.4°

| | | | | | | | |
|---|---|---|---|---|---|---|---|
| R 1 = | 6.530 | D 1 = | 0.24 | N 1 = | 1.846660 | ν 1 = | 23.8 |
| R 2 = | 3.841 | D 2 = | 1.07 | N 2 = | 1.487490 | ν 2 = | 70.2 |
| R 3 = | −65.252 | D 3 = | 0.03 | | | | |
| R 4 = | 3.556 | D 4 = | 0.62 | N 3 = | 1.696797 | ν 3 = | 55.5 |
| R 5 = | 12.120 | D 5 = | Variable | | | | |
| R 6 = | 7.945 | D 6 = | 0.14 | N 4 = | 1.804000 | ν 4 = | 46.6 |
| R 7 = | 0.965 | D 7 = | 0.57 | | | | |

-continued

| | | | | | | | |
|---|---|---|---|---|---|---|---|
| R 8 = | −2.805 | D 8 = | 0.12 | N 5 = | 1.719995 | ν 5 = | 50.2 |
| R 9 = | 6.429 | D 9 = | 0.09 | | | | |
| R10 = | 2.079 | D10 = | 0.37 | N 6 = | 1.846660 | ν 6 = | 23.8 |
| R11 = | −9.838 | D11 = | 0.11 | N 7 = | 1.772499 | ν 7 = | 49.6 |
| R12 = | 3.978 | D12 = | Variable | | | | |
| R13 = | Stop | D13 = | 0.26 | | | | |
| R14 = | 2.598* | D14 = | 0.34 | N 8 = | 1.583126 | ν 8 = | 59.4 |
| R15 = | 20.690 | D15 = | 0.17 | | | | |
| R16 = | 4.831 | D16 = | 0.12 | N 9 = | 1.846660 | ν 9 = | 23.8 |
| R17 = | 2.936 | D17 = | 0.05 | | | | |
| R18 = | 8.228 | D18 = | 0.26 | N10 = | 1.487490 | ν10 = | 70.2 |
| R19 = | −4.980 | D19 = | 0.48 | | | | |
| R20 = | ∞ | D20 = | Variable | | | | |
| R21 = | −3.960 | D21 = | 0.26 | N11 = | 1.603112 | ν11 = | 60.6 |
| R22 = | −2.757 | D22 = | 0.03 | | | | |
| R23 = | 2.583 | D23 = | 0.50 | N12 = | 1.487490 | ν12 = | 70.2 |
| R24 = | −2.508 | D24 = | 0.10 | N13 = | 1.846660 | ν13 = | 23.8 |
| R25 = | −8.122 | D25 = | 0.81 | | | | |
| R26 = | ∞ | D26 = | 0.69 | N14 = | 1.516330 | ν14 = | 64.1 |
| R27 = | ∞ | | | | | | |

*: Aspheric Surface

| Variable | Focal Length | | |
|---|---|---|---|
| Separation | 1.00 | 4.25 | 7.82 |
| D 5 | 0.16 | 2.36 | 2.98 |
| D12 | 3.10 | 0.90 | 0.28 |
| D20 | 1.16 | 0.44 | 0.76 |

Aspheric Coefficients:

| | | | | | |
|---|---|---|---|---|---|
| R14 | A = | −5.81119e+00 | B = | 2.51527e−02 | C = −2.52475e−03 |
| | D = | −1.63592e−02 | E = | 1.77936e−02 | |

Numerical Example 8:

f = 1–7.82    Fno = 2.85–2.84    2ω = 59.9°–8.4°

| | | | | | | | |
|---|---|---|---|---|---|---|---|
| R 1 = | 7.191 | D 1 = | 0.24 | N 1 = | 1.846660 | ν 1 = | 23.8 |
| R 2 = | 4.108 | D 2 = | 1.09 | N 2 = | 1.487490 | ν 2 = | 70.2 |
| R 3 = | −29.650 | D 3 = | 0.03 | | | | |
| R 4 = | 3.612 | D 4 = | 0.62 | N 3 = | 1.696797 | ν 3 = | 55.5 |
| R 5 = | 11.629 | D 5 = | Variable | | | | |
| R 6 = | 11.021 | D 6 = | 0.14 | N 4 = | 1.804000 | ν 4 = | 46.6 |
| R 7 = | 0.994 | D 7 = | 0.54 | | | | |
| R 8 = | −3.274 | D 8 = | 0.11 | N 5 = | 1.719995 | ν 5 = | 50.2 |
| R 9 = | 5.236 | D 9 = | 0.09 | | | | |
| R10 = | 2.863 | D10 = | 0.37 | N 6 = | 1.846660 | ν 6 = | 23.8 |
| R11 = | −10.253 | D11 = | 0.10 | N 7 = | 1.772499 | ν 7 = | 49.6 |
| R12 = | 4.257 | D12 = | Variable | | | | |
| R13 = | Stop | D13 = | 0.26 | | | | |
| R14 = | 2.296* | D14 = | 0.34 | N 8 = | 1.583126 | ν 8 = | 59.4 |
| R15 = | 10.310 | D15 = | 0.17 | | | | |
| R16 = | 8.535 | D16 = | 0.12 | N 9 = | 1.761821 | ν 9 = | 26.5 |
| R17 = | 2.545 | D17 = | 0.04 | | | | |
| R18 = | 3.479 | D18 = | 0.31 | N10 = | 1.518229 | ν10 = | 58.9 |
| R19 = | −3.479 | D19 = | 0.29 | | | | |
| R20 = | ∞ | D20 = | Variable | | | | |
| R21 = | −9.188 | D21 = | 0.28 | N11 = | 1.603112 | ν11 = | 60.6 |
| R22 = | −3.192 | D22 = | 0.03 | | | | |
| R23 = | 2.764 | D23 = | 0.50 | N12 = | 1.487490 | ν12 = | 70.2 |
| R24 = | −2.764 | D24 = | 0.10 | N13 = | 1.846660 | ν13 = | 23.8 |
| R25 = | −9.694 | D25 = | 0.81 | | | | |
| R26 = | ∞ | D26 = | 0.59 | N14 = | 1.516330 | ν14 = | 64.1 |
| R27 = | ∞ | | | | | | |

*: Aspheric Surface

| Variable | Focal Length | | |
|---|---|---|---|
| Separation | 1.00 | 4.16 | 7.82 |
| D 5 | 0.14 | 2.41 | 3.05 |
| D12 | 3.19 | 0.92 | 0.28 |
| D20 | 1.44 | 0.74 | 1.11 |

-continued

Aspheric Coefficients:

| R14 | A = | −5.44933e+00 | B = | 3.579149e−02 | C = | 7.73545e−03 |
|---|---|---|---|---|---|---|
|  | D = | −7.91037e−02 | E = | 9.89082e−02 |  |  |

TABLE 2

| Condition | Numerical Example | | | | |
|---|---|---|---|---|---|
|  | 4 | 5 | 6 | 7 | 8 |
| (7) \|f24/f2\| | 3.585 | 3.830 | 1.680 | 3.391 | 3.464 |
| (8) f2/√fw·ft | 0.400 | 0.400 | 0.360 | 0.385 | 0.401 |
| (9) \|f32/f3\| | 3.118 | 2.795 | 2.539 | 2.163 | 1.324 |
| (10) f3/fw | 4.098 | 3.909 | 4.234 | 4.208 | 3.625 |
| (11) f33/f3 | 1.583 | 1.476 | 1.707 | 1.523 | 1.416 |

As has been described above, according to the second embodiment, it is possible to attain a variable magnification optical system having an image stabilizing function, in which a relatively small-sized and light-weight lens unit that is a part of the variable magnification optical system is moved in such a way as to have a component having directions perpendicular to an optical axis to displace an image formed by the variable magnification optical system, thereby correcting an image shake occurring when the vibration optical system vibrates (tilts), so that the amount of decentering aberration occurring when the lens unit is decentered is suppressed to a minimum, and the decentering aberration is corrected well, while the reduction in size of the whole apparatus, the simplification of a mechanism and the lowering of load of a driving means are attempted.

In particular, according to the second embodiment, it is possible to realize an image-stabilizing optical system which has higher optical performance than that of the conventional video camera lens, while having a large variable magnification ratio of 8 or thereabout, and which is adaptable for electronic still cameras each having 1,000,000 pixels or more.

Third Embodiment

Figure 35:
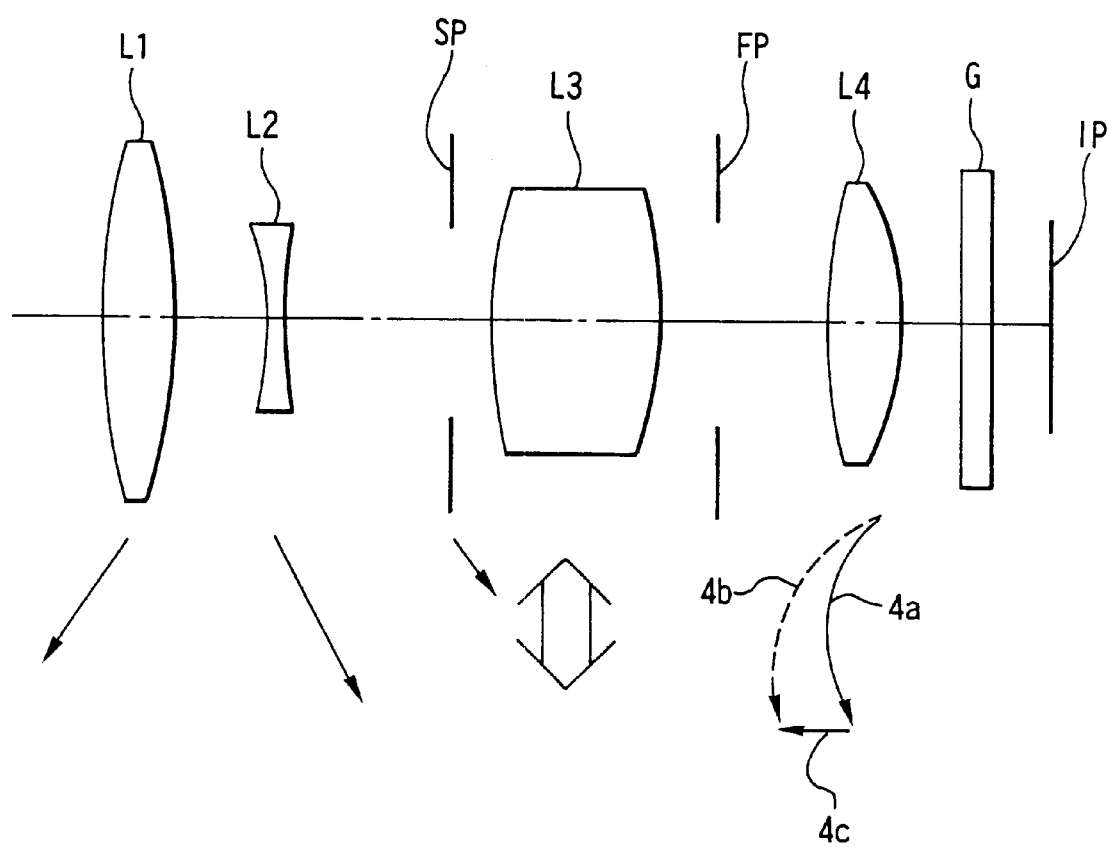
FIG. 35 is a lens block diagram showing a paraxial refractive power arrangement of a variable magnification optical system according to a third embodiment of the invention.
Figure 36:
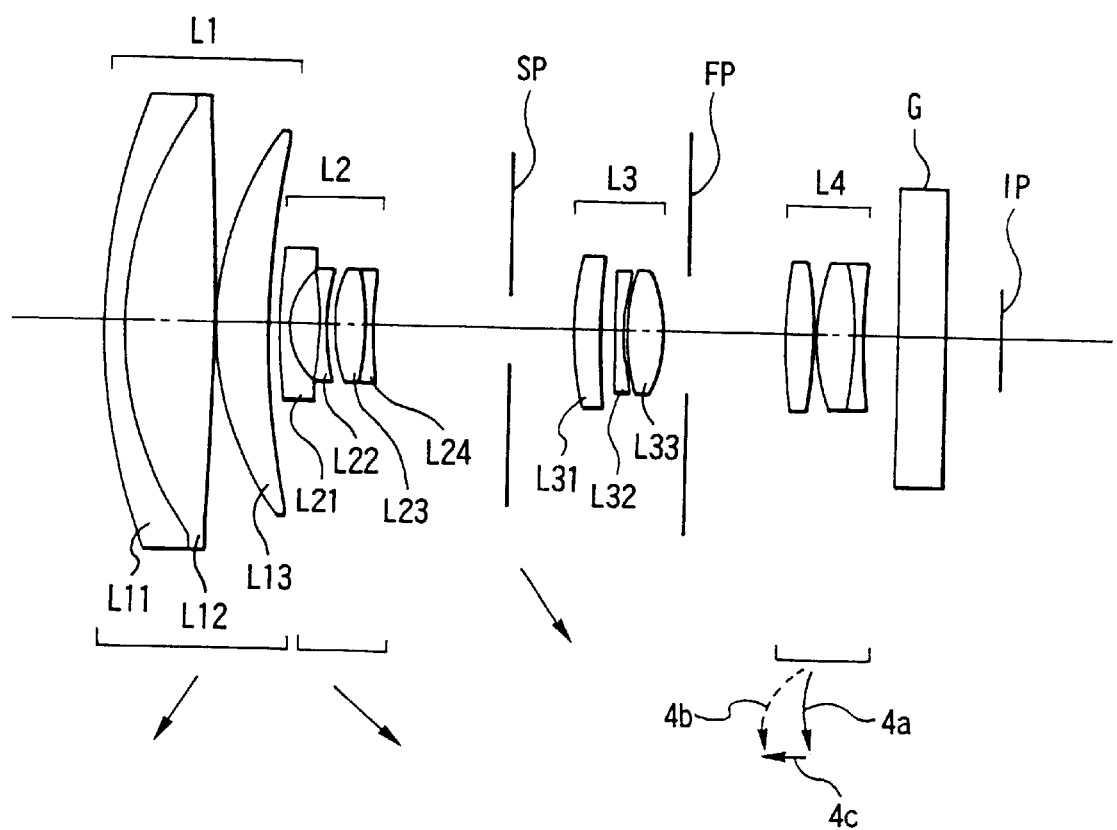
FIG. 36 is a lens sectional view of a variable magnification optical system according to a numerical example 9 in the wide-angle end.
Figure 37A:
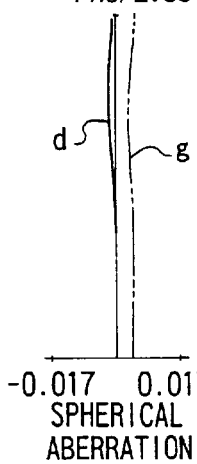
FIGS. 37A to 37D are graphs showing various aberrations of the variable magnification optical system according to the numerical example 9 in the wide-angle end.
Figure 37B:
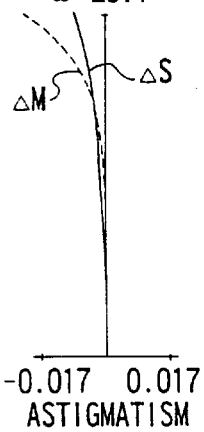
Figure 37C:
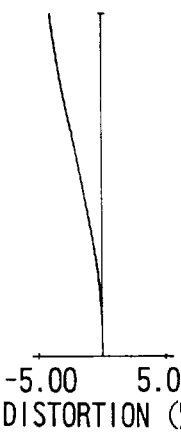
Figure 37D:
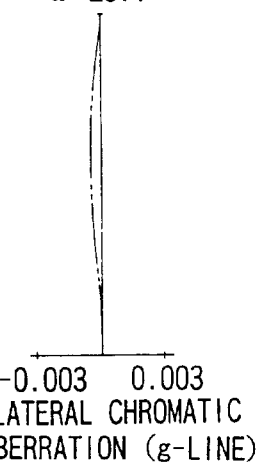
Figure 38A:
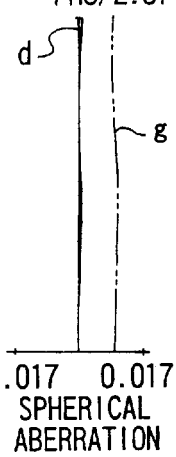
FIGS. 38A to 38D are graphs showing various aberrations of the variable magnification optical system according to the numerical example 9 in the middle focal length position.
Figure 38B:
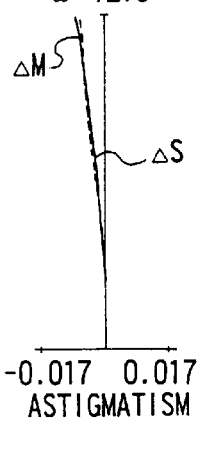
Figure 38C:
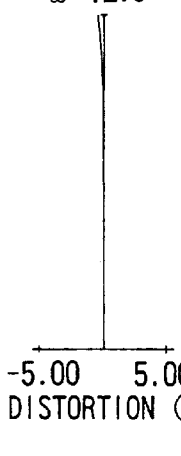
Figure 38D:
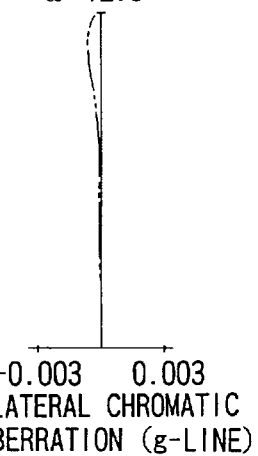
Figure 39A:
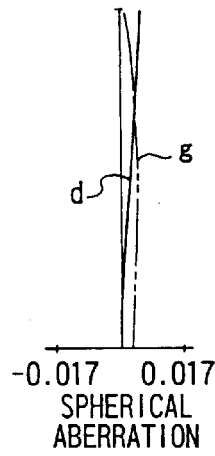
FIGS. 39A to 39D are graphs showing various aberrations of the variable magnification optical system according to the numerical example 9 in the telephoto end.
Figure 39B:
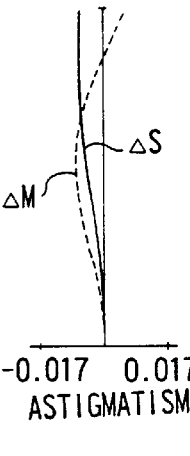
Figure 39C:
Figure 39D:
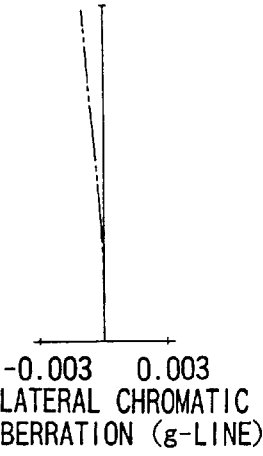
Figure 40:
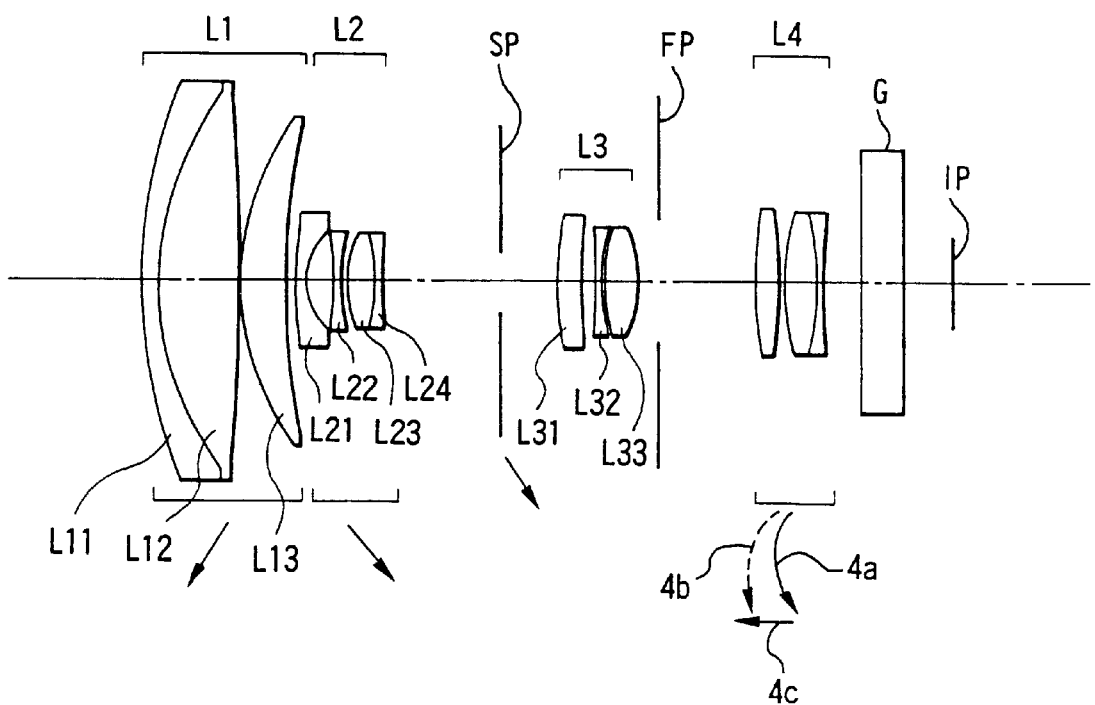
FIG. 40 is a lens sectional view of a variable magnification optical system according to a numerical example 10 in the wide-angle end.
Figure 44:
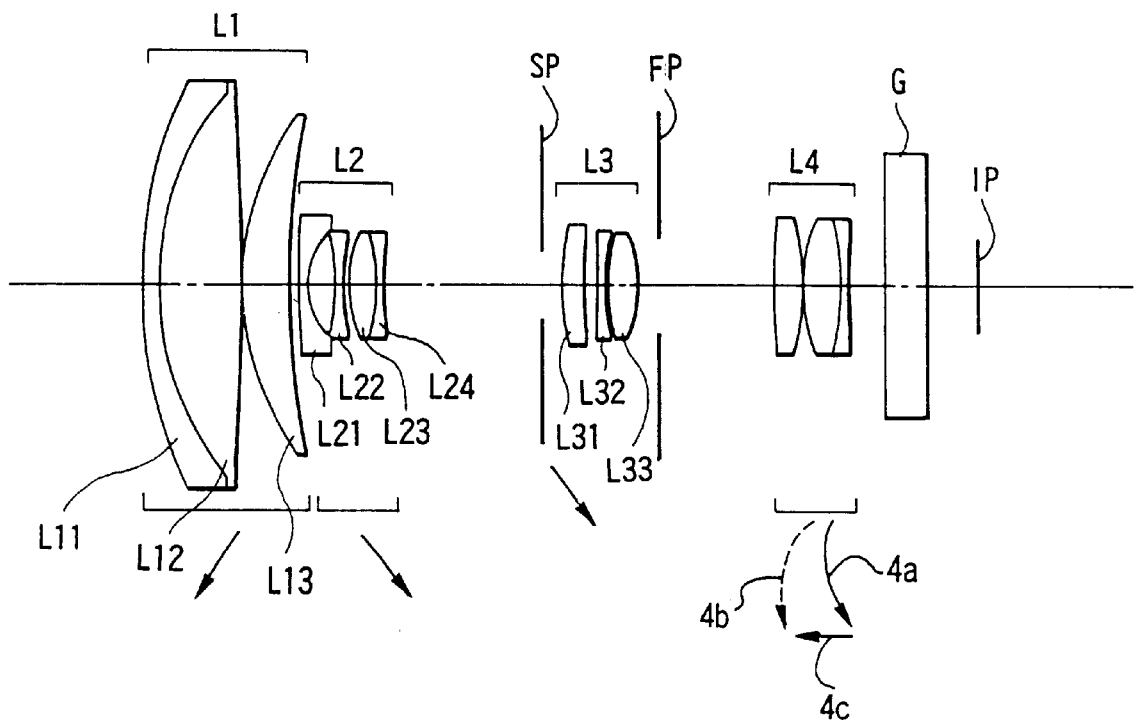
FIG. 44 is a lens sectional view of a variable magnification optical system according to a numerical example 11 in the wide-angle end.

FIG. 35 is a lens block diagram showing a paraxial refractive power arrangement of a variable magnification optical system according to a third embodiment of the invention (corresponding to numerical examples 9 to 11 to be described later).

FIG. 36, FIGS. 37A to 37D, FIGS. 38A to 38D and FIGS. 39A to 39D are respectively a lens sectional view, aberration diagrams in the wide-angle end, the middle focal length position and the telephoto end of a variable magnification optical system according to the numerical example 9.

FIG. 40, FIGS. 41A to 41D, FIGS. 42A to 42D and FIGS. 43A to 43D are respectively a lens sectional view, aberration diagrams in the wide-angle end, the middle focal length position and the telephoto end of a variable magnification optical system according to the numerical example 10.

FIG. 44, FIGS. 45A to 45D, FIGS. 46A to 46D and FIGS. 47A to 47D are respectively a lens sectional view, aberration diagrams in the wide-angle end, the middle focal length position and the telephoto end of a variable magnification optical system according to the numerical example 11.

In FIG. 35, reference character L1 denotes a first lens unit of positive refractive power, reference character L2 denotes a second lens unit of negative refractive power, and reference character L3 denotes a third lens unit of positive refractive power.

In the third embodiment, the shaking of a photographed image occurring when the variable magnification optical system vibrates (tilts) is corrected by moving the third lens unit L3 in directions perpendicular to an optical axis of the variable magnification optical system to displace an image formed by the variable magnification optical system.

Reference character L4 denotes a fourth lens unit of positive refractive power. Reference character SP denotes an aperture stop, which is disposed behind the second lens unit L2 and before the third lens unit L3. Reference character G denotes a glass block, such as a face plate. Reference character IP denotes an image plane. Reference character FP denotes a flare-cutting stop, which is disposed on the image side of the third lens unit L3 and is arranged to cut off a flare component which occurs when image stabilization is performed by moving the third lens unit L3.

In the third embodiment, the variation of magnification from the wide-angle end to the telephoto end is effected by moving the first lens unit L1 toward the object side and moving the second lens unit L2 toward the image side, and the shift of an image plane caused by the variation of magnification is compensated for by moving the fourth lens unit L4, as indicated by arrows shown in FIG. 35.

Further, the so-called rear focusing method in which focusing is effected by moving the fourth lens unit L4 along the optical axis is employed. A solid-line curve 4a and a dashed-line curve 4b shown in FIG. 35 represent movement loci of the fourth lens unit L4 for compensating for the shift of an image plane caused by the variation of magnification from the wide-angle end to the telephoto end when focusing is performed on an infinitely distant object and on a minimum-distance object, respectively. It is to be noted that the third lens unit L3 remains stationary during the variation of magnification and during focusing, but may be moved according to necessity.

In the third embodiment, the fourth lens unit L4 is moved to compensate for the shift of an image plane caused by the variation of magnification and the fourth lens unit L4 is also moved to effect focusing. In particular, the fourth lens unit L4 is moved in such a way as to have a locus convex toward the object side, as indicated by the curves 4a and 4b shown in FIG. 35, during the variation of magnification from the wide-angle end to the telephoto end. This arrangement makes it possible to effectively utilize a space between the third lens unit L3 and the fourth lens unit L4, thereby effectively attaining the shortening of the total length of the entire optical system.

In the third embodiment, focusing from an infinitely distant object to a minimum-distance object, for example, in the telephoto end is effected by moving the fourth lens unit L4 forward as indicated by a straight line 4c shown in FIG. 35.

In the third embodiment, by employing the above-mentioned rear focusing method, as compared with a case where focusing is effected by drawing out the first lens unit as in the conventional four-unit zoom lens, it is possible to effectively prevent the increase of a lens effective diameter of the first lens unit L1 while preventing the deterioration of performance due to a decentering error of the first lens unit L1.

Then, the aperture stop SP is disposed just before the third lens unit L3 and is arranged to move as indicated by an arrow shown in FIG. 35 according to the variation of magnification in such a way as to be located nearer to the object side in the telephoto end than in the wide-angle end, so that it is possible to decrease the variation of aberrations caused by the movable lens unit. Further, the interval between the lens units located before the aperture stop SP is shortened, so that it is possible to easily attain the reduction of the lens diameter of the front lens member.

Further, in order to attain the shortening the total length of the optical system, the following condition is satisfied in respect of the amounts of movement of the first lens unit L1 and the second lens unit L2:

$$0.5 < |m1/m2| < 2.5 \tag{12}$$

where m1 and m2 are the amounts of movement of the first lens unit L1 and the second lens unit L2, respectively, required for the variation of magnification from the wide-angle end to the telephoto end.

If the amount of movement of the first lens unit L1 becomes small beyond the lower limit of the condition (12), the effect of shortening the total length of the optical system in the wide-angle end becomes insufficient. Conversely, if the upper limit of the condition (12) is exceeded, the movement locus of the fourth lens unit L4 at the telephoto end for compensating for the shift of an image plane becomes too steep, so that a driving means, such as a motor, becomes unable to follow that locus.

In the third embodiment (numerical examples 9 to 11), too, the third lens unit L3 is used for image stabilization, i.e., an image shake occurring when the variable magnification optical system vibrates is corrected by moving the third lens unit L3 in directions perpendicular to the optical axis to displace an image formed by the variable magnification optical system. By this arrangement, image stabilization can be performed without newly adding a lens unit for image stabilization or an optical member, such as a variable angle prism, as in the conventional image-stabilizing optical system.

In the third embodiment, the first lens unit L1 comprises, in order from the object side to the image side, a first lens L11 of meniscus form having a concave surface facing the image side and having a refractive power stronger than that of an opposite surface thereof facing the object side, a second lens L12 both lens surfaces of which are convex, and a positive third lens L13 of meniscus form having a convex surface facing the object side.

In the case of a variable magnification optical system having a certain degree of wide angle of view as in the third embodiment, a negative lens disposed on the object side portion of the first lens unit L1 provides an advantage in respect of the shortening of the principal point interval of the first lens unit L1 and the second lens unit L2 and the reduction of the diameter of the front lens member.

Further, from a viewpoint of the correction of distortion at the wide-angle end, too, it is preferred that the negative lens disposed on the most object side is formed into the meniscus lens form having a strong concave surface facing the image side.

In addition, the second lens unit L2 comprises, in order from the object side to the image side, a first lens L21 of meniscus form having a concave surface facing the image side and having a refractive power stronger than that of an opposite surface thereof facing the object side, a second lens L22 both lens surfaces of which are concave, and a positive third lens L23 of meniscus form having a convex surface facing the object side.

Such a structure that a negative lens is disposed on the object side portion of the second lens unit L2 provides an advantage in respect of the correction of coma and curvature of field occurring at the wide-angle end.

Further, a negative lens is further disposed on the image side portion of the second lens unit L2, which has, as a result, the four-lens arrangement of negative, negative, positive and negative lenses, so that the symmetry of lens elements located before and behind the second lens Unit L2 is made small, thereby heightening an achromatic effect of the principal point and effectively correcting lateral chromatic aberration.

In the third embodiment, the third lens unit L3 comprises, in order from the object side to the image side, a positive first lens L31 having a convex surface facing the object side, a negative second lens L32 of meniscus form having a concave surface facing the image side and having a refractive power stronger than that of an opposite surface thereof facing the object side, and a positive third lens L33 both lens surfaces of which are convex. The lens surface on the object side of the positive first lens L31 is an aspheric surface.

By disposing, within the third lens unit L3, the negative second lens L32 of meniscus form having a concave surface facing the image side, the whole third lens unit L3 is formed into the telephoto structure, so that the principal point interval of the second lens unit L2 and the third lens unit L3 is shortened to attain the shortening of the total length of the optical system.

In a case where such a negative lens of meniscus form is disposed, positive distortion is caused to occur by a lens surface of the negative lens. This positive distortion becomes the cause that decentering distortion becomes large during image stabilization.

In order to reduce this distortion, it is necessary to lessen distortion which is caused to occur by the whole third lens unit L3.

In the third embodiment, the positive third lens L33 is disposed on the image side of the negative second lens L32 of meniscus form, so that, while keeping the telephoto structure to a certain degree, distortion is corrected within the third lens unit L3, thereby reducing the occurrence of decentering distortion which occurs when image stabilization is performed by shifting the third lens unit L3.

Further, in the third embodiment, an aspheric surface is formed in the first lens L31 of the third lens unit L3, so that spherical aberration is suppressed at the third lens unit L3, and decentering coma which occurs during image stabilization is decreased.

Further, in the third embodiment, the fourth lens unit L4 comprises two positive lenses and one negative lens, so that the variations of spherical aberration and curvature of field which occur when the fourth lens unit L4 moves during the variation of magnification or during focusing are decreased.

With the above construction of the variable magnification optical system employed, an optical system required to have a high resolution, such as a photographic lens for digital still cameras, has the various aberrations, such as lateral chromatic aberration caused by the variation of magnification, corrected well, as compared with an ordinary photographic lens for video cameras.

While a variable magnification optical system having an image-stabilizing function according to the third embodiment can be realized, as the initial object, by satisfying the above-mentioned conditions, in order to attain good optical performance while further shortening the total length of the optical system, it is desirable to satisfy at least one of the following conditions.

(c-1) The second lens unit L2 comprises, in order from the object side to the image side, a negative lens of meniscus form having a concave surface facing the image side, a negative lens, and a positive lens having a convex surface facing the object side.

(c-2) The first lens unit L1 comprises, in order from the object side to the image side, a negative lens of meniscus form having a concave surface facing the image side, a positive lens, and a positive lens having a convex surface facing the object side.

(c-3) The following condition is satisfied:

$$0.3 < |f2/ft| < 0.48 \tag{13}$$

where fw and ft are focal lengths of the entire optical system in the wide-angle end and the telephoto end, respectively, and f2 is a focal length of the second lens unit L2.

The condition (13) is provided for shortening the total length of the optical system while keeping high optical performance.

If the refractive power of the second lens unit L2 is strengthened beyond the lower limit of the condition (13), although the amount of movement of the second lens unit L2 during the variation of magnification is reduced, the Petzval sum becomes large in the negative direction as a whole, thereby disadvantageously making it difficult to correct the curvature of field.

Conversely, if the upper limit of the condition (13) is exceeded, the amount of movement of the second lens unit L2 during the variation of magnification becomes large, thereby preventing the whole lens system from being reduced in size, and also causing a disadvantage in respect of the change of the amount of marginal light during image stabilization.

(c-4) The following condition is satisfied:

$$1.5 < |f1/\sqrt{fw \cdot ft}| < 2.5 \tag{14}$$

where fw and ft are focal lengths of the entire optical system in the wide-angle end and the telephoto end, respectively, and f1 is a focal length of the first lens unit L1.

If the refractive power of the first lens unit L1 becomes too strong beyond the lower limit of the condition (14), although there is an advantage in shortening the total length of the optical system, disadvantageous points occur in respect of the field tilt due to the manufacturing error and the sway of an image during the variation of magnification, so that it becomes necessary to heighten the accuracy of the construction of a lens barrel.

Conversely, If the upper limit of the condition (14) is exceeded, the amount of movement of the first lens unit L1 disadvantageously becomes too large.

(c-5) In order to effectively correct lateral chromatic aberration, it is desirable that the following condition is satisfied:

$$1.4 < |f24/f2| < 4.6 \tag{15}$$

where f24 is a focal length of the negative fourth lens L24 located on the most image side of the second lens unit L2, and f2 is a focal length of the second lens unit L2.

If the focal length of the negative fourth lens L24 becomes too small beyond the upper limit of the condition (15), the effect of correction of chromatic aberration becomes insufficient. Conversely, if the lower limit of the condition (15) is exceeded, it becomes difficult to correct distortion at the wide-angle end.

(c-6) In the third embodiment, in order to attain the reduction in size of the whole optical system by setting the third lens unit L3 into the telephoto type, it is desirable that the following condition is satisfied:

$$1.1 < |f32/f31| < 3.5 \tag{16}$$

where f32 is a focal length of the negative second lens L32 of the third lens unit L3, and f3 is a focal length of the third lens unit L3.

If the refractive power of the negative second lens L32 of the third lens unit L3 becomes strong beyond the lower limit of the condition (16), although there is an advantage in shortening of the total length of the optical system, the Petzval sum increases in the negative direction, disadvantageously making it difficult to correct the curvature of field.

Conversely, if the upper limit of the condition (15) is exceeded, the shortening of the total length of the optical system becomes insufficient, and the correction of chromatic aberration within the third lens unit L3 becomes insufficient, disadvantageously causing decentering lateral chromatic aberration to become large.

(c-7) The variable magnification optical system has an aperture stop, and the maximum full-aperture diameter of the aperture stop is made variable according to the focal length during the variation of magnification.

In order to attain the reduction in the variation of the amount of light during image stabilization, it is preferred to relatively increase the amount of marginal light by reducing the aperture diameter of the aperture stop on the telephoto side during the variation of magnification so as to limit a central light flux.

(c-8) Since the appropriate setting of the decentering sensitivity of the shift lens unit for image stabilization has a great influence on the performance of image stabilization, it is preferred to satisfy the following condition:

$$2.5 < f3/fw < 4.0 \tag{17}$$

where f3 is a focal length of the third lens unit L3, and fw is a focal length of the entire optical system in the wide-angle end. This arrangement makes it possible to set the decentering sensitivity of the shift Lens unit to an appropriate value while attempting to reduce the total length of the optical system.

If the refractive power of the third lens unit L3 is strengthened beyond the lower limit of the condition (17), the decentering sensitivity of the shift lens unit becomes too large, so that an uncorrected image shake left during image stabilization would disadvantageously become large unless the accuracy of a mechanism is made severely high.

Conversely, if the refractive power of the third lens unit L3 is weakened beyond the upper limit of the condition (17), the amount of shifting of the third lens unit L3 required for image stabilization disadvantageously becomes large, or the total length of the optical system disadvantageously becomes large.

(c-9) It is preferred to introduce an aspheric surface to the fourth lens unit L4 for the purpose of correcting astigmatism and distortion during the variation of magnification.

(c-10) It is necessary to make the lens diameter of the third lens unit L3 larger as much as the amount of movement for image stabilization. Accordingly, in order to prevent the incidence of an extra on-axial light flux, it is desirable to dispose a fixed stop on the object side or the image side of the third lens unit L3.

In the third embodiment, the fixed stop is disposed between the third lens unit L3 and the fourth lens unit L4, so that it is possible to effectively utilize a space and to prevent the incidence of an unnecessary light flux.

(c-11) The first lens unit L1 consists of, in order from the object side to the image side, a negative first lens L11 of meniscus form having a convex surface facing the object side, a positive second lens L12 both lens surfaces of which are convex, and a positive third lens L13 of meniscus form having a convex surface facing the object side.

(c-12) The second lens unit L2 consists of, in order from the object side to the image side, a negative first lens L21 of meniscus form having a strong concave surface facing the image side, a negative second lens L22 both lens surfaces of which are concave, a positive third lens L23 both lens surfaces of which are convex, and a negative fourth lens L24 both lens surfaces of which are concave.

Next, numerical data of the numerical examples 9 to 11 are shown. Further, the values of the factors in the above conditions (12) to (17) for the numerical examples 9 to 11 are listed in Table-3.

Numerical Example 9:

f = 1–7.80    Fno = 2.85–3.29    2ω = 58.2°–8.2°

| | | | | | | | |
|---|---|---|---|---|---|---|---|
| R 1 = | 7.007 | D 1 = | 0.23 | N 1 = | 1.846660 | ν 1 = | 23.8 |
| R 2 = | 4.237 | D 2 = | 1.05 | N 2 = | 1.487490 | ν 2 = | 70.2 |
| R 3 = | −43.624 | D 3 = | 0.03 | | | | |
| R 4 = | 3.696 | D 4 = | 0.60 | N 3 = | 1.696797 | ν 3 = | 55.5 |
| R 5 = | 9.703 | D 5 = | Variable | | | | |
| R 6 = | 6.815 | D 6 = | 0.13 | N 4 = | 1.804000 | ν 4 = | 46.6 |
| R 7 = | 0.842 | D 7 = | 0.33 | | | | |
| R 8 = | −4.304 | D 8 = | 0.11 | N 5 = | 1.805181 | ν 5 = | 25.4 |
| R 9 = | 2.509 | D 9 = | 0.09 | | | | |
| R10 = | 1.703 | D10 = | 0.36 | N 6 = | 1.846660 | ν 6 = | 23.8 |
| R11 = | −3.222 | D11 = | 0.10 | N 7 = | 1.772499 | ν 7 = | 49.6 |
| R12 = | 10.961 | D12 = | Variable | | | | |
| R13 = | Aperture Stop | D13 = | 0.75 | | | | |
| R14 = | 3.079* | D14 = | 0.33 | N 8 = | 1.583126 | ν 8 = | 59.4 |
| R15 = | 8.333 | D15 = | 0.17 | | | | |
| R16 = | 26.006 | D16 = | 0.12 | N 9 = | 1.761821 | ν 9 = | 26.5 |
| R17 = | 3.385 | D17 = | 0.04 | | | | |
| R18 = | 2.852 | D18 = | 0.42 | N10 = | 1.487490 | ν10 = | 70.2 |
| R19 = | −1.754 | D19 = | 0.28 | | | | |
| R20 = | Fixed Mask | D20 = | Variable | | | | |
| R21 = | 5.541 | D21 = | 0.33 | N11 = | 1.603112 | ν11 = | 60.6 |
| R22 = | −5.206 | D22 = | 0.03 | | | | |
| R23 = | 2.309 | D23 = | 0.45 | N12 = | 1.487490 | ν12 = | 70.2 |
| R24 = | −4.278 | D24 = | 0.10 | N13 = | 1.846660 | ν13 = | 23.8 |
| R25 = | 6.596 | D25 = | 0.42 | | | | |
| R26 = | ∞ | D26 = | 0.57 | N14 = | 1.516330 | ν14 = | 64.1 |
| R27 = | ∞ | | | | | | |

*: Aspheric Surface

| Variable Separation | Focal Length | | |
|---|---|---|---|
| | 1.00 | 3.85 | 7.80 |
| D 5 | 0.13 | 2.88 | 3.66 |
| D12 | 1.62 | 0.56 | 0.27 |
| D20 | 1.18 | 0.92 | 1.60 |

Aspheric Coefficients:

| | | | | | | | |
|---|---|---|---|---|---|---|---|
| R14 | A = | −1.95782e+01 | B = | 3.07372e−02 | C = | | −4.20050e−02 |
| | D = | −1.41126e−01 | E = | 3.38109e−01 | | | |

Numerical Example 10:

f =1–7.82    Fno = 2.85–3.28    2ω = 59.9°–8.4°

| | | | | | | | |
|---|---|---|---|---|---|---|---|
| R 1 = | 7.078 | D 1 = | 0.24 | N 1 = | 1.846660 | ν 1 = | 23.8 |
| R 2 = | 4.219 | D 2 = | 1.09 | N 2 = | 1.487490 | ν 2 = | 70.2 |
| R 3 = | −35.676 | D 3 = | 0.03 | | | | |
| R 4 = | 3.697 | D 4 = | 0.62 | N 3 = | 1.696797 | ν 3 = | 55.5 |
| R 5 = | 10.401 | D 5 = | Variable | | | | |
| R 6 = | 8.090 | D 6 = | 0.13 | N 4 = | 1.804000 | ν 4 = | 46.6 |
| R 7 = | 0.861 | D 7 = | 0.36 | | | | |
| R 8 = | −5.145 | D 8 = | 0.11 | N 5 = | 1.761821 | ν 5 = | 26.5 |
| R 9 = | 2.344 | D 9 = | 0.09 | | | | |
| R10 = | 1.634 | D10 = | 0.37 | N 6 = | 1.846660 | ν 6 = | 23.8 |
| R11 = | −3.154 | D11 = | 0.10 | N 7 = | 1.804000 | ν 7 = | 46.6 |
| R12 = | 5.740 | D12 = | Variable | | | | |
| R13 = | Aperture Stop | D13 = | 0.78 | | | | |

-continued

| | | | | | | | |
|---|---|---|---|---|---|---|---|
| R14 = | 3.306* | D14 = | 0.34 | N 8 = | 1.583126 | ν 8 = | 59.4 |
| R15 = | 8.621 | D15 = | 0.17 | | | | |
| R16 = | 58.936 | D16 = | 0.12 | N 9 = | 1.761821 | ν 9 = | 26.5 |
| R17 = | 3.490 | D17 = | 0.04 | | | | |
| R18 = | 2.889 | D18 = | 0.45 | N10 = | 1.487490 | ν10= | 70.2 |
| R19 = | −1.748 | D19 = | 0.29 | | | | |
| R20 = | Fixed Mask | D20 = | Variable | | | | |
| R21 = | 4.968 | D21 = | 0.34 | N11 = | 1.6031#2 | ν11 = | 60.6 |
| R22 = | −5.985 | D22 = | 0.03 | | | | |
| R23 = | 2.729 | D23 = | 0.47 | N12 = | 1.487490 | ν12 = | 70.2 |
| R24 = | −4.253 | D24 = | 0.10 | N13 = | 1.846660 | ν13 = | 23.8 |
| R25 = | 10.475 | D25 = | 0.52 | | | | |
| R26 = | ∞ | D26 = | 0.59 | N14 = | 1.516330 | ν14 = | 64.1 |
| R27 = | ∞ | | | | | | |

*: Aspheric Surface

| Variable | Focal Length | | |
|---|---|---|---|
| Separation | 1.00 | 3.88 | 7.82 |
| D 5 | 0.14 | 2.75 | 3.48 |
| D12 | 1.66 | 0.58 | 0.28 |
| D20 | 1.33 | 0.99 | 1.59 |

Aspheric Coefficients:

| R14 | A = | −2.15623e+01 | B = | 2.74346e−02 | C = | −8.17342e−02 |
|---|---|---|---|---|---|---|
| | D = | 7.65222e−02 | E = | −7.44109e−03 | | |

Numerical Example 11:

f = 1−7.81   Fno = 2.85−2.91   2ω = 59.0°−8.3°

| | | | | | | | |
|---|---|---|---|---|---|---|---|
| R 1 = | 6.527 | D 1 = | 0.24 | N 1 = | 1.846660 | ν 1 = | 23.8 |
| R 2 = | 4.166 | D 2 = | 1.07 | N 2 = | 1.496999 | ν 2 = | 81.5 |
| R 3 = | −64.853 | D 3 = | 0.03 | | | | |
| R 4 = | 3.788 | D 4 = | 0.63 | N 3 = | 1.696797 | ν 3 = | 55.5 |
| R 5 = | 10.499 | D 5 = | Variable | | | | |
| R 6 = | 8.951 | D 6 = | 0.12 | N 4 = | 1.804000 | ν 4 = | 46.6 |
| R 7 = | 0.883 | D 7 = | 0.37 | | | | |
| R 8 = | −3.564 | D 8 = | 0.11 | N 5 = | 1.761821 | ν 5 = | 26.5 |
| R 9 = | 2.669 | D 9 = | 0.09 | | | | |
| R10 = | 1.834 | D10 = | 0.36 | N 6 = | 1.846660 | ν 6 = | 23.8 |
| R11 = | −2.415 | D11 = | 0.10 | N 7 = | 1.772499 | ν 7 = | 49.6 |
| R12 = | 8.048 | D12 = | Variable | | | | |
| R13 = | Aperture Stop | D13 = | 0.25 | | | | |
| R14 = | 2.836* | D14 = | 0.31 | N 8 = | 1.583126 | ν 8 = | 59.4 |
| R15 = | 8.475 | D15 = | 0.17 | | | | |
| R16 = | 59.197 | D16 = | 0.12 | N 9 = | 1.761821 | ν 9 = | 26.5 |
| R17 = | 3.125 | D17 = | 0.04 | | | | |
| R18 = | 2.844 | D18 = | 0.39 | N10 = | 1.487490 | ν10 = | 70.2 |
| R19 = | −1.930 | D19 = | 0.29 | | | | |
| R20 = | Fixed Mask | D20 = | Variable | | | | |
| R21 = | 7.100 | D21 = | 0.37 | N11 = | 1.603112 | ν11 = | 60.6 |
| R22 = | −4.356 | D22 = | 0.03 | | | | |
| R23 = | 2.292 | D23 = | 0.49 | N12 = | 1.487490 | ν12 = | 70.2 |
| R24 = | −4.041 | D24 = | 0.10 | N13 = | 1.846660 | ν13 = | 23.8 |
| R25 = | 12.432 | D25 = | 0.51 | | | | |
| R26 = | ∞ | D26 = | 0.58 | N14 = | 1.516330 | ν14 = | 64.1 |
| R27 = | ∞ | | | | | | |

*: Aspheric Surface

| Variable | Focal Length | | |
|---|---|---|---|
| Separation | 1.00 | 3.82 | 7.81 |
| D 5 | 0.14 | 2.71 | 3.43 |
| D12 | 2.14 | 0.68 | 0.27 |
| D20 | 1.56 | 1.26 | 1.82 |

Aspheric Coefficients:

| R14 | A = | −4.97271e+01 | B = | −9.62198e−03 | C = | −2.42223e−02 |
|---|---|---|---|---|---|---|
| | D = | 6.94986e−02 | E = | −8.29702e−02 | | |

TABLE 3

| | Numerical Example | | |
|---|---|---|---|
| Condition | 9 | 10 | 11 |
| (12) m1/m2 | 0.898 | 0.764 | 0.761 |
| (13) f2/√(fw·ft) | 0.425 | 0.399 | 0.397 |
| (14) f1/√(fw·ft) | 2.163 | 2.095 | 2.087 |
| (15) \|f24/f2\| | 2.710 | 2.259 | 2.157 |
| (16) \|f32/f3\| | 1.796 | 1.620 | 1.361 |
| (17) f3/fw | 2.849 | 3.008 | 3.185 |

As has been described above, according to the third embodiment, it is possible to attain a variable magnification optical system having an image stabilizing function, in which a relatively small-sized and light-weight lens unit that is a part of the variable magnification optical system is moved in such a way as to have a component having directions perpendicular to an optical axis to displace an image formed by the variable magnification optical system, thereby correcting an image shake occurring when the vibration optical system vibrates (tilts), and the construction of the lens unit for correcting an image shake is appropriately set, so that decentering aberration occurring when the lens unit is decentered is corrected well while the reduction in size of the whole apparatus, the simplification of a mechanism and the lowering of load of a driving means are attempted, and, in particular, the variable magnification optical system is adaptable for electronic still cameras each having 1,000,000 pixels or more.

Next, an embodiment of a video camera according to the invention in which the variable magnification optical system as described in any one of the above numerical examples 1 to 11 is used as a photographic lens will be described.

Figure 48:
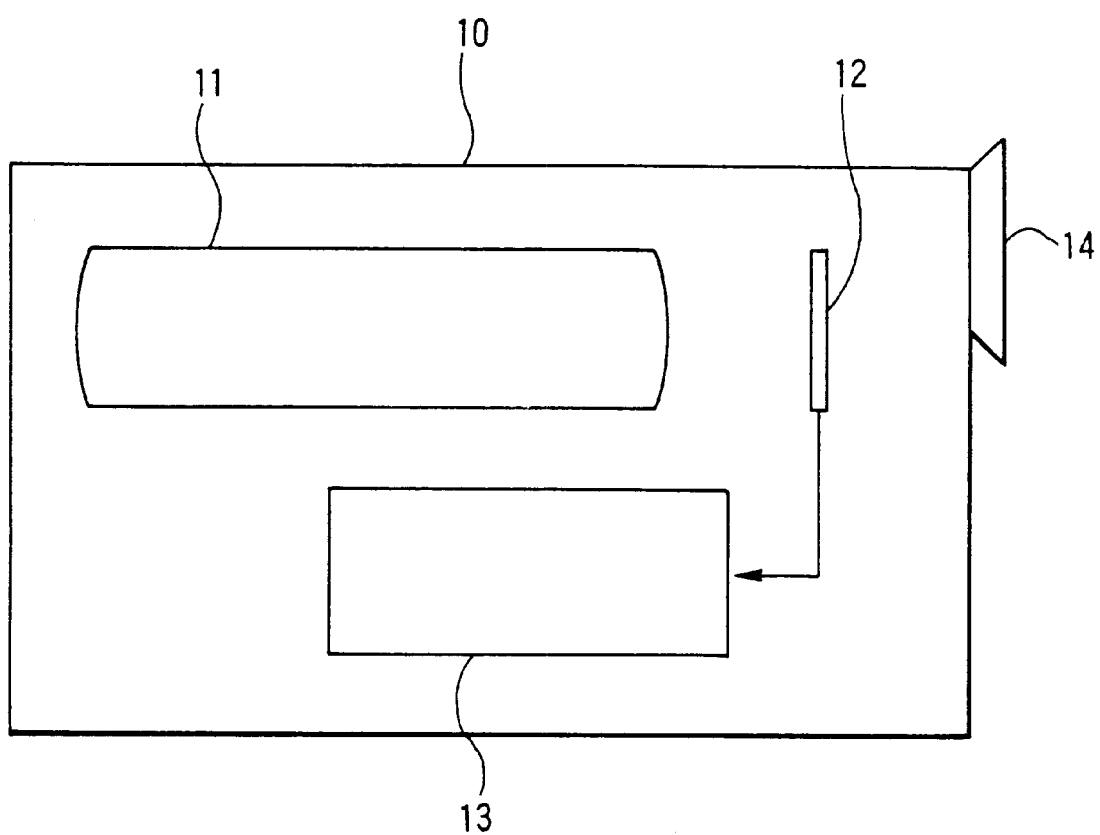
FIG. 48 is a schematic diagram showing, in outline, the construction of a video camera.

In FIG. 48, reference numeral 10 denotes a photographing apparatus body, reference numeral 11 denotes a photographic lens which is composed of the variable magnification optical system as described in any one of the numerical examples 1 to 11, reference numeral 12 denotes an image sensor, such as a CCD, arranged to receive light of an object image formed by the photographic lens 11, reference numeral 13 denotes a recording means for recording the object image received by the image sensor 12, and reference numeral 14 denotes a viewfinder for observing an object image. The viewfinder 14 may be an optical viewfinder or a viewfinder of the type for observing an object image displayed on a liquid crystal panel or the like.

As mentioned above, by applying the variable magnification optical system described in any one of the numerical examples 1 to 11 to cameras, such as a video camera, it is possible to realize a small-sized and high-optical-performance photographing apparatus.

What is claimed is:

1. A variable magnification optical system comprising, in order from an object side to an image side:

a first lens unit of positive refractive power;

a second lens unit of negative refractive power arranged to move along an optical axis during variation of magnification, said second lens unit comprising, in order from the object side to the image side, a first lens (L21) of negative refractive power and of meniscus form having a concave surface facing the image side, a second lens (L22) of negative refractive power, a third lens (L23) of positive refractive power and a fourth lens (L24) of negative refractive power;

a third lens unit of positive refractive power, at least a part of said third lens unit being moved in such a way as to have a component perpendicular to the optical axis to displace an image formed by said variable magnification optical system; and a fourth lens unit of positive refractive power arranged to move along the optical axis during the variation of magnification, wherein the following condition is satisfied:

$$0.05 < |f2/ft| < 0.07$$

where ft is a focal length of said variable magnification optical system in a telephoto end, and f2 is a focal length of said second lens unit.

2. A variable magnification optical system according to claim 1, further satisfying the following condition:

$$1.2 < |f24/f2| < 2.5$$

where f24 is a focal length of said fourth lens (L24) of said second lens unit.

3. A variable magnification optical system according to claim 1, wherein said third lens unit comprises, in order from the object side to the image side, a first lens (L31) of positive refractive power, and a second lens (L32) of negative refractive power and of meniscus form having a concave surface facing the image side.

4. A variable magnification optical system according to claim 3, further satisfying the following condition:

$$1.2 < |f32/f31| < 1.8$$

where f32 is a focal length of said second lens (L32) of said third lens unit, and f3 is a focal length of said third lens unit.

5. A variable magnification optical system according to claim 1, further comprising an aperture stop, said aperture stop having a full-aperture diameter variable according to a focal length of said variable magnification optical system.

6. A variable magnification optical system comprising, in order from an object side to an image side:

a first lens unit of positive refractive power;

a second lens unit of negative refractive power arranged to move along an optical axis during variation of magnification;

a third lens unit of positive refractive power, at least a part of said third lens unit being moved in such a way as to have a component perpendicular to the optical axis to displace an image formed by said variable magnification optical system; and a fourth lens unit of positive refractive power arranged to move along the optical axis during the variation of magnification, wherein the following condition is satisfied:

$$0.42 < |LS/ft| < 0.59$$

where LS is a distance from a lens surface located on the most object side of said variable magnification optical system to a lens surface located on the most object side of said third lens unit, and ft is a focal length of said variable magnification optical system in a telephoto end.

7. A variable magnification optical system according to claim 6, wherein said third lens unit comprises, in order from the object side to the image side, a first lens (L31) of positive refractive power, and a second lens (L32) of negative refractive power and of meniscus form having a concave surface facing the image side.

8. A variable magnification optical system according to claim 7, further satisfying the following condition:

$$1.2 < |f32/f3| < 1.8$$

where f32 is a focal length of said second lens (L32) of said third lens unit, and f3 is a focal length of said third lens unit.

9. A variable magnification optical system according to claim 6, further comprising an aperture stop, said aperture stop having a full-aperture diameter variable according to a focal length of said variable magnification optical system.

10. A variable magnification optical system comprising, in order from an object side to an image side:
   a first lens unit of positive refractive power;
   a second lens unit of negative refractive power arranged to move along an optical axis during a variation of magnification;
   a third lens unit of positive refractive power for reducing the occurrence of decentering distortion that occurs when at least a part of said third lens unit being moved in such a way as to have a component perpendicular to the optical axis to displace an image formed by said variable magnification optical system, said third lens unit comprising, in order from the object side to the image side, a first lens of positive refractive power having a convex surface facing the object side, a second lens of negative refractive power and of meniscus form having a concave surface facing the image side, and a third lens of positive refractive power; and
   a fourth lens unit of positive refractive power arranged to move along the optical axis during the variation of magnification, said fourth lens unit comprising a positive lens and a negative lens.

11. A variable magnification optical system comprising, in order from an object side to an image side:
   a first lens unit of positive refractive power;
   a second lens unit of negative refractive power arranged to move along an optical axis during a variation of magnification;
   a third lens unit of positive refractive power, at least a part of said third lens unit being moved in such a way as to have a component perpendicular to the optical axis to displace an image formed by said variable magnification optical system, said third lens unit comprising, in order from the object side to the image side, a first lens of positive refractive power having a convex surface facing the object side, a second lens of negative refractive power and of meniscus form having a concave surface facing the image side, and a third lens of positive refractive power; and
   a fourth lens unit of positive refractive power arranged to move along the optical axis during the variation of magnification, said fourth lens unit comprising a positive lens and a negative lens, wherein said optical system satisfies the following condition:

$$1.1 < |f32/f3| < 3.5$$

where f32 is a focal length of said second lens of said third lens unit, and f3 is a focal length of said third lens unit.

12. A variable magnification optical system comprising, in order from an object side to an image side:
   a first lens unit of positive refractive power that does not move along with the optical axis for a variation of magnification;
   a second lens unit of negative refractive power arranged to move along an optical axis during a variation of magnification;
   a third lens unit of positive refractive power, at least a part of said third lens unit being moved in such a way as to have a component perpendicular to the optical axis to displace an image formed by said variable magnification optical system, said third lens unit comprising, in order from the object side to the image side, a first lens of positive refractive power having a convex surface facing the object side, a second lens of negative refractive power and of meniscus form having a concave surface facing the image side, and a third lens of positive refractive power; and
   a fourth lens unit of positive refractive power arranged to move along the optical axis during the variation of magnification, said fourth lens unit comprising a positive lens and a negative lens, wherein said second lens unit comprises at least three negative lenses and at least one positive lens.

13. A variable magnification optical system according to claim 12, wherein said second lens unit comprises, in order from the object side to the image side, a first lens (L21) of negative refractive power and of meniscus form having a concave surface facing the image side, a second lens (L22) of negative refractive power, a third lens (L23) of positive refractive power having a convex surface facing the object side, and a fourth lens (L24) of negative refractive power.

14. A variable magnification optical system according to claim 13, satisfying the following condition:

$$1.4 < |f24/f2| < 4.6$$

where f24 is a focal length of said fourth lens (L24) of said second lens unit, and f2 is a focal length of said second lens unit.

15. A variable magnification optical system comprising, in order from an object side to an image side:
   a first lens unit of positive refractive power;
   second lens unit of negative refractive power arranged to move along an optical axis during a variation of magnification;
   a third lens unit of positive refractive power, at least a part of said third lens unit being moved in such a way as to have a component perpendicular to the optical axis to displace an image formed by said variable magnification optical system, said third lens unit comprising, in order from the object side to the image side, a first lens of positive refractive power having a convex surface facing the object side, a second lens of negative refractive power and of meniscus form having a concave surface facing the image side, and a third lens of positive refractive power; and
   a fourth lens unit of positive refractive power arranged to move along the optical axis during the variation of magnification, said fourth lens unit comprising a positive lens and a negative lens, satisfying the following condition:

$$0.3 < |f2/\sqrt{fw \cdot ft}| < 0.45$$

where f2 is a focal length of said second lens unit, and fw and ft are focal lengths of said variable magnification optical system in a wide-angle end and a telephoto end, respectively.

16. A variable magnification optical system comprising, in order from an object side to an image side:
   a first lens unit of positive refractive power;
   a second lens unit of negative refractive power arranged to move along an optical axis during a variation of magnification;
   a third lens unit of positive refractive power, at least a part of said third lens unit being moved in such a way as to have a component perpendicular to the optical axis to displace an image formed by said variable magnification optical system, said third lens unit comprising, in order from the object side to the image side, a first lens of positive refractive power having a convex surface facing the object side, a second lens of negative refractive power and of meniscus form having a concave surface facing the image side, and a third lens of positive refractive power;

a fourth lens unit of positive refractive power arranged to move along the optical axis during the variation of magnification, said fourth lens unit comprising a positive lens and a negative lens and;

an aperture stop, said aperture stop having a full-aperture diameter variable according to a focal length of said variable magnification optical system.

17. A variable magnification optical system comprising, in order from an object side to an image side:

a first lens unit of positive refractive power arranged to move along an optical axis during variation of magnification, said first lens unit having, on the most object side thereof, a negative lens of meniscus form having a concave surface facing the image side;

a second lens unit of negative refractive power arranged to move along the optical axis during the variation of magnification, said second lens unit having, on the most object side thereof, a negative lens of meniscus form having a concave surface facing the image side;

a third lens unit of positive refractive power, at least a part of said third lens unit being moved in such a way as to have a component perpendicular to the optical axis to displace an image formed by said variable magnification optical system; and a fourth lens unit of positive refractive power arranged to move along the optical axis during the variation of magnification, wherein the following condition is satisfied:

$$0.5 < |m1/m2| < 2.5$$

where m1 and m2 are amounts of movement of said first lens unit and said second lens unit, respectively, required for the variation of magnification from a wide-angle end to a telephoto end.

18. A variable magnification optical system according to claim 17, wherein said first lens unit comprises, in order from the object side to the image side, a first lens (L11) of negative refractive power and of meniscus form having a concave surface facing the image side, a second lens (L12) of positive refractive power, and a third lens (L13) of positive refractive power having a convex surface facing the object side.

19. A variable magnification optical system according to claim 17, wherein said first lens unit consists of, in order from the object side to the image side, a first lens (L12) of negative refractive power and of meniscus form having a concave surface facing the image side, a second lens (L12) of positive refractive power both lens surfaces of which are convex, and a third lens (L13) of positive refractive power having a convex surface facing the object side.

20. A variable magnification optical system according to claim 17, wherein said second lens unit comprises, in order from the object side to the image side, a first lens (L21) of negative refractive power and of meniscus form having a concave surface facing the image side, a second lens (L22) of negative refractive power, and a third lens (L23) of positive refractive power having a convex surface facing the object side.

21. A variable magnification optical system according to claim 17, wherein said second lens unit consists of, in order from the object side to the image side, a first lens (L21) of negative refractive power and of meniscus form having a concave surface facing the image side, a second lens (L22) of negative refractive power both lens surfaces of which are concave, a third lens (L23) of positive refractive power both lens surfaces of which are convex, and a fourth lens (L24) of negative refractive power both lens surfaces of which are concave.

22. A variable magnification optical system according to claim 17, further satisfying the following condition:

$$0.3 < |f2/\sqrt{fw \cdot ft}| < 0.48$$

where f2 is a focal length of said second lens unit, and fw and ft are focal lengths of said variable magnification optical system in a wide-angle end and a telephoto end, respectively.

23. A variable magnification optical system according to claim 17, further satisfying the following condition:

$$1.5 < |f1/\sqrt{fw \cdot ft} < 2.5$$

where f1 is a focal length of said first lens unit, and fw and ft are focal lengths of said variable magnification optical system in a wide-angle end and a telephoto end, respectively.

24. A variable magnification optical system according to claim 17, further comprising an aperture stop, said aperture stop having a full-aperture diameter variable according to a focal length of said variable magnification optical system.

25. A variable magnification optical system comprising, in order from an object side to an image side:

a first lens unit of positive refractive power arranged to move along an optical axis during variation of magnification;

a second lens unit of negative refractive power arranged to move along the optical axis during the variation of magnification;

an aperture stop arranged to move along the optical axis during the variation of magnification, said aperture stop varying an aperture thereof to adjust an amount of passing light, and said aperture stop being located nearer to the object side in a wide-angle end than in a telephoto end;

a third lens unit of positive refractive power, at least a part of said third lens unit being moved in such a way as to have a component perpendicular to the optical axis to displace an image formed by said variable magnification optical system; and a fourth lens unit of positive refractive power arranged to move along the optical axis during the variation of magnification, wherein the following condition is satisfied:

$$0.5 < |m1/m2| < 2.5$$

where m1 and m2 are amounts of movement of said first lens unit and said second lens unit, respectively, required for the variation of magnification from the wide-angle end to the telephoto end.

26. A variable magnification optical system according to claim 25, wherein said first lens unit comprises, in order from the object side to the image side, a first lens (L11) of negative refractive power and of meniscus form having a concave surface facing the image side, a second lens (L12) of positive refractive power, and a third lens (L13) of positive refractive power having a convex surface facing the object side.

27. A variable magnification optical system according to claim 25, wherein said first lens unit consists of, in order from the object side to the image side, a first lens (L11) of negative refractive power and of meniscus form having a concave surface facing the image side, a second lens (L12) of positive refractive power both lens surfaces of which are convex, and a third lens (L13) of positive refractive power having a convex surface facing the object side.

28. A variable magnification optical system according to claim 25, wherein said second lens unit comprises, in order from the object side to the image side, a first lens (L21) of negative refractive power and of meniscus form having a concave surface facing the image side, a second lens (L22) of negative refractive power, and a third lens (L23) of positive refractive power having a convex surface facing the object side.

29. A variable magnification optical system according to claim 25, wherein said second lens unit consists of, in order from the object side to the image side, a first lens (L21) of negative refractive power and of meniscus form having a concave surface facing the image side, a second lens (L22) of negative refractive power both lens surfaces of which are concave, a third lens (L23) of positive refractive power both lens surfaces of which are convex, and a fourth lens (L24) of negative refractive power both lens surfaces of which are concave.

30. A variable magnification optical system according to claim 25, further satisfying the following condition:

$$0.3 < |f2/\sqrt{fw \cdot ft}| < 0.48$$

where f2 is a focal length of said second lens unit, and fw and ft are focal lengths of said variable magnification optical system in a wide-angle end and a telephoto end, respectively.

31. A variable magnification optical system according to claim 25, further satisfying the following condition:

$$1.5 < |f1/\sqrt{fw \cdot ft}| < 2.5$$

where f1 is a focal length of said first lens unit, and fw and ft are focal lengths of said variable magnification optical system in a wide-angle end and a telephoto end, respectively.

32. A variable magnification optical system according to claim 25, further comprising an aperture stop, said aperture stop having a full-aperture diameter variable according to a focal length of said variable magnification optical system.

33. A camera comprising:

a photographic lens, said photographic lens being a variable magnification optical system according to any one of claims 1 to 32.

* * * * *

UNITED STATES PATENT AND TRADEMARK OFFICE
CERTIFICATE OF CORRECTION

PATENT NO. : 6,414,800 B1
DATED : July 2, 2002
INVENTOR(S) : Hiroyuki Hamano

It is certified that error appears in the above-identified patent and that said Letters Patent is hereby corrected as shown below:

Title page,
Item [57], ABSTRACT,
Line 22, "lens" should read -- lens unit. --.

Column 1,
Line 55, "negative" should read -- negative, --.
Line 57, "subunits of" should read -- subunit of --.

Column 2,
Line 5, "entire" should read -- the entire --.

Column 4,
Line 44, "Lens" should read -- lens --.

Column 9,
Line 24, "movement A" should read -- movement $\Delta$ --.

Column 10,
Line 58, "f" should read -- If --.

Column 15,
Line 52, (Numerical Example 3), "-0.17" should read -- 0.17 --.

Column 17,
Line 6, (Numerical Example 3), "6.08  22.55" should read -- 6.65     22.34 --.

Column 23,
Line 3, (Numerical Example 4), "23.5" should read -- 23.8 --.

Column 25,
Line 31, (Numerical Example 6), "R1S" should read -- R15 --.
Line 33, (Numerical Example 6), "1.846668" should read -- 1.846660 --.

Column 27,
Line 3, (Numerical Example 7), "R 9-" should read -- R 9 = --.
Line 43, (Numerical Example 8), "R10 = 2.863" should read -- R10 = 2.063 --.

Column 31,
Line 16, "shortening" should read -- shortening of --.

UNITED STATES PATENT AND TRADEMARK OFFICE
CERTIFICATE OF CORRECTION

PATENT NO.    : 6,414,800 B1
DATED         : July 2, 2002
INVENTOR(S)   : Hiroyuki Hamano It is certified that error appears in the above-identified patent and that said Letters Patent is hereby corrected as shown below:

Column 32,
Line 15, "Unit L2" should read -- unit L2 --.

Column 33,
Line 17, "ft" should read -- $\sqrt{fw \cdot ft}$ --.

Column 34,
Line 8, "f31" should read -- f3 --.
Line 46, "Lens" should read -- lens --.

Column 37,
Line 9, (Numerical Example 10), "1.6031#2" should read -- 1.603112 --.

Column 40,
Line 29, "f31" should read -- f3 --.

Column 43,
Line 13, "lens and;" should read -- lens; and --.
Line 54, "first lens (L12)" should read -- first lens (L11) --.

Column 44,
Line 20, "$|f1/\sqrt{fw \cdot ft}$" should read -- $|f1/\sqrt{fw \cdot ft}|$ --.

Signed and Sealed this

Twenty-eighth Day of January, 2003

JAMES E. ROGAN
*Director of the United States Patent and Trademark Office*